(12) United States Patent
Pinchot

(10) Patent No.: US 9,138,934 B2
(45) Date of Patent: *Sep. 22, 2015

(54) EXTRUDER SYSTEM AND CUTTING ASSEMBLY

(71) Applicant: James M. Pinchot, Cleveland, OH (US)

(72) Inventor: James M. Pinchot, Cleveland, OH (US)

(73) Assignee: JMP Industries, Inc., Cleveland, OH (US)

(*) Notice: Subject to any disclaimer, the term of this patent is extended or adjusted under 35 U.S.C. 154(b) by 43 days.

This patent is subject to a terminal disclaimer.

(21) Appl. No.: 13/905,274

(22) Filed: May 30, 2013

(65) Prior Publication Data

US 2013/0259963 A1   Oct. 3, 2013

Related U.S. Application Data

(63) Continuation of application No. 13/451,792, filed on Apr. 20, 2012, which is a continuation of application No. 12/689,770, filed on Jan. 19, 2010, now Pat. No. 8,186,991, which is a continuation-in-part of application No. 11/651,063, filed on Jan. 8, 2007, now Pat. No. 7,674,102, which is a continuation-in-part of application No. 11/062,220, filed on Feb. 18, 2005, now abandoned, and a continuation-in-part of application No. PCT/US2006/000575, filed on Feb. 17, 2006, and a continuation-in-part of application No. 29/263,185, filed on Jul. 14, 2006, now Pat. No. Des. 544,506, and a continuation-in-part of application No. 29/263,364, filed on Jul. 14, 2006, now Pat. No. Des. 580,959, and a continuation-in-part of application No. 29/263,183, filed on Jul. 14, 2006, now Pat. No. Des. 544,006, and a continuation-in-part of application No. 29/263,184, filed on Jul. 14, 2006, now Pat. No. Des. 544,891.

(60) Provisional application No. 60/548,693, filed on Feb. 27, 2004.

(51) Int. Cl.
| | | |
|---|---|---|
| B29C 47/30 | (2006.01) |
| B29B 9/10 | (2006.01) |
| B29C 47/92 | (2006.01) |
| A23N 17/00 | (2006.01) |
| A23P 1/12 | (2006.01) |
| B21C 35/02 | (2006.01) |
| B21C 35/04 | (2006.01) |
| B26D 1/28 | (2006.01) |
| B26D 1/29 | (2006.01) |
| B29B 9/06 | (2006.01) |
| B29C 47/00 | (2006.01) |
| B26D 5/00 | (2006.01) |

(52) U.S. Cl.
CPC .............. *B29C 47/92* (2013.01); *A23N 17/005* (2013.01); *A23P 1/12* (2013.01); *B21C 35/02* (2013.01); *B21C 35/04* (2013.01); *B26D 1/28* (2013.01); *B26D 1/29* (2013.01); *B29B 9/06* (2013.01); *B29C 47/0011* (2013.01); *B29C 47/30* (2013.01); *B26D 5/00* (2013.01); *B29C 2947/9259* (2013.01); *B29C 2947/92638* (2013.01); *B29C 2947/92885* (2013.01); *B29C 2947/92923* (2013.01)

(58) Field of Classification Search
USPC ..................................................... 425/192 R
See application file for complete search history.

(56) References Cited

U.S. PATENT DOCUMENTS

D442,612 S * 5/2001 Pinchot ......................... D15/199
D444,487 S * 7/2001 Pinchot ......................... D15/199

(Continued)

*Primary Examiner* — Robert B Davis
(74) *Attorney, Agent, or Firm* — Fay Sharpe LLP

(57) ABSTRACT

An extruder system for extruding material through a die/extrude insert in an opening in an extruder plate.

23 Claims, 45 Drawing Sheets

(56) References Cited

U.S. PATENT DOCUMENTS

| | | | |
|---|---|---|---|
| D469,117 S * | 1/2003 | Pinchot | D15/199 |
| 7,674,102 B2 * | 3/2010 | Pinchot | 425/142 |
| 8,186,991 B2 * | 5/2012 | Pinchot | 425/192 R |
| 8,491,294 B2 * | 7/2013 | Pinchot | 425/192 R |

* cited by examiner

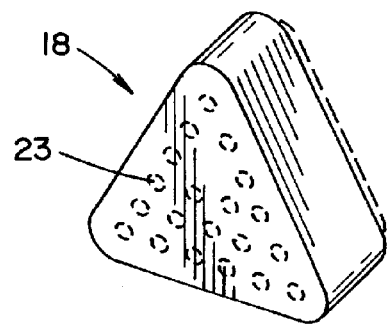
FIG. 36A
FIG. 36C
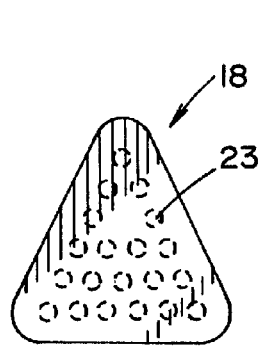 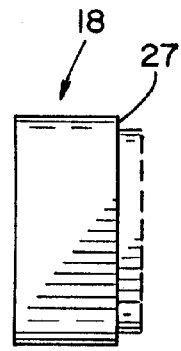 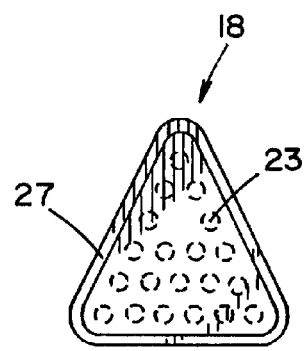
FIG. 36B  FIG. 36D  FIG. 36E
FIG. 36F

EXTRUDER SYSTEM AND CUTTING ASSEMBLY

This patent application is a continuation of U.S. patent application Ser. No. 13/451,792 filed Apr. 20, 2012, which in turn is a continuation of U.S. patent application Ser. No. 12/689,770 filed Jan. 19, 2010, which in turn is a continuation-in-part of U.S. patent application Ser. No. 11/651,063 filed Jan. 8, 2007, now U.S. Pat. No. 7,674,102, which in turn is a continuation-in-part of U.S. patent application Ser. No. 11/062,220 filed Feb. 18, 2005, now abandoned, which claims priority on U.S. provisional patent application Ser. No. 60/548,693, filed Feb. 27, 2004, both of which are incorporated herein by reference.

This patent application is a continuation of U.S. patent application Ser. No. 13/451,792 filed Apr. 20, 2012, which in turn is a continuation of U.S. patent application Ser. No. 12/689,770 filed Jan. 19, 2010, which in turn is a continuation-in-part of U.S. patent application Ser. No. 11/651,063 filed Jan. 8, 2007, which in turn is a continuation-in-part of PCT Application Serial No. PCT/US2006/00575 filed Feb. 17, 2006, now abandoned, which in turn claims priority on U.S. patent application Ser. No. 11/062,220 filed Feb. 18, 2005, now abandoned; U.S. Pat. D550,259; U.S. patent application Ser. No. 29/242,779 filed Nov. 15, 2005, and U.S. patent application Ser. No. 29/242,881 filed Nov. 15, 2005, all of which are incorporated herein by reference.

This patent application is a continuation of U.S. patent application Ser. No. 13/451,792 filed Apr. 20, 2012, which in turn is a continuation of U.S. patent application Ser. No. 12/689,770 filed Jan. 19, 2010, which in turn is a continuation-in-part of U.S. patent application Ser. No. 11/651,063 filed Jan. 8, 2007, which in turn is a continuation-in-part of U.S. Pat. D544,005, which is incorporated herein by reference.

This patent application is a continuation of U.S. patent application Ser. No. 13/451,792 filed Apr. 20, 2012, which in turn is a continuation of U.S. patent application Ser. No. 12/689,770 filed Jan. 19, 2010, which in turn is a continuation-in-part of U.S. patent application Ser. No. 11/651,063 filed Jan. 8, 2007, which in turn is a continuation-in-part of U.S. Pat. D544,506, which is incorporated herein by reference.

This patent application is a continuation of U.S. patent application Ser. No. 13/451,792 filed Apr. 20, 2012, which in turn is a continuation of U.S. patent application Ser. No. 12/689,770 filed Jan. 19, 2010, which in turn is a continuation-in-part of U.S. patent application Ser. No. 11/651,063 filed Jan. 8, 2007, which in turn is a continuation-in-part of U.S. Pat. D580,959, which is incorporated herein by reference.

This patent application is a continuation of U.S. patent application Ser. No. 13/451,792 filed Apr. 20, 2012, which in turn is a continuation of U.S. patent application Ser. No. 12/689,770 filed Jan. 19, 2010, which in turn is a continuation-in-part of U.S. patent application Ser. No. 11/651,063 filed Jan. 8, 2007, which in turn is a continuation-in-part of U.S. Pat. D544,006, which is incorporated herein by reference.

This patent application is a continuation of U.S. patent application Ser. No. 13/451,792 filed Apr. 20, 2012, which in turn is a continuation of U.S. patent application Ser. No. 12/689,770 filed Jan. 19, 2010, which in turn is a continuation-in-part of U.S. patent application Ser. No. 11/651,063 filed Jan. 8, 2007, which in turn is a continuation-in-part of U.S. Pat. D544,891, which is incorporated herein by reference.

The present invention relates to extrusion hardware, and more particularly to extruder plates, extruder plate inserts, wiper blades, auger blades and cutting devices for use in an extruder system.

INCORPORATION BY REFERENCE

The following patents and patent applications are incorporated herein by reference to provide background information relating to extruder technology, namely U.S. Pat. Nos. D442,612; D444,487; D446,794; D450,732; D452,257; D469,116; D469,117; D469,452; D469,453; D469,454; D470,869; D470,870; D472,252; D496,377; D485,286; D494,198; D497,376; D523,452; D531,197; D534,562; D544,005; D544,006; D544,506; D544,891; D550,259; D580,959; and U.S. patent application Ser. Nos. 60/548,693 filed Feb. 27, 2004, Ser. No. 11/062,220 filed Feb. 18, 2005, now abandoned; 29/242,779 filed Nov. 15, 2005, 29/242,881 filed Nov. 15, 2005, and PCT Application Serial No. PCT/US2006/005751 filed Feb. 17, 2006, now abandoned; and European Patent Application Serial Nos. 000528864 filed May 15, 2006; 000556030 filed Jul. 4, 2006, now EP 556030-0001 to EP 556030-0004; 000556006 filed Jul. 4, 2006, now EP 556006-0001 to EP 556006-000112; and 000556022 filed Jul. 4, 2006, now EP 556022-0001 to EP 556022-0004.

BACKGROUND OF THE INVENTION

Many types of products are extruded from dies and cut to certain lengths after being extruded through the die. Such products include, but are not limited to, catalyst, human and animal foods, fertilizer, medication, various types of plastic and/or other polymer products, fiber reinforced products, metal, glass, etc. For some types of products (e.g., medication, fertilizer, catalyst, etc.) the cut extruded product should be as uniform as possible. The rate at which a certain product is extruded through a particular die can at least partially depend on a variety of factors such as the wearing of the die components, the wearing of the auger, the density of the product, whether the auger is starved of feed material, plugging of one or more dies inserts, etc. As a result of one or more of these variable factors and/or other factors, the rate at which a particular product extrudes through one or more can periodically vary. This varying of the rate of product extrusion commonly results in the cut extruded product being of a non-uniform length, thereby resulting in a significant percent of the product to be disposed of.

Products formed for the medical and catalyst industry is highly sensitive to product uniformity. The uniform size of a catalyst is used to control certain types of chemical reactions. In some types of chemical reactions, a large tolerance as to size variations was acceptable for the catalyst in these chemical reactions. Due to these large acceptable tolerances as to catalyst size, the catalyst could be extruded and cut using conventional technology and about 65-85% of the cut catalyst would be acceptable for use. However, when the tolerances for the size of the catalyst are small when the catalyst is used in other types of chemical reactions, the amount of wasted cut catalyst significantly increases, thereby increasing product costs. In the medical industry, the tolerance for the size of the medical is very low so as to ensure that essentially the same dosage of medicine is present in each pill. As such, most drug manufacturers use a pill manufacturing process. Pill machines are also used to form some types of catalyst that require a low tolerance to the size of the catalyst. Although the pill manufacturing process produces a large percentage of medication and catalyst having a desired size, the pill manufacturing process is very expensive as compared with most extrusion processed, and also has extremely slow through-puts, thereby resulting in low output over time and significantly increased manufacturing costs. Such high costs are cost prohibitive for many types of products.

In view of the current state of art, there is a need for extrusion hardware and a cutting device that can be used to cut an extruded product in a more uniform manner.

SUMMARY OF THE INVENTION

The present invention relates to extrusion hardware, and more particularly to extruder plates, extruder/die inserts, wiper blades, auger blades and cutting devices for use in an extruder system. In one non-limiting embodiment of the invention, there is provided specially designed extruder/die inserts and extruder plates that can to used to extrude a wide variety of different materials. The extruder/die inserts and die plates of the present invention are designed to improve throughput by an extruder, improve the durability of the die plate and/or extruder/die insert, improved the ease of use of the extruder/die insert in combination with the extruder plate, and/or improve the quality of the material extruded by the extruder system. In another and/or alternative non-limiting embodiment of the invention, there is provided a wiper blade that is designed to improve throughput by an extruder, reduce the wear rate of one or more components of the extruder system, and/or improve the quality of the material extruded by the extruder system. In still another and/or alternative non-limiting embodiment of the invention, there is provided an auger blade that is designed to improve throughput by an extruder, reduce the wear rate of one or more components of the extruder system, and/or improve the quality of the material extruded by the extruder system. In yet another and/or alternative non-limiting embodiment of the invention, there is provided a cutting assembly to cut materials that have been extruded through one or more extruder/die inserts that are positioned in an extruder plate. The extrusion hardware of the present invention is particularly directed the extrusion and cutting of extruded catalyst; however, the extrusion hardware can be used to cut many other types of extruded material.

In one non-limiting aspect of the present invention, there is provided a cutting assembly that is designed to cut materials one or more types of materials that have been extruded through one or more extruder plates that may or may not include one or more extruder/die inserts. The improved cutting assembly is designed to improve the product quality of cut extruded material by cutting the extruded material within low tolerances to a certain specified length. In many types of businesses such as, but not limited to, the pharmaceutical business, the catalyst business, etc., the size of the extruded material must be maintained to comply with stringent criteria. For instance, in the pharmaceutical business, the size of a cut pill affects the dosage of the medication. A pill that has been cut too large or a too small may result in the incorrect dosage being given to the patient. Likewise, in the catalyst industry, the size of the catalyst can affect the rate of reaction that takes place when using the catalyst. An extruded catalyst that is cut too large or too small could adversely affect a chemical reaction that involves the use of the catalyst. The proper cutting of other materials (e.g., foods, fertilizers, etc.) can affect the product quality and/or effectiveness of the cut product. The improved cutting assembly of the present invention is designed to cut an extruded product from an extruder plate to form a cut product that more closely matches the desired length of the product, thereby eliminating the need for forming the product by more expensive processes that have lower through-puts (e.g., pill making machines, etc.). Consequently, products that have historically been formed by pill manufacturing processes (e.g., medication, certain types of catalysts, etc.) can be extruded through one or more extruder plates and cut to a desired length by use of the improved cutting assembly of the present invention. In addition, the improved cutting assembly of the present invention can be used to cut products that are currently extruded through extruder plates and thereby significantly reduce the amount of waste of such extruded product that historically has to be disposed of since the extruded product did not meet the size tolerance parameters of the extruded product. As such, one non-limiting aspect of the present invention is thus directed to an extrusion cutting assembly which can increase the quantity of cut product as compared to prior art cutting assemblies.

In another and/or alternative non-limiting aspect of the present invention, the improved cutting assembly incorporates several technologies that are used to produce a higher quality product. Each one of these technologies individually can results in increased product quality. In addition, the combination of one ore more of these technologies can be used to further increase the percentage of produced product having a desired cut length. Prior cutting systems for extruded products commonly produced about 15-35% of the cut product being within 200% of the desired length. The cutting assembly of the present invention can result in about 60-99.9% of the cut extruded product being within about 200% of the desired length, typically about 70-99.9% of the cut extruded product being within about 100% of the desired length, more typically about 80-99.9% of the cut extruded product being within about 100% of the desired length, and still more typically about 90-99.9% of the cut extruded product being within about 100% of the desired length. The cutting assembly of the present invention thus produces a higher quality product with significantly less waste. The cutting assembly of the present invention also has higher through-puts without sacrificing product quality.

In still another and/or alternative non-limiting aspect of the present invention, the cutting assembly includes the use of an improved wiper blade to improved the throughput and/or quality of the extruded material through one or more extruder plates. The wiper blade of the present invention is designed to be positioned closely adjacent to the openings in the die support plate. In one non-limiting embodiment of the present invention, the wiper blade is used to direct material to be extruded into the openings of the extruder plate and/or extruder/die inserts. The wiper blade is also and/or alternatively used to reduce or eliminate the amount of space around the one or more openings that can harbor material of the extruder plate and/or extruder/die inserts, thereby reducing or eliminating the amount of material that can stagnate or accumulate around such one or more openings. Material that stagnates or accumulates around one or more openings of the extruder plate and/or extruder/die inserts can become hardened or less formable. This hardened or less formable material can eventually work its way into one or more of the openings of the extruder plate and/or extruder/die inserts. Due to the hardened or less formable nature of the material, the material can become stuck in the one or more openings, thereby resulting in plugging or clogging the one or more openings. The clogging or plugging of the one or more openings can reduce the number and/or percentage of the extruder plate and/or extruder/die inserts that are being used to form the extruded product, thereby reducing the amount of product being produced. The clogging or plugging of one or more of the extruder plates and/or extruder/die inserts can also affect the pressure at which the material is extruded through the remaining unclogged openings. For instance, an extruder plate which includes four openings can suddenly encounter a pressure increase of at least about 15-35% in the three unclogged openings when one of the openings becomes at least partially clogged or plugged. The increased pressure exerted on the extruded material can result in the material being forced through the unplugged or unclogged openings at an increased rate, thereby resulting in the lengths of the cut catalysts being increased when the cutting blade is running at a constant speed. The increased length of the cut product can result in an unacceptable product due to the unacceptably long product length, thus reducing the yield of acceptable products. The increased pressure on the material can also adversely affect the extruded material (e.g., adversely breaking down chemical bonds or structures, unacceptably increasing the heat applied to the material thereby resulting in adverse chemical reactions or structural formations, etc.). Such adverse effects on the extruded material can result in the material being unacceptable for its end use, even if the cut length is within an acceptable range. In one non-limiting embodiment of the invention, the wiper blade of the present invention is designed to reduce or eliminate the space about the one or more openings that can harbor material to be extruded, thereby reducing or eliminating the incidence of one or more of the openings becoming partially or fully plugged or clogged during an extruding process. In one non-limiting aspect of this embodiment, the wiper blade results in at least about a 20% reduction in the space about the one more openings that can harbor material to be extruded. In another non-limiting aspect of this embodiment, the wiper blade results in at least about a 50% reduction in the space about the one or more openings that can harbor material to be extruded. In still another non-limiting aspect of this embodiment, the wiper blade results in at least about a 75% reduction in the space about the one or more openings that can harbor material to be extruded. In another and/or alternative non-limiting embodiment of the invention, at least a portion of at least one blade of the wiper blade is positioned from the plane of the inner surface of the one or more openings of the extruder plate and/or extruder/die insert a distance of less than about 2 inches. In one non-limiting aspect of this embodiment, at least a portion of at least one blade of the wiper blade is positioned from the plane of the inner surface of the one or more openings of the extruder plate and/or extruder/die insert a distance of less than about 1.5 inches. In another and/or alternative non-limiting aspect of this embodiment, at least a portion of at least one blade of the wiper blade is positioned from the plane of the inner surface of the one or more openings of the extruder plate and/or extruder/die insert a distance of less than about 1 inch. In still another and/or alternative non-limiting aspect of this embodiment, at least a portion of at least one blade of the wiper blade is positioned from the plane of the inner surface of the one or more openings of the extruder plate and/or extruder/die insert a distance of about 0.01-1 inch. In yet another and/or alternative non-limiting aspect of this embodiment, at least a portion of at least one blade of the wiper blade is positioned from the plane of the inner surface of the one or more openings of the extruder plate and/or extruder/die insert a distance of about 0.02-0.75 inch. In still yet another and/or alternative non-limiting aspect of this embodiment, at least a portion of at least one blade of the wiper blade is positioned from the plane of the inner surface of the one or more openings of the extruder plate and/or extruder/die insert a distance of about 0.02-0.5 inch. In another and/or alternative non-limiting aspect of this embodiment, at least a portion of at least one blade of the wiper blade is positioned from the plane of the inner surface of the one or more openings of the extruder plate and/or extruder/die insert a distance of about 0.02-0.25 inch. In still another and/or alternative non-limiting aspect of this embodiment, at least a portion of at least one blade of the wiper blade is positioned from the plane of the inner surface of the one or more openings of the extruder plate and/or extruder/die insert a distance of about 0.02-0.1 inch. In still another and/or alternative non-limiting embodiment of the invention, the wiper blade of the present invention reduces the pressure variations of the material being directed into the openings of the die holder. Typically, an auger blade is used to direct the material to be extruded toward the one or more openings of the extruder plate and/or extruder/die insert. Most of these auger blades have a single flight configuration; however, dual flight configurations can be used. As the auger blade rotates, the material to be extruded is moved toward the one or more openings in the extruder plate and/or extruder/die insert. The opening in the extruder plate and/or extruder/die insert that is positioned closest to the face of the blade of the auger blade at a certain time is exposed to a higher pressure by the material than another opening in the extruder plate and/or extruder/die insert which is positioned at a farther distance from the blade face of the auger blade. As a result, when the auger blade is rotated during operation of the extruder, the pressure being applied to the extruded material at a particular opening in the extruder plate and/or extruder/die insert is increased as the face of the auger blade approaches a particular opening and then decreases after the face of the blade passes the opening and moves to another opening as the auger blade rotates. The increasing and decreasing pressure being exerted on the material through the openings in the extruder plate and/or extruder/die insert results in the material being accelerated and decelerated through the openings as the auger blade rotates. The increased speed at which the material passes through an opening result in an increased length of the material being cut when the cutter blade is rotated at a constant speed. The reduced speed at which material passes through an opening results in a reduced length of material being cut when the cutter blade is rotated at a constant speed. As a result, the cut material can constantly vary in length due in part to the rotation of the auger blade feeding the material to be extruded through the extruder plate and/or extruder/die insert. The use of a wiper blade having multiple blades positioned between the end of the auger blade and the one or more openings in the extruder plate and/or extruder/die insert results in a reduction of the pressure amplitude differential between a high and low pressure situation, thereby resulting in a more constant pressure being applied to the material directed into the one or more openings. As a result, the length of the cut material is more uniform due to the relatively constant pressure being applied on the material at all the openings in the extruder plate and/or extruder/die insert, thereby resulting in a higher percentage of acceptable product being produced. In one non-limiting aspect of this embodiment, the wiper blade includes a plurality of blades that used to reduce or eliminate the pressure amplitude differential between a high and low pressure situation during the extrusion of material through one or more openings in the extruder plate and/or extruder/die insert. In another non-limiting design, the number of blades on a wiper blade is at least one-forth the number of openings in the extruder plate through which material is extruded. In still another non-limiting design, the number of blades on a wiper blade is at least one-half the number of openings in the extruder plate through which material is extruded. In yet another non-limiting design, the number of blades on the wiper blade is at least three-quarters the number of openings in the extruder plate through which material is extruded. In still yet another non-limiting design, the number of blades on the wiper blade is equal to or greater than the number of openings in the extruder plate through which material is extruded. In a further non-limiting design, the number of blades on the wiper blade is at least 1.5 times the number of openings in the extruder plate through which material is extruded. In still a further non-limiting design, the number of blades on the wiper blade is at least 2 times the number of openings in the extruder plate through which material is extruded.

In still another and/or alternative non-limiting aspect of the present invention, the wiper blade is connected to the end of the auger blade. The wipe blade can be designed to be releasably connected or permanently connected to the end of the auger blade. As can be appreciated, the wiper blade can be integrally formed on the end of the auger blade. The wiper blade can be designed to at least partially break and/or disengage from the auger blade when the wipe blade encounters a certain amount of resistance. For example, if one or more openings in the extruder plate and/or extruder/die insert become plugged, the pressure on the inner surface of the extruder plate and/or extruder/die insert can substantially increase. This increase in pressure can result in significant resistance to the wiper blade as the wiper blade rotates. When very high resistance is encountered, the wiper blade can be designed to break and/or at least partially disengage from the auger blade so that the wiper blade does not continue to rotate or rotate with the blades intact. This breaking and/or disengagement of the wiper blade can be beneficially in reducing and/or preventing damage to the auger blade and/or extruder plate and/or extruder/die insert. The partial or full disablement of the wiper blade when substantially pressure increases above the norm are encounted can result in less force being applied to the auger blade and/or extruder plate and/or extruder/die insert. In one non-limiting design, the wiper blade is at least partially formed of a material (e.g., plastic material, soft metal, etc.) that is less strong than the material used to form the auger blade (e.g., hardened steel, strong metal alloy, etc.). In another and/or alternative non-limiting design, the wiper blade is connected to the auger blade by an arrangement designed to which will fail after encountering a certain amount of torque. In such an arrangement, the auger blade may continue to rotate, but the wipe blade applies little, if any, force on the material which directs the material to the extruder plate and/or extruder/die insert.

In yet another and/or alternative non-limiting aspect of the present invention, at least one blade on the wiper blade is sized so that the blade is at least as large as at least one opening in the inner surface of the extruder plate so as to facilitate in directing material into the opening. The size of the one or more blades on the wiper blade can be used to reduce the amount of dead area about the opening in the extruder plate when a particular blade of the wiper blade passes by and over the opening, thereby reducing the amount of stagnant material which can become entrapped or stagnant about the opening or within the wiper area. It has been found that by properly designing the wiper blade, the amount of cut product that is within size tolerance range for a particular product can be improved by up to 25% or more. This significant improvement in the amount of acceptable product reduces the amount of product that must be disposed of due to the fact that the cut length is too long or short. In one non-limiting aspect of this embodiment, the size of at least one of the blades of the wiper blade is up to about 5% larger than the diameter of at least one of the openings in the inner surface of the extruder plate. In another non-limiting aspect of this embodiment, the size of at least one of the blades of the wiper blade is up to about 10% larger than the diameter of at least one of the openings in the inner surface of the extruder plate. In still another non-limiting aspect of this embodiment, the size of at least one of the blades of the wiper blade is up to about 20% larger than the diameter of at least one of the openings in the inner surface of the extruder plate. In still another non-limiting aspect of this embodiment, the size of at least one of the blades of the wiper blade is up to about 30% larger than the diameter of at least one of the openings in the inner surface of the extruder plate.

In still yet another and/or alternative non-limiting embodiment of the invention, the plurality of blades of the wiper blade is substantially equally spaced apart so as to create a more uniform pressure at the one or more openings in the extruder plate and/or extruder/die insert, thereby resulting in a more uniform length of product that is cut by the cutting assembly during the extrusion process.

In still yet another and/or alternative non-limiting aspect of the present invention, the blades on the wiper blade are substantially the same shape and size so as to create a more uniform pressure at the one or more openings in the extruder plate and/or extruder/die insert, thereby resulting in a more uniform length of product that is cut by the cutting assembly during the extrusion process.

In a further and/or alternative non-limiting aspect of the present invention, the one or more blades on the wiper blade have an angle on the front surface of the one or more blades that is used to facilitate in pushing the material into the one or more openings in the one or more openings in the extruder plate and/or extruder/die insert. The angle is selected to facilitate movement of the material into the one or more openings in the extruder plate and/or extruder/die insert without cutting or substantially cutting the material prior to being moved into the one or more openings in the extruder plate and/or extruder/die insert. In essence, the one or more angled blades are designed to smear the material to be extruded into the one ore more openings in the extruder plate and/or extruder/die insert as the blade of the wiper blade passes over the one or more openings. The selection of the blade angle can also or alternatively be used control the pressure at which the material is being forced through the one or more openings in the extruder plate and/or extruder/die insert. As such, the one or more angled blades of the wiper blade can be used to reduce the occurrence of stagnated material about the one or more openings in the extruder plate and/or extruder/die insert and can facilitate in flow rates of the material through the one or more openings in the extruder plate and/or extruder/die insert. In one non-limiting aspect of this embodiment, the angle on at least a portion of the front face of one or more blades is about 1-89°. In another non-limiting aspect of this embodiment, the angle on at least a portion of the front face of one or more blades is about 10-70°. In still another non-limiting aspect of this embodiment, the angle on at least a portion of the front face of one or more blades is about 15-60°. In yet another non-limiting aspect of this embodiment, the angle on at least a portion of the front face of one or more blades is about 20-45°. In still yet another non-limiting aspect of this embodiment, the angle on at least a portion of the front face of one or more blades is about 25-35°. In another non-limiting aspect of this embodiment, the average angle on at least a majority of the front face of one or more blades is about 10-70°. In still another non-limiting aspect of this embodiment, the average angle on at least a majority of the front face of one or more blades is about 15-60°. In yet another non-limiting aspect of this embodiment, the average angle on at least a majority of the front face of one or more blades is about 20-45°. In still yet another non-limiting aspect of this embodiment, the average angle on at least a majority of the front face of one or more blades is about 25-35°.

In yet a further and/or alternative non-limiting aspect of the present invention, the one or more blades on the wiper blade have an angle on the back face of the one or more blades (i.e., side facing away from the inner surface extruder plate and/or extruder/die insert) that is used to facilitate in movement of the one or more blades of the wiper through the material as the wiper blade rotates. The surface area of the angled portion on the back face of the one or more blades is generally less than the surface area of the angled portion on the front face of the one or more blades. In one non-limiting aspect of this embodiment, the angle on at least a portion of the back face of one or more blades is about 1-89°. In another non-limiting aspect of this embodiment, the angle on at least a portion of the back face of one or more blades is about 10-70°. In still another non-limiting aspect of this embodiment, the angle on at least a portion of the back face of one or more blades is about 15-60°. In yet another non-limiting aspect of this embodiment, the angle on at least a portion of the back face of one or more blades is about 20-45°. In still yet another non-limiting aspect of this embodiment, the angle on at least a portion of the back face of one or more blades is about 25-35°. In another non-limiting aspect of this embodiment, the ratio of surface area of the angled portion of the front face to the back face is about 1-20:1. In still another non-limiting aspect of this embodiment, the ratio of surface area of the angled portion of the front face to the back face is about 1-15:1. In yet another non-limiting aspect of this embodiment, the ratio of surface area of the angled portion of the front face to the back face is about 1-10:1. In still yet another non-limiting aspect of this embodiment, the ratio of surface area of the angled portion of the front face to the back face is about 1-5:1.

In still a further and/or alternative non-limiting aspect of the present invention, an auger blade can be used to at least partially move the material to be extruded toward the inner surface extruder plate and/or extruder/die insert. The front end of the auger blade can include a wiper blade; however, this is not required. In one non-limited embodiment of the invention, the auger blade is a single uninterrupted flight auger blade. As can be appreciated, other types of auger blades can be used (e.g., double flight auger blade, etc.). A single uninterrupted flight auger blade has been found to result a more uniform pressure profile of material being fed to the inner surface extruder plate and/or extruder/die insert as compared to interrupted flight augers. As such, a much more constant flow of material is directed to the inner surface extruder plate and/or extruder/die insert when using a single uninterrupted flight auger blade. The more uniform pressure profile at the inner surface extruder plate and/or extruder/die insert can result in a more uniform length of product that is cut by the cutting assembly during the extrusion process. In another and/or alternative non-limiting embodiment of the invention, the single uninterrupted flight auger blade has a generally uniform cross-sectional shape and size along a majority of the longitudinal length of the auger blade. In one non-limiting aspect of this embodiment, the auger blade, the average pitch of the single uninterrupted flight auger blade is about 1-8 inches, typically about 2-6 inches, and more typically about 3-4 inches. In another and/or alternative non-limiting aspect of this embodiment, the ratio of the average maximum diameter of the blade of the single uninterrupted flight auger blade to the average pitch of the blade is about 1.1-2.5, and typically about 1.25-2, and more typically about 1.3-1.7. In still another and/or alternative non-limiting aspect of this embodiment, the ratio of the average maximum diameter of the blade of the single uninterrupted flight auger blade to the average root thickness of the auger blade is about 1.5-5, and typically about 2-3.5, and more typically about 2.2-2.9. In another and/or alternative non-limiting embodiment of the invention, the single uninterrupted flight auger blade is designed such that it can be easily scalable so that a single uninterrupted flight auger blade can be easily design and used for different sized extruders. As can be appreciated, the ratios set forth above can be used to facilitate in the scalability of the auger blade.

In still a further and/or alternative non-limiting aspect of the present invention, the cutting assembly of the present invention includes an improved control arrangement which can vary the cutting blade speed to better account for the pressure differentials applied to the material being extruded through the extruder plate and/or extruder/die insert. When the pressure on the extruded material increases, the material typically travels at a faster rate through the extruder plate and/or extruder/die insert. Conversely, when the pressure on the extruded material reduces, the extruded material typically passes at a slower rate through the extruder plate and/or extruder/die insert. By detecting the pressure of the material prior to entering one or more openings in the extruder plate and/or extruder/die insert, and/or as the material enters and/or passes through one or more openings in the extruder plate and/or extruder/die insert, it can be determined whether the material is accelerating, decelerating, or maintaining a constant velocity through the extruder plate and/or extruder/die insert. If it is determined that the speed of the material (e.g., via pressure reading, via visual detection, via flow meters, etc.) passing through one or more openings in the extruder plate and/or extruder/die insert has decreased and/or is going to decrease, the speed of the blade can be accordingly adjusted in speed (i.e., decreased) to account for the change in speed at which the material is exiting the outer surface or face of the extruder plate and/or extruder/die insert. If it is determined that the speed of the material passing through one or more openings in the extruder plate and/or extruder/die insert has increased and/or is going to increase, the speed of the blade can be accordingly adjusted in speed (i.e., increased) to account for the change in speed at which the material is exiting the outer surface or face of the extruder plate and/or extruder/die insert. Furthermore, if it is determined that the speed of the material passing through one or more openings in the extruder plate and/or extruder/die insert has remained constant and/or is going to remain constant, the speed of the blade can be maintained at the same speed. As a result, the control of the blade speed used to cut the material that has been extruded through one or more openings in the extruder plate and/or extruder/die insert can be controlled so as to maintain a desired cut length of the cut extruded material. The rate of increase or decrease of the blade speed can be linear or nonlinear. The change in blade speed can be delayed to account for the time that the material enters into the one or more openings of the extruder plate and/or extruder/die insert and passes through the one or more openings in the extruder plate and/or extruder/die insert prior to being cut by the blade; however, this is not required. In one non-limiting embodiment of the invention, an electronic control system is used to control the rate at which the cutting blade cuts the material being extruded from one or more extruder plates and/or extruder/die inserts. In one non-limiting aspect of this embodiment, a pulse width modulator control system is used to control the rate at which the cutting blade cuts the material being extruded from one or more extruder plates and/or extruder/die inserts. Control of a motor speed by a pulse wave control system is well known in the art, thus will not be further described. One non-limiting PWC system is disclosed in U.S. provisional patent application Ser. No. 60/548,693, filed Feb. 27, 2004, now abandoned, which is incorporated herein by reference. As can be appreciated, other or additional control systems can be used to control the speed of the motor for the cutting system. In one non-limiting design, one or more motors are used to control the rotation speed of the cutter blades. In such a configuration, the PWC system can be used to control the amount of current to one or more electric motors to thereby control the speed of the one or more motors. Standard electric motors can be used (e.g., motors that include a stator coil (DC motors), motors operated by field induction coil (AC motors), etc.). In another and/or alternative non-limiting embodiment of the invention, the control of the blade speed with respect to the detected or determined speed at which the material is passing though one or more openings of the extruder plate and/or extruder/die insert can be used to adjust the cutting blade speed to account for abnormalities in the feed rate of the material being extruded. For instance, when one or more of the openings for the extruded material are plugged or clogged, thereby typically resulting in a significant increase in pressure on the extruded material through the remaining unclogged openings, the velocity of the cutting blade can be increased to account for the increased speed at which the material is extruded through the remaining unclogged openings. Likewise, when the auger blade is staved of material and/or there is an inconsistent amount of material being fed by the auger blade to the one or more of the openings, a significant increase/decease in pressure on the extruded material through the openings can be detected, and the velocity of the cutting blade can be adjusted accordingly to account for the change in speed at which the material is extruded through the one or more openings of the extruder plate and/or extruder/die insert.

In still another and/or alternative non-limiting embodiment of the invention, the control of the blade speed with respect to the detected pressure prior to one or more of the openings of the extruder plate and/or extruder/die insert and/or in one or more of the openings of the extruder plate and/or extruder/die insert can be used to adjust the cutting blade speed to account for abnormalities in the feed rate of the material being extruded. For instance, when one or more of the openings for the extruded material are plugged or clogged, such plugging or clogging of the opening can result in an increase in pressure on the extruded material prior to the material moving through the remaining unclogged openings. A clogged die opening will result in significant pressure drops in such opening. This pressure drop reduction in the plugged or clogged opening and/or the pressure increase in one or more of the unclogged or unplugged openings can be used to adjust the speed of the cutting blade to at least in partly account for an increase in pressure of the material through the unplugged or unclogged openings. This adjustment can be in one or more forms such as, but not limited to, slowing the rate of rotation of the auger blade, increasing the rotation speed of the cutter blade, or combinations thereof. As can also be appreciated, the detected pressure prior to one or more of the openings of the extruder plate and/or extruder/die insert and/or in one or more of the openings of the extruder plate and/or extruder/die insert can be used also or alternatively be used to set off alarms (i.e., used to indicate one or more operations of the extruder not operating within one or more parameters, etc.) and/or shut down one or more components of the extruder system so as to reduce or prevent damage to one or more components of the extruder system. In one non-limiting embodiment of the invention, the one or more pressure sensors generate a signal that can be used to activate an alarm to indicate that the detected pressure is below and/or above a desired value. This alarm can be used to detect and/or notify an operator of clogged die openings, worn components (e.g., worn/damaged auger blade, worn/damaged wiper blade, worn/damaged extruder plate, worn/damaged die/extruder insert, worn/damaged die pins, damaged/malfunctioning pressure sensors, etc.), insufficient feeding of material to be extruded, etc. In another and/or alternative embodiment of the invention, the improved cutting assembly can include a storage system that stores data regarding, but not limited to a) the detected pressures over a period of time, b) the speed of rotation of the cutter blade over time, c) the change out frequency of extruder components (e.g., wiper blade, auger blade, extruder plate, extruder/die insert, die pins, etc.), d) speed of rotation of the auger blade, e) the type/size of components used in the extruder, f) the type of feed material, g) the rate of material fed to the auger blade, and/or h) the change out frequency of the cutter assembly components (e.g., cutter blades, etc.). As can be appreciated, other or additional material can be recorded by the cutter assembly. This data can be used to facilitate in determining whether one or more components of the extruder and/or cutting assembly were operating properly during an extrusion process. The data can also or alternatively be used to control the operation of the cutter assembly. The data can be tagged to a time and/or date period; however, this is not required. This data can be designed to be accessed at real time and/or in other manners. The collected data can be used to activate one or more alarms to indicate an existing or potential problem with one or more components of the extruder and/or cutting assembly; however, this is not required. The collected data can be used to activate one or more alarms to indicate that a component change out is due for one or more components of the extruder and/or cutting assembly; however, this is not required. The collected can be use to profile the operation of one or more components of the extruder and/or cutting assembly; however, this is not required.

In yet another and/or alternative non-limiting embodiment of the invention, the control of the blade speed with respect to the detected pressure spaced from the openings in the die holder plate can be used to adjust the cutting blade speed to account for abnormalities in the feed rate of the material being extruded. For instance, when one or more of the openings for the extruded material are plugged or clogged, such clogging of the die plate opening can result in an increase in pressure on the extruded material prior to the material moving through the remaining unclogged openings. As such, the velocity of the cutting blade can be increased to account for the increased speed at which the material is extruded through the remaining unclogged openings. In another situation, when the extruder is starved of feeder material, the pressure on the extruded material can decrease on the extruded material prior to the material moving through the openings. As such, the velocity of the cutting blade can be decreased to account for the decreased speed at which the material is extruded through the openings. The speed at which a feed material is moved toward one or more openings can vary depending on the type of material and/or the type of auger blade or other type of feeding device. Even when wiper blades are used to decrease the range of pressure fluctuations as the material is being fed through one or more openings, the changes in pressure being applied to the material being extruded still typically result in some increase and a decrease in velocity through the openings. In addition, the rate at which material is fed into a feeder (e.g., fed to the auger blade) can vary, thereby resulting in variable amounts of material being fed to the one or more openings in the extruder plate and/or die/extruder insert. Reduced amounts of material in the feeder can result in reduced pressure on the material that is ultimately fed through the one or more openings. Increased amounts of material in the feeder can result in increased pressure on the material that is ultimately fed through the one or more openings. The detection of these pressure fluctuations can be used to increase and/or decrease the cutting blade speed to obtain cut extruded product having a more consistent cut length. As such, by detecting these increases and decreases in pressure, the speed of the cutting blade can be adjusted to obtain more cut product having a length within an acceptable range. By detecting the pressure being exerted on the material that is being directed into the one or more openings, the cutting blade speed can be adjusted to account for any change in velocity of the material passing through the openings. The detected pressure can be in single or multiple locations that are spaced from the openings (e.g., along the auger blade, near the wiper blade, etc.) positioned at or closely adjacent to the front face or surface of the openings (e.g., at the beginning of the openings, in the region between the wiper blade and the openings, etc.), and/or in the one or more of the openings. Consequently, the one or more pressure signals can be used to adjust the speed of the cutting blade to at least in part account for an increase and/or decrease in pressure of the material that is to move through the one or more openings. As such, the velocity of the cutting blade can be increased/decreased to account for the increased/decreased speed at which the material is anticipated to be extruded through the die openings. In one non-limiting embodiment of the invention, the one or more pressure sensors generate a signal that can be used to activate an alarm to indicate that the detected pressure is below and/or above a desired value. This alarm can be used to detect and/or notify an operator of clogged or plugged opening, worn/damaged components, insufficient feeding of material to be extruded, etc. In another and/or alternative embodiment of the invention, the one or more pressure sensors that are spaced from one or more openings can be used in conjunction with one or more pressure signals that are portioned in at least a portion of one or more openings to at least partially control the speed of the cutting blade and/or to activate one or more alarms when the detected pressure is undesired. In one non-limiting embodiment of the invention, the one or more pressure sensors generate a signal that can be used to activate an alarm to indicate that the detected pressure is below and/or above a desired value. This alarm can be used to detect and/or notify an operator of clogged or plugged openings, worn/damaged components, insufficient feeding of material to be extruded, etc. In still another and/or alternative embodiment of the invention, the improved cutting assembly can include a storage system that stores data regarding, but not limited to a) the detected pressures over a period of time, b) the speed of rotation of the cutter blade over time, c) the change out frequency of extruder components (e.g., wiper blade, auger blade, extruder plate, extruder/die insert, die pins, etc.), d) speed of rotation of the auger blade, e) the type/size of components used in the extruder, f) the type of feed material, g) the rate of material fed to the auger blade, and/or h) the change out frequency of the cutter assembly components (e.g., cutter blades, etc.). As can be appreciated, other or additional material can be recorded. This data can be used to facilitate in determining whether one or more components of the extruder and/or cutting assembly were operating properly during an extrusion process. The data can also or alternatively be used to control the operation of the cutter assembly. The data can be tagged to a time and/or date period; however, this is not required. This data can be designed to be accessed at real time and/or in other manners. The collected data can be used to activate one or more alarms to indicate an existing or potential problem with one or more components of the extruder and/or cutting assembly; however, this is not required. The collected data can be used to activate one or more alarms to indicate that a component change out is due for one or more components of the extruder and/or cutting assembly; however, this is not required. The collected can be use to profile the operation of one or more components of the extruder and/or cutting assembly; however, this is not required.

In still yet another and/or alternative non-limiting embodiment of the invention, the improved cutting assembly includes one or more sensors other than a pressure sensor that can be used to affect the cutting speed of the cutting blade and/or activate one or more alarms. Such other sensors can include, but are not limited to, temperature sensors, flow sensors, composition sensors, auger rotation speed indicators, blade cutter speed, die opening plug detectors, product quality detectors, die plate pressure detectors, product length detectors, etc. These one or more sensors can be located in one or more openings in the extruder plate and/or extruder/die insert, and/or spaced from one or more openings in the extruder plate and/or extruder/die insert. The data from one or more of these sensors can be recorded; however, this is not required. The data can be tagged to a time and/or date period; however, this is not required. The data from one or more of the sensors can also or alternatively be used to control the operation of one or more components of the cutting assembly (e.g., cutting blade rotation speed, etc.) and/or one or more components of the extruder (e.g., auger rotation speed, material feed rate into auger, etc.). The collected data can be also or alternatively be used to activate one or more alarms to indicate that a component change out is due for one or more components of the extruder, and/or the cutting assembly and/or one or more components of the extruder are not working properly; however, this is not required. The collected can be use to profile the operation of one or more components of the extruder and/or cutting assembly; however, this is not required. In another and/or alternative embodiment of the invention, additional data can be used by the cutting assembly to monitor and/or control one or more components of the extruder and/or cutting assembly. Such data can include, but is not limited to, extruder plate size, extruder plate opening configuration, extruder plate opening size, material of the extruder plate, thickness of the extruder plate, die/extruder insert size, die/extruder insert shape, die/extruder insert thickness, die/extruder insert material, type of insert pins, shape of insert pins, material of pins, type of auger blade, material of auger blade, shape of auger blade, size of auger blade, type of feed material, type of cutting blades, number of cutting blades, cutting blade material, number of blades on wiper blade, type of wiper blade, spacing of wiper blade from extruder plate and/or die/extruder insert, wiper blade material, recommended change-out/maintenance for one or more components of the extruder and/or cutting system, recommended operational parameters of one or more components of the extruder and/or cutting system, quality of extruded product, time of usage of one or more components of the extruder and/or cutting system, etc. As can be appreciated, other or additional data can be collected, stored, proceeded, monitored and/or other used by the cutting assembly. As can also be appreciated, the data that is collected, stored, processed, etc. by the cutting assembly can be used to optimize the operation of the extruder system to produce a higher quality of extruded material. As can be appreciated, any data that can be collected, stored, proceeded, monitored and/or other used by the cutting assembly can be made available to an operator onsite so that the operator can monitor and/or control one or more operations of the extruder and/or cutter assembly. As can further be appreciated, any data that can be collected, stored, proceeded, monitored and/or other used by the cutting assembly can also be transmitted to a remote location (e.g., control and/or monitoring station, etc.) so that an operator can monitor and/or control one or more operations of the extruder and/or cutter assembly at a remote location.

In a further and/or alternative non-limiting embodiment of the invention, the improved cutting assembly includes a cutting blade arrangement to improve the quality and cut length consistency of the cut extruded product. In one non-limiting embodiment of the invention, the cutting blade arrangement includes a plurality of cutting blades that are spaced at substantially equal distances from one another and/or spaced at substantially equal angular distances from one another. For instance, when the cutting blade arrangement is a generally circular disc-shaped, a two blade system would be about 180° from one another, a three blade system would be about 120° from one another, a four blade system would be about 90° from one another, a five blade system would be about 72° from one another, a six blade system would be about 60° from one another, an eight blade system would be about 45° from one another, a nine blade system would be about 40° from one another, a ten blade system would be about 36° from one another, a twelve blade system would be about 30° from one another, a fifteen blade system would be about 24° from one another, a sixteen blade system would be about 22.5° from one another, an eighteen blade system would be about 20° from one another, a twenty blade system would be about 18° from one another, a twenty-four blade system would be about 15° from one another, etc. As can be appreciated, the cutting blade arrangement can have a shape other than a generally circular disc-shaped. In another and/or alternative embodiment of the invention, one or more of the cutting blades has a novel cutting profile to facilitate in the cutting of the extruded material. In one non-limiting aspect of this embodiment, one or more cutting blades include an angular primary cutting surface. The primary cutting surface is used as the principal cutting surface of the blade. The slope angle of the primary cutting surface is used to effectively cut the extruded product. In one non-limiting design, the slope angle of the primary cutting surface is generally about 20-85°. In another non-limiting design, the slope angle of the primary cutting surface is generally about 25-60°. In still another non-limiting design, the slope angle of the primary cutting surface is generally about 20-35°. In yet another non-limiting design, the slope angle of the primary cutting surface is generally about 25-35°. In another and/or alternative non-limiting aspect of this embodiment, one or more cutting blades include a rake surface that has a rake angle. The rake surface is positioned on the same side of the one or more cutting blades as the primary cutting surface and is position next to the primary cutting surface. Typically, the primary cutting surface transitions into the rake surface; however, this is not required. The rake angle typically is less than the slope angle of the primary cutting surface. The rake angle is used in part to create a trajectory of the material after it has been cut by the primary surface. This trajectory of the material is used to more the material off of the cutting blade and/or to through the cut material to a desired location. In one non-limiting design, the slope angle of the rake surface is generally about 1-84°. In another non-limiting design, the slope angle of the rake surface is generally about 5-75°. In still another non-limiting design, the slope angle of the rake surface is generally about 10-60°. In yet another non-limiting design, the slope angle of the rake surface is generally about 10-45°. In still yet another non-limiting design, the slope angle of the rake surface is generally about 15-30°. In further non-limiting design, the slope angle of the rake surface is generally about 15-25°. In still another and/or alternative non-limiting aspect of this embodiment, one or more cutting blades include a clearance surface that has a clearance angle. The clearance surface is positioned on the opposite side of the one or more cutting blades as the primary cutting surface, and the rake surface when used. The clearance surface is also position at about the same level on the blade as the primary cutting surface and/or rake surface, when the rake surface is used. The clearance surface is designed to facilitate in enable the cutting blade to clear the continuously extruded product. Once the primary cutting surface has cut a portion of the extruded product, more extruded product moves out from the die plate openings. This front end of the extruded material can cause interference with the cutting blade, and thereby cause improper rotation speeds of the cutting blade arrangement. The clearance angle on the blade is selected so as to enable the back side of the cutting blade to easily move past the front end of the extruded product and thereby facilitate in the proper operation of the cutting blade arrangement and proper and consistent rotation speeds of the cutting blade arrangement. In one non-limiting design, the slope angle of the clearance surface is generally about 1-65°. In another non-limiting design, the slope angle of the clearance surface is generally about 3-50°. In still another non-limiting design, the slope angle of the clearance surface is generally about 3-40°. In yet another non-limiting design, the slope angle of the clearance surface is generally about 5-30°. In still yet another non-limiting design, the slope angle of the clearance surface is generally about 5-20°. In a further non-limiting design, the slope angle of the clearance surface is generally about 8-15°.

In still a further and/or alternative non-limiting embodiment of the invention, the improved cutting assembly includes one or more ultrasonic cutters to at least partially cut material that has been extruded through an extruder plate and/or die/extruder insert. When one or more of the cutting blades are used as an ultrasonic cutter, the ultrasonic frequency is at least about 20 Khz, typically about 22-100 Khz, and more typically about 25-75 kHz; however, it can be appreciated that other frequencies can be used.

In still a further and/or alternative non-limiting embodiment of the invention, the improved cutting assembly includes one or more lasers to at least partially cut material that has been extruded through an extruder plate and/or die/extruder insert.

In yet a further and/or alternative non-limiting embodiment of the invention, the improved cutting assembly can include one or more operational modes. In one non-limiting embodiment of the invention, one mode of the cutting assembly can be a manual mode wherein the speed of the cutting blade is set and maintained at a substantially constant speed throughout an extrusion process. In another and/or alternative non-limiting embodiment of the invention, one more of the improved cutting assembly can include an automatic mode wherein the speed of the cutting blade is adjusted based upon one or more set and/or detected parameters (e.g., current weather conditions, time of day, time of year, geographic location, type of extruder, extruder configuration, type of feeder for extruder, extruder plate temperature, auger blade temperature, material to be extruded temperature, material to be extruded flow rate, material to be extruded composition, material to be extruded density, time period required for material to move through one or more openings in extruder plate and/or die/extruder insert, time period required for material to move along auger blade at a certain auger blade rotation speed, auger blade rotation speed, blade cutter arrangement speed, extruder plate and/or die/extruder insert opening plug detection, product quality detection, extruder plate pressure detection, pressure in one or more openings of extruder plate and/or die/extruder insert, temperature in one or more openings of extruder plate and/or die/extruder insert, time of use for die/extruder inserts, time of use for extruder plate, time of use for die pins, time of use for auger blade, time of use for liner, type of liner, material of liner, shape of liner, extruder plate size, extruder plate opening configuration, extruder plate opening size, material of the extruder plate, thickness of the extruder plate, die/extruder insert size, die/extruder insert shape, die/extruder insert thickness, die/extruder insert material, die/extruder insert hole profile, type of insert pins, shape of insert pins, material of insert pins, type of auger blade, material of auger blade, size/shape of auger blade, type of feed material, type of cutting blades, number of cutting blades, cutting blade material, number of blades on wiper blade, type of wiper blade, spacing of wiper blade from extruder plate and/or die/extruder insert, wiper blade material, calculated and/or detected wear rates and/or information of one or more components of the extruder and/or cutting assembly, etc.) so as to obtain the desired cut material length and/or product quality of the extruded and cut material. As mentioned above, one or more of these parameters can be recorded by the cutter assembly and/or one or more other components of the extruder, manually and/or automatically imputed into the cutter assembly and/or one or more other components of the extruder, and/or transmitted to and/or received from a remote location. In one non-limiting aspect of this embodiment, the pressure of the material prior to and/or as the material is inserted through one or more extruder plate and/or die/extruder insert openings is detected in one or more openings and/or regions about the one or more openings of the extruder plate and/or die/extruder insert so as to at least partially control the rotation speed of the cutting blade arrangement on the cutting assembly. In another and/or alternative non-limiting aspect of this embodiment, the temperature of the material prior to and/or as the material is inserted through one or more openings in the extruder plate and/or die/extruder insert is detected in one or more of the openings and/or regions about the one or more openings of the extruder plate and/or die/extruder insert so as to at least partially control the rotation speed of the cutting blade arrangement on the cutting assembly. In still another and/or alternative one non-limiting aspect of this embodiment, the velocity of the material prior to and/or as the material is inserted through one or more die openings in the extruder plate and/or die/extruder insert is detected in one or more of the openings and/or regions about the one or more openings of the extruder plate and/or die/extruder insert so as to at least partially control the rotation speed of the cutting blade arrangement on the cutting assembly. In yet another and/or alternative one non-limiting aspect of this embodiment, the average cut product length of the extruded and cut material is actually detected and/or calculated so as to at least partially control the rotation speed of the cutting blade arrangement on the cutting assembly. In still yet another and/or alternative one non-limiting aspect of this embodiment, the improved cutting assembly can include one or more adjustable parameters to adjust the length of the extruded material being cut so as to obtain a desired length of the cut material, calibrate one or more detected parameters (e.g., pressure, etc.) so that the speed control for the cutting blade is properly adjusted based upon one or more detected parameters, and/or adjust the delay so as to delay the adjustment of the speed of the cutting blade to account for the time period in which the material travels into and through an extruder plate and/or die/extruder insert, etc.

In still a further and/or alternative non-limiting embodiment of the invention, the improved cutting assembly can include one or more detectors (e.g., camera [video camera, standard camera, etc.], light sensor, radio frequency sensor, sound wave sensor, electromagnetic wave sensor for non-visible electromagnetic waves [X-rays, inferred light, ultraviolet light, gamma waves, etc.], etc.) to monitor the length of the extruded material prior to, during, and/or after the cutting process. This monitored information can be used to provide data on the quality of the material being cut, the percentage of the material being cut that is within an acceptable length, and/or to control the speed of the cutting blade to better obtain a desired cut length of the material. As can be appreciated, the detection of the length of the cut material can be monitored at the location of the cutting blade and/or at some period after the material has been cut (e.g., when the cut material is being conveyed to a drying location, etc.). In one non-limiting embodiment of the invention, a video monitor or other device can be used to monitor the material being cut and/or conveyed and a software program or other type of statistical device can be used to determine the length of the cut product, and then send such information to one or more controllers (e.g., PWC, etc.) to be used to adjust the speed of the blade based upon the determined length for the cut product and/or provide quality control data regarding the cut product. In another and/or alternative non-limiting embodiment of the invention, a closed loop system could be used to further simplify the control system (e.g., reduce the number of control switches an operator uses) and/or facilitate in obtaining the desired product quality.

In yet a further and/or alternative non-limiting embodiment of the invention, the improved cutting assembly can include various features used to deactivate the cutting blade, especially when one or more dies are being replaced. It is not uncommon that the extruder plate, die/extruder insert, insert pin, auger blade, wiper blade, liner, etc. has to be periodically serviced and/or replaced after a run by the extruder. A run may be as short as a few minutes or as long as several days or months. When one or more components are removed and/or serviced, it is important not to inadvertently activate the cutting blades during such operation, wherein such operation could result in the damage to the blades. The improved cutting assembly of the present invention can include one or more detectors, switches, etc. which fully or partially deactivates one or more components of the cutting assembly during repair and/or maintenance of the cutting assembly and/or one or more components of the extruder so as to reduce or prevent damage to one or more components of the cutting assembly.

In still yet a further and/or alternative non-limiting embodiment of the invention, the improved cutting assembly can be ergonomically designed so as to facilitate in the operation of the cutting assembly and/or to facilitate in the repair and maintenance of the cutting assembly. In one non-limiting embodiment of the invention, the cutting assembly allows the operator to easily access various connectors, bolts, switches, etc. which are required for periodic operation and/or maintenance of the cutting assembly. As a result of this ergonomic design, the need for special tools is reduced or eliminated and/or the operation and/or maintenance of the cutting assembly is simplified, thereby reducing the time and/or cost of maintenance and repair.

In another and/or alternative non-limiting embodiment of the invention, the extruder plate and/or die/extruder insert can be designed to reduce or prevent improper orientation of such components on the extruder. The improper orientation of a die/extruder insert in an extruder plate can result in premature plugging or clogging of the openings in the die/extruder insert, damage to the die/extruder insert, damage to the extruder plate, damage to the cutter assembly, inferior extruded product, etc. The extruder plate and/or die/extruder inserts of the present invention can be designed such that the die/extruder inserts can only be inserted one way into the one or more openings in the extruder plate. As such, the improper placement of a die/extruder insert on an extruder plate is essentially eliminated. In one non-limiting embodiment of the invention, the extruder plate and/or die/extruder insert includes an orientation structure that is designed to at least partially control the orientation of the die/extruder insert relative to an opening in the extruder plate for proper insertion of the die/extruder insert into the opening in the extruder plate. Such orientation structure can include, but no limited to, a rib, a groove, a tab, a flange, a taper region, a slot, etc. The one or more orientation structures on the extruder plate and/or die/extruder insert in essence function like a key so that the die/extruder insert is properly inserted into the opening in the extruder plate. In one non-limiting embodiment of the invention, the die/extruder insert includes a position tab on or closely adjacent to a top face of the die/extruder insert. In this non-limiting embodiment, the position tab is designed to inhibit or prevent the top face of the die/extruder insert to be inserted as the leading end into the opening in the extruder plate. As such, the one or more position tabs on the die/extruder insert ensure that the bottom face of the die/extruder insert is first inserted into the opening in the extruder plate. The front face of the extruder plate may also include one or more position tab landings designed to receive the one or more position tabs on the die/extruder insert; however, this is not required. As can be appreciated, the use of a position tab is just of many different orientation structures that can be included on the die/extruder insert and/or extruder plate to assure the proper insertion of the die/extruder insert into an opening in the extruder plate.

In another and/or alternative non-limiting embodiment of the invention, the extruder plate and/or die/extruder insert can be designed to reduce or prevent improper loosening of such components on the extruder. After a die/extruder insert is inserted in an extruder plate, the die/extruder insert can fall out of the extruder plate when installing the extruder plate onto the extruder. In order to avoid such a problem, the die/extruder inserts can be designed to include one or more friction tabs that are designed to inhibit or prevent the die/extruder insert from falling out of the extruder plate one the die/extruder insert is inserted into the extruder plate. The friction tabs can be positioned on one or more of the sides of the die/extruder inserts. One or more friction tabs can be present on one or more of the sides of the die/extruder inserts. One or more of the friction tabs can extend the partial or full with of the die/extruder inserts. One or more of the friction tabs can includes a tapered profile; however, this is not required. The top of the one or more friction tabs can be flat, rounded, grooved, etc. When two of more friction tabs are positioned on a side of the die/extruder insert, the tabs can be spaced evenly apart from one another and the two ends; however, this is not required. The one or more friction tabs generally have a length that extends along the width of the die/extruder insert that is equal to or less than the width of the die/extruder insert. Generally the ratio of the length of the friction tab to the width of the die/extruder insert is about 0.05-1:1, typically about 0.1-1:1, more typically about 0.25-1:1, even more typically about 0.4-1:1, and still even more typically about 0.5-1:1. When the die/extruder insert includes both a friction tab and a positioning tab, the length of one or more of the friction tabs is generally greater than the width of the positioning tab; however, this is not required.

One non-limiting object of the present invention is the provision of a method and process for forming more uniform cut lengths of an extruded product.

Another and/or alternative non-limiting object of the present invention is the provision of a method and process for a cutting assembly that can be used to improve the forming more uniform cut lengths of an extruded product.

Still another and/or alternative non-limiting object of the present invention is the provision of a method and process for a cutting assembly that can vary the speed of the cutting blade based on or more detected parameters and/or set variables to improve the forming more uniform cut lengths of an extruded product.

Yet another and/or alternative non-limiting object of the present invention is the provision of a method and process for an extruder system that includes a wiper blade assembly to inhibit or prevent plugging or clogging of one or more die openings.

Still yet another and/or alternative non-limiting object of the present invention is the provision of a method and process for an extruder system that includes angular wiper blades to inhibit or prevent plugging or clogging of one or more die openings.

A further and/or alternative non-limiting object of the present invention is the provision of a method and process for a cutting assembly that includes a unique shaped and angular cutting blades to improve the forming more uniform cut lengths of an extruded product.

Still a further and/or alternative non-limiting object of the present invention is the provision of a method and process for an extruder system that includes an improved auger blade to improve the forming more uniform cut lengths of an extruded product.

Yet a further and/or alternative non-limiting object of the present invention is the provision of a method and process for an extruder system that includes an orientation structure on an extruder plate and/or a die/extruder insert so as to facilitate in the proper orientation of the die/extruder insert in the extruder plate.

Still yet a further and/or alternative non-limiting object of the present invention is the provision of a method and process for a die/extruder insert to include one or more friction tabs that inhibit or prevent the die/extruder insert from inadvertently falling out of a die plate.

These and other advantages will become apparent to those skilled in the art upon the reading and following of this description taken together with the accompanying drawings.

BRIEF DESCRIPTION OF THE FIGURES

Reference may now be made to the drawings, which illustrate various embodiments that the invention may take in physical form and in certain parts and arrangements of parts wherein:

FIG. 36A-F is a die/extruder insert that can be used in the present invention;

DETAILED DESCRIPTION OF THE INVENTION

Figure 1:
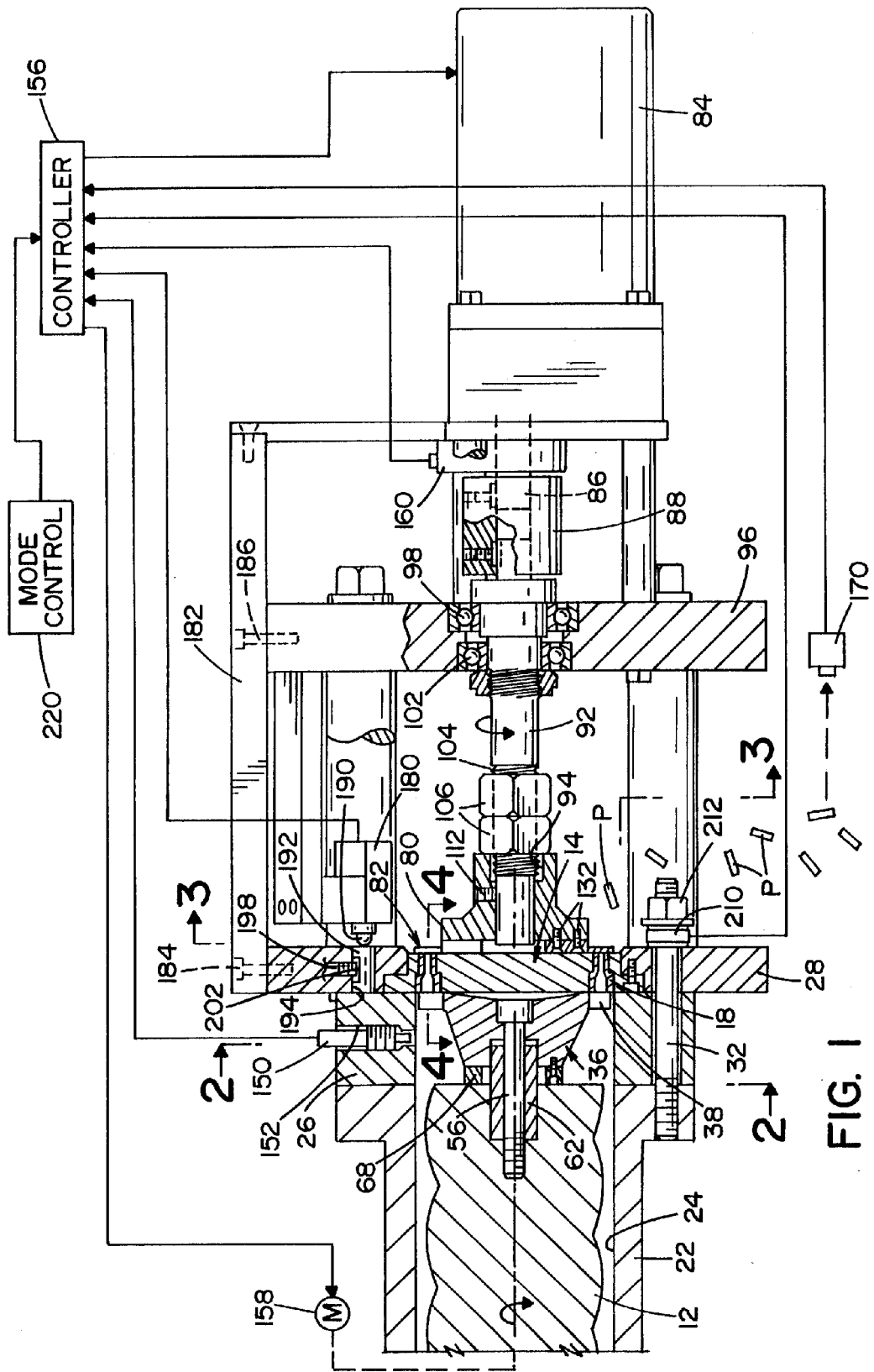
FIG. 1 is a side elevation view, partially in cross section, of a cutting assembly according to an embodiment of the present invention.

Referring now to the drawings wherein the showing is for the purpose of illustrating preferred embodiments of the invention only and not for the purpose of limiting the same, FIG. 1 illustrates one non-limiting configuration of an extruder system and cutter assembly in accordance with the present invention. Specifically, FIG. 1 illustrates a cross-section view of the front end portion of an extruder system and the cross-section view of a cutter assembly. With reference to the extruder system, there is illustrated a portion of an auger blade 12 that is designed to move material, not shown, to be extruded toward an extruder plate 14. The extruder plate 14 is illustrated as having a plurality of die openings 16 that are each designed to receive a die/extruder insert 18. The material that is transported by the auger blade is designed to become an extruded product such as, but not limited to, a catalyst. As can be appreciated, the present invention can be used to form many types of products other than catalyst. Although not shown, the opposite end of the auger blade is connected to a motor that is designed to rotate the auger blade. The use of such a motor and the configuration of the motor and the necessary connection between the motor and auger blade are well known in the art, thus will not be further described. Also not shown is the feed section for the auger blade that feeds material to the auger blade which in turn transports the material to the extruder plate. Many different auger blade feed arrangements can be used, and many of these feed arrangements are well known in the art and will not be further described.

Figure 20:
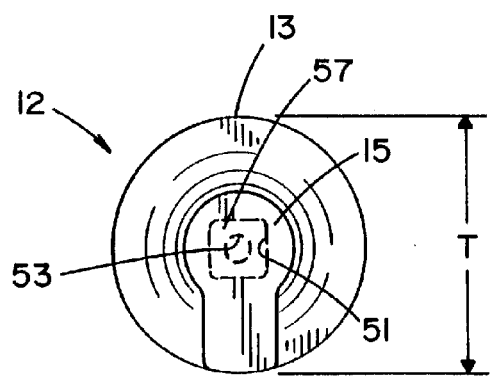
FIG. 20 is an end view of the auger blade of FIG. 19.
Figure 21:
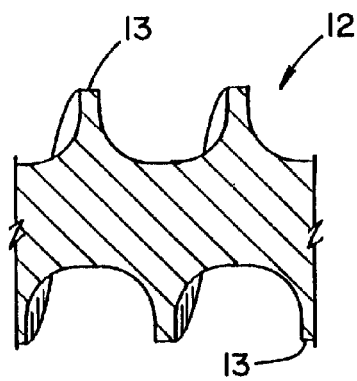
FIG. 21 is a cross-sectional view taken along line 21-21 of FIG. 19.
Figure 22:
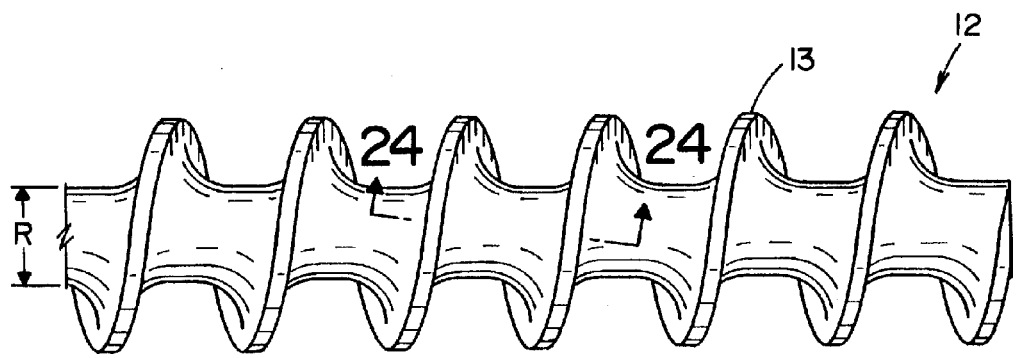
FIG. 22 is an elevation view of another non-limiting single continuous flight auger blade that can be used in the present.
Figure 23:
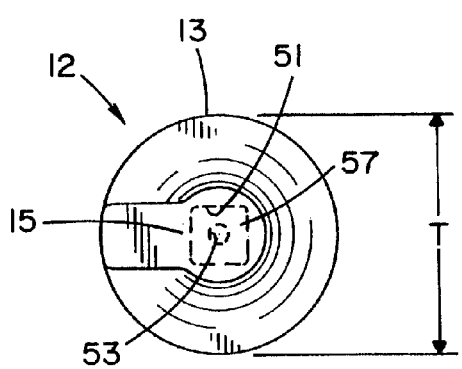
FIG. 23 is an end view of the auger blade of FIG. 22.
Figure 24:
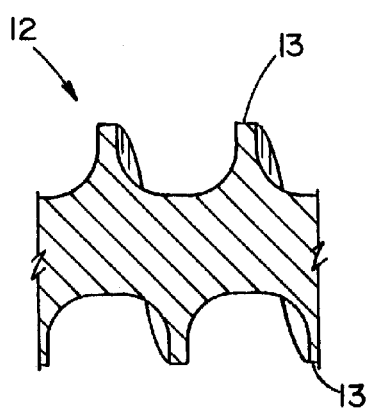
FIG. 24 is a cross-sectional view taken along line 41-24 of FIG. 22.
Figure 25:
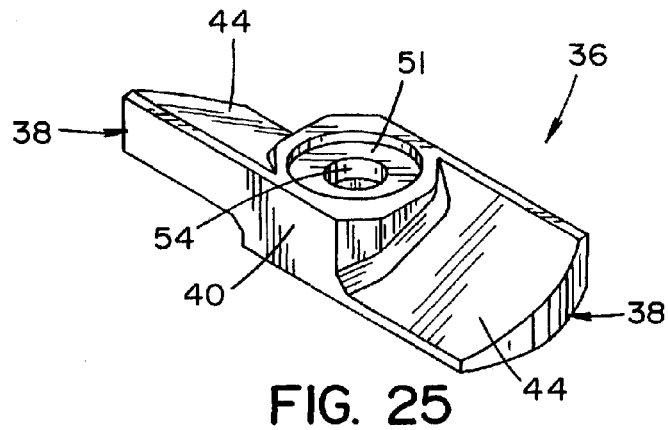
FIG. 25 is an elevation view of a non-limiting two blade wiper blades that can be used in the present invention.
Figure 26:
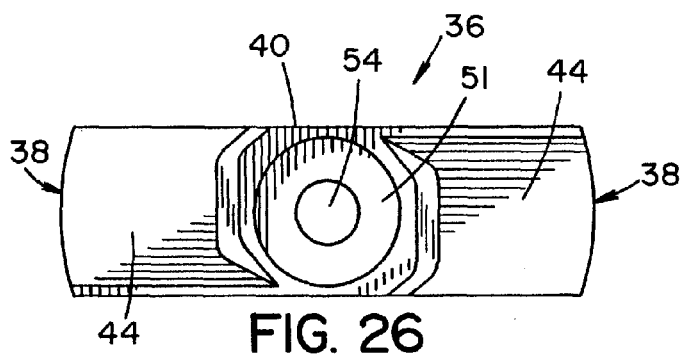
FIG. 26 is a top plan view of a wiper blade shown in FIG. 25.
Figure 27:
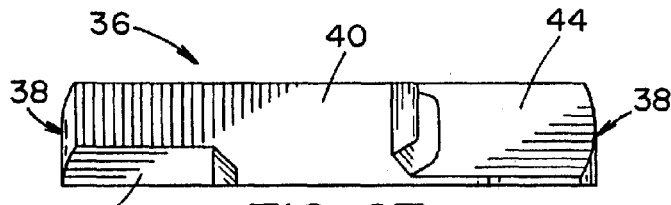
FIG. 27 is a side view of a wipe blade shown in FIG. 25.
Figure 28:
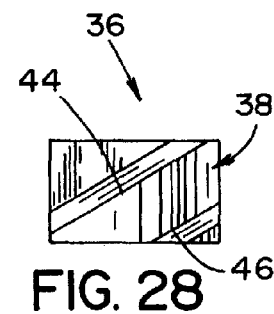
FIG. 28 is an end view of a wiper blade shown in FIG. 25.
Figure 29:
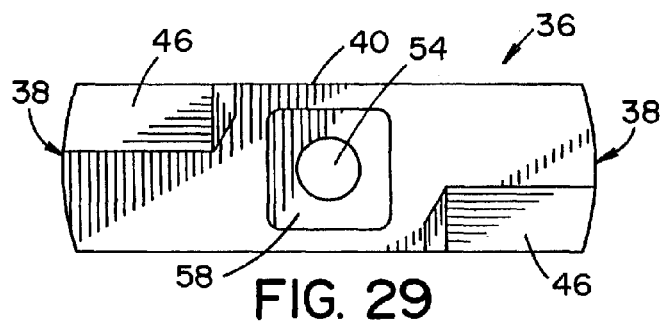
FIG. 29 is a bottom plan view of a wiper blade shown in FIG. 25.
Figure 30:
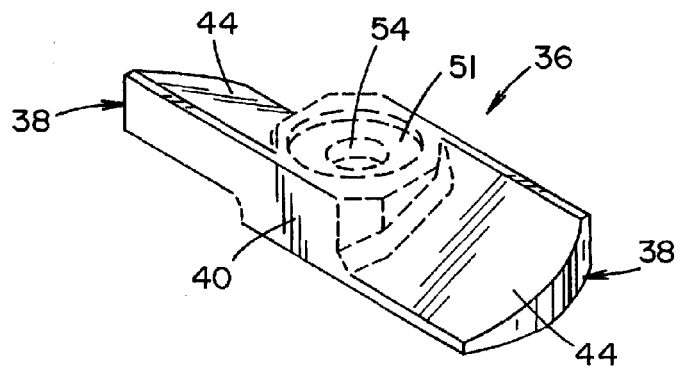
FIG. 30 is an elevation view of another non-limiting two blade wiper blade that can be used in the present invention.
Figure 31:
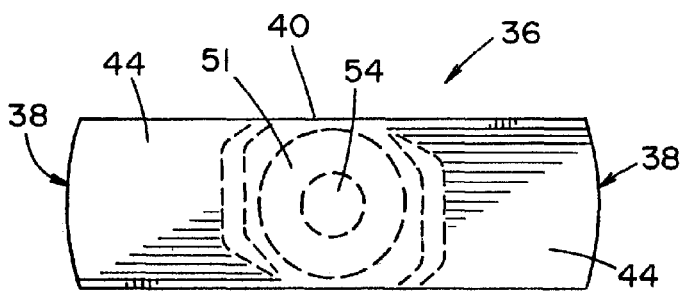
FIG. 31 is a top plan view of the wiper blade shown in FIG. 30.
Figure 32:
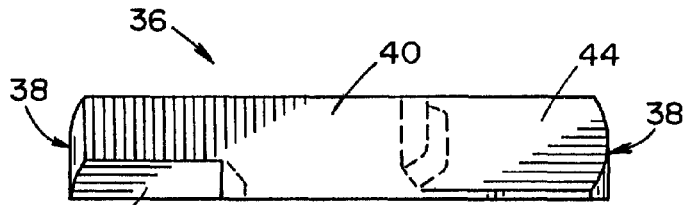
FIG. 32 is a side view of the wipe blade shown in FIG. 30.
Figure 33:
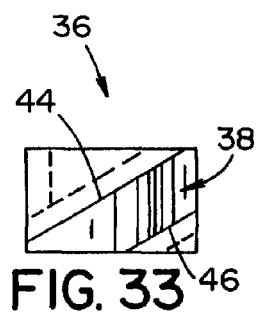
FIG. 33 is an end view of the wiper blade shown in FIG. 30.
Figure 34:
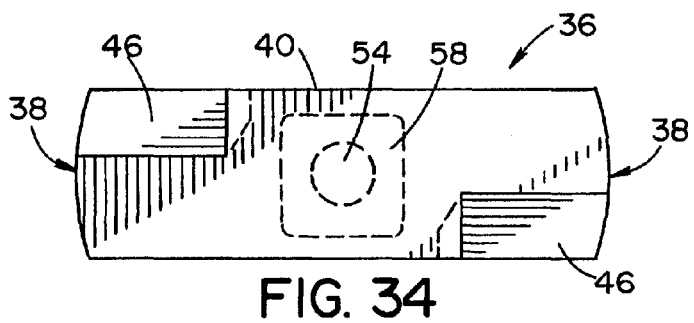
FIG. 34 is a bottom plan view of the wiper blade shown in FIG. 30.
Figure 35A:
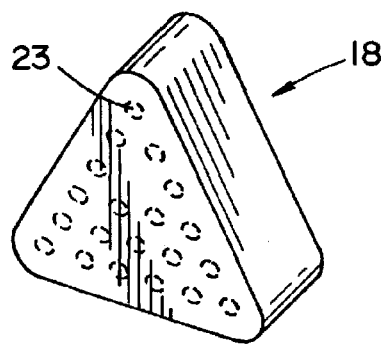
FIG. 35A-E is a die/extruder insert that can be used in the present invention.
Figure 35C:
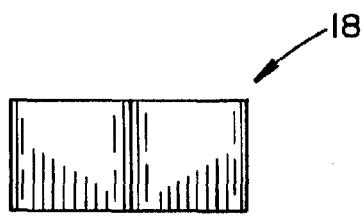
Figure 35B:
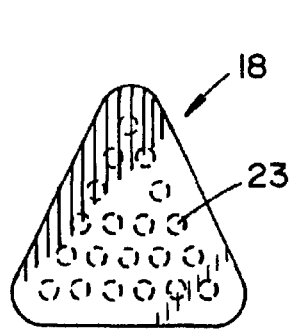
Figure 35D:
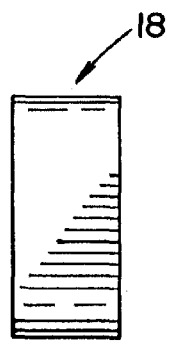
Figure 35E:
Figure 37A:
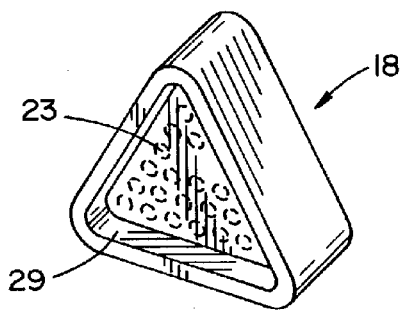
FIG. 37A-G is a die/extruder insert that can be used in the present invention.
Figure 37C:
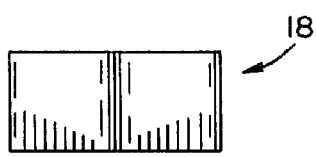
Figure 37G:
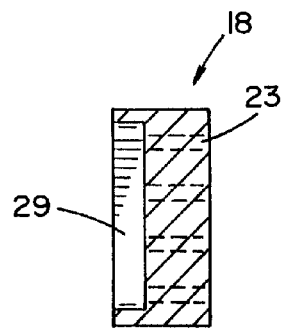
Figure 37B:
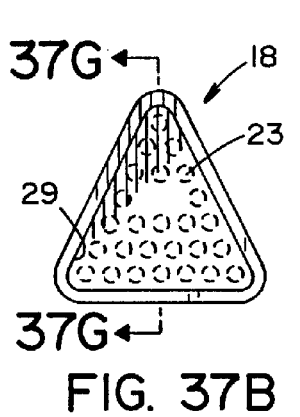
Figure 37D:
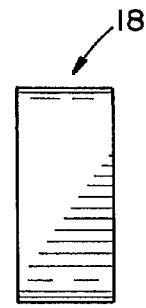
Figure 37E:
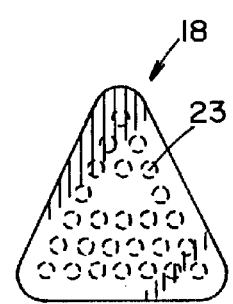
Figure 37F:
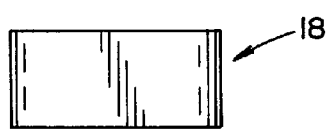

Referring again to FIG. 1, the auger blade that is used in the extruder system can have many different configurations. Two non-limiting configurations for the auger blade are a single flight configuration or a dual flight configuration. Auger blade 12 can have a unique single continuous single flight configuration such as, but not limited to, the auger blades illustrated in FIGS. 19-24. The continuous single flight auger blade 12, when used, can facilitate in reducing pressure variations as the material moves toward the inner face of the extruder plate and into the one or more die/extruder inserts positioned at least partially in the extruder plate. As illustrated in FIGS. 19, 21, 22 and 24, the single uninterrupted flight auger blade has a generally uniform cross-sectional shape and size along the longitudinal length of the auger blade. The region between the blades has a generally U-shaped configuration as best illustrated in FIGS. 21 and 24; however, it can be appreciated that other configurations can be used. The auger blade has a blade 13 that has an average pitch of about 3-4 inches. The ratio of the average maximum diameter T of blade 13 of the single uninterrupted flight auger blade to the average pitch of blade 13 is about 1.3-1.7. The auger blade also has a root thickness R. The ratio of the average maximum diameter T of blade 13 to the average root thickness R of the auger blade 12 is about 2.2-2.9. As can be appreciated, other dimensions of the auger blade can be used. Referring now to FIGS. 20 and 23, the front end of auger blade includes a connection arrangement 15 that is designed to secure a wiper blade to the front end of the auger blade. When a wipe blade is not to be connected to the front end of the auger blade, the connection arrangement can be eliminated. The connection arrangement can be designed in many different ways to facilitate in the connection of a wiper blade to the front end of the auger. In one non-limiting arrangement, the connection arrangement can include a cavity 51 and a threaded opening 53 as illustrated in FIGS. 1, 20 and 23 that are used to facilitate in the connection of the wiper blade to the auger blade. The auger blade 12 is housed in an auger housing or liner 22 that defines a generally cylindrical opening 24 through which the material to be extruded travels. As can be appreciated, other housing or liner shapes can be used. The use of an auger housing or liner in conjunction with an auger blade for various types of extruder applications is well known in the art, thus will not be further described.

Figure 38A:
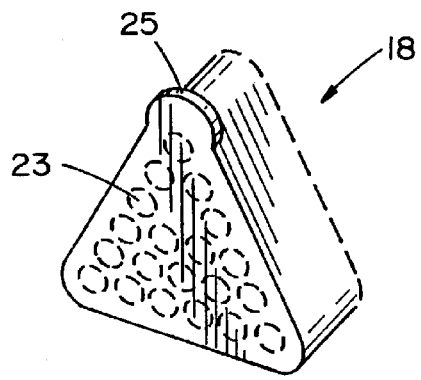
FIG. 38A-L is a die/extruder insert that can be used in the present invention.
Figure 38C:
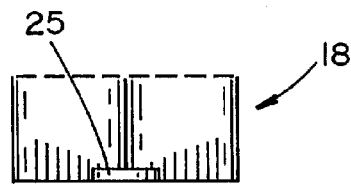
Figure 38B:
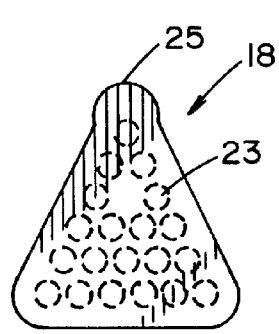
Figure 38D:
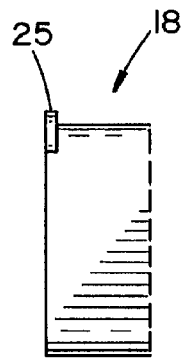
Figure 38F:
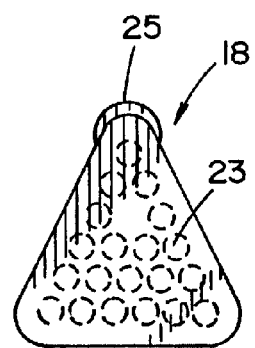
Figure 38E:
Figure 38G:
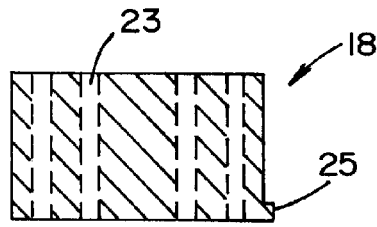
Figure 38H:
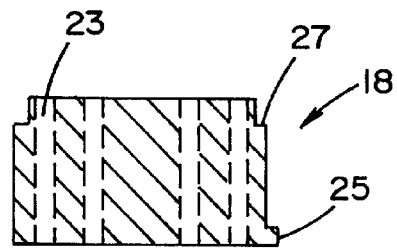
Figure 38I:
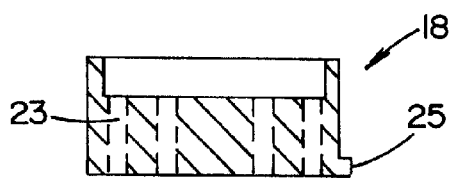
Figure 38J:
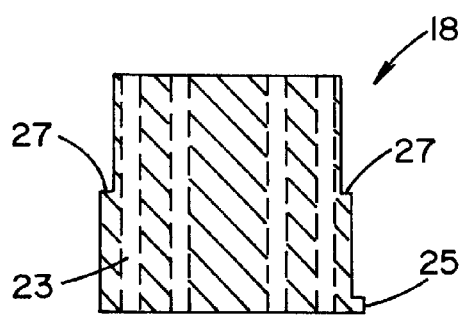
Figure 38K:
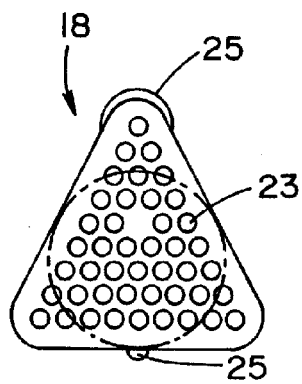
Figure 38L:
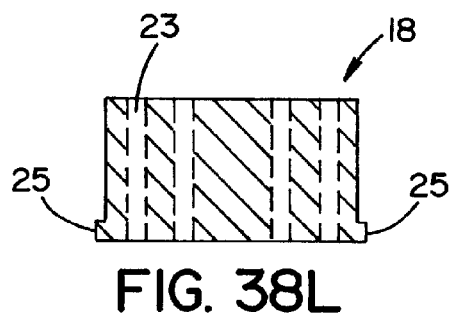
Figure 39A:
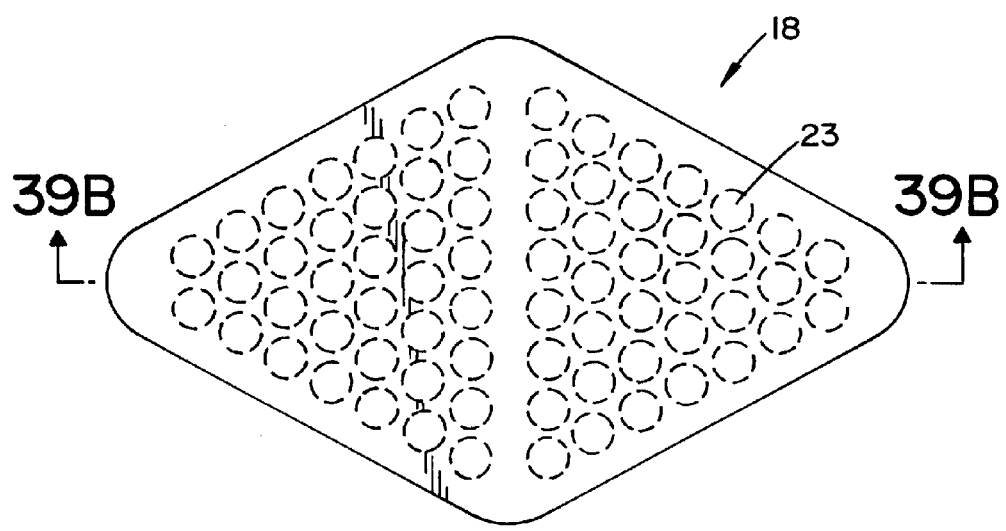
FIG. 39A-C is a die/extruder insert that can be used in the present invention.
Figure 39B:
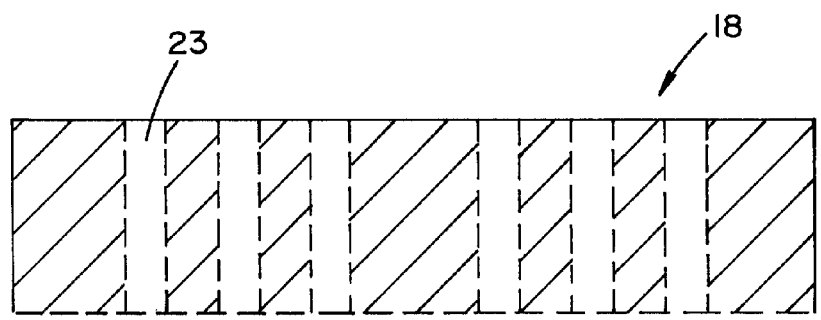
Figure 39C:
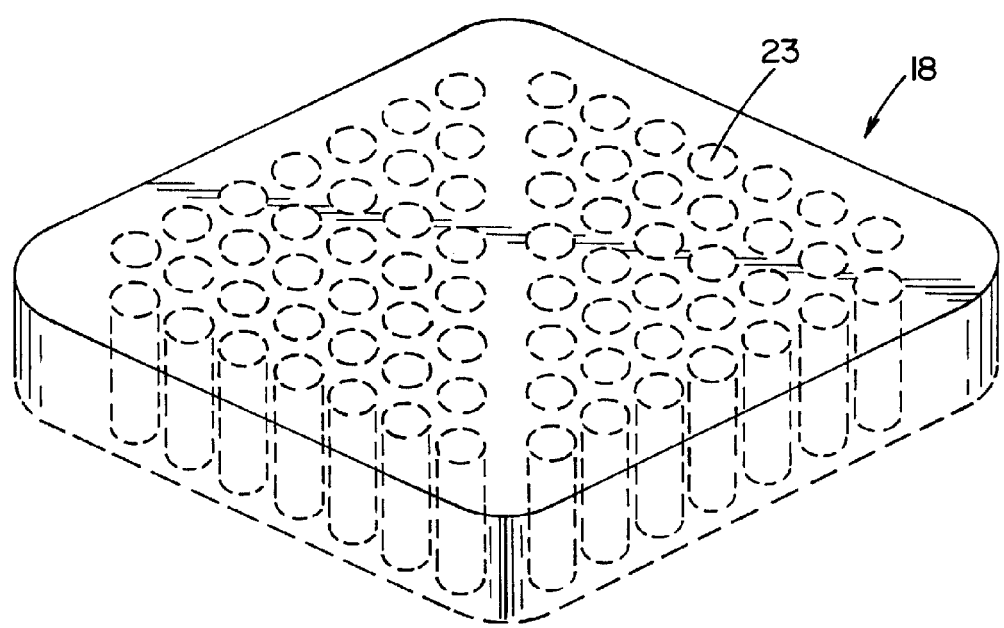
Figure 40A:
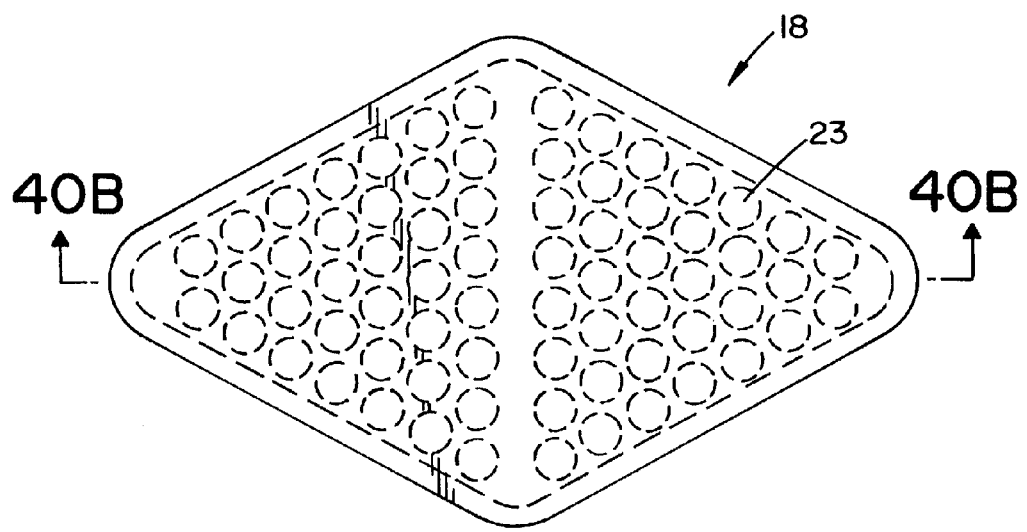
FIG. 40A-C is a die/extruder insert that can be used in the present invention.
Figure 40B:
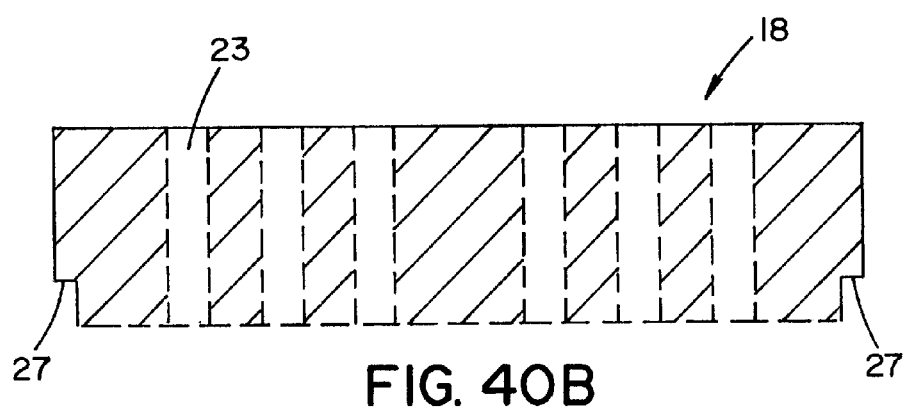
Figure 40C:
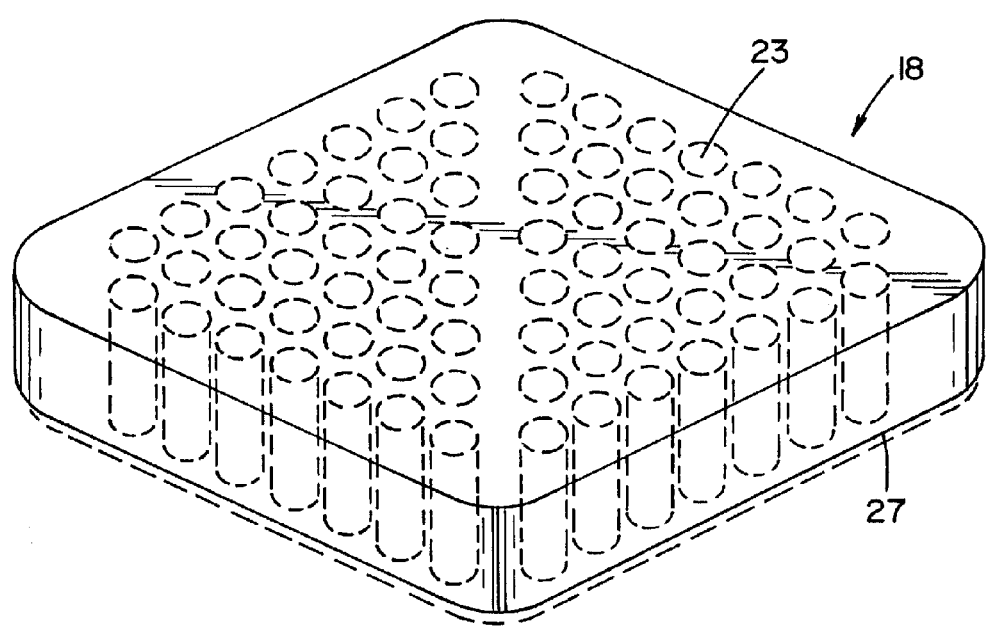
Figure 41A:
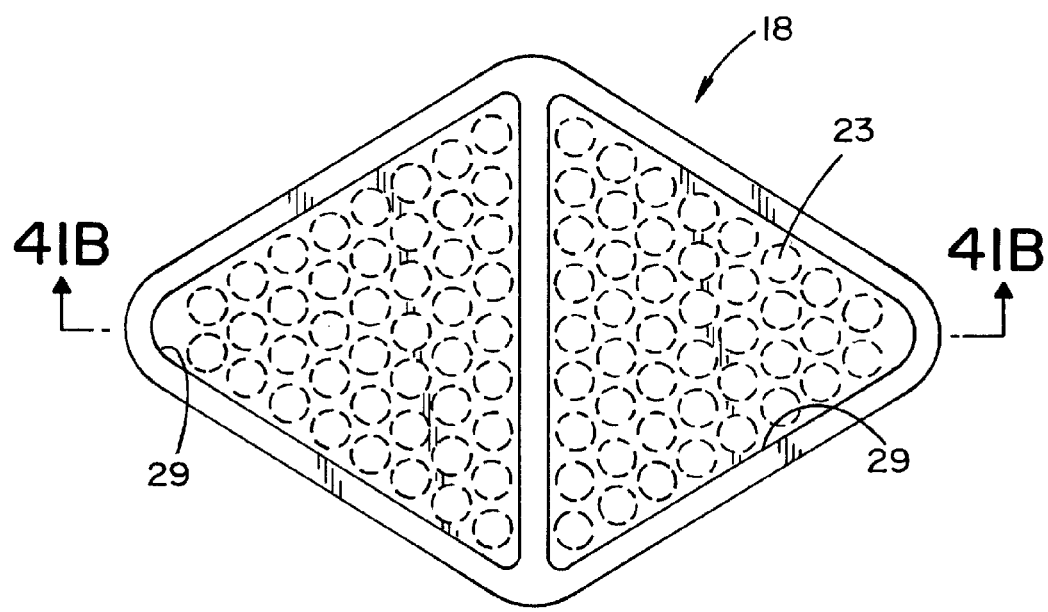
FIG. 41A-C is a die/extruder insert that can be used in the present invention.
Figure 41B:
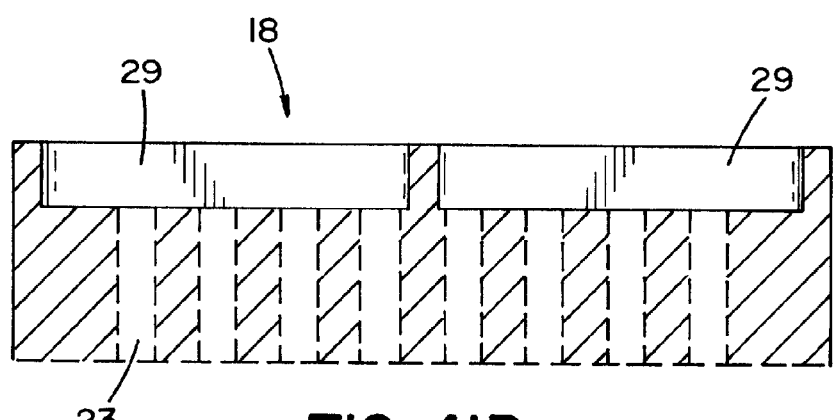
Figure 41C:
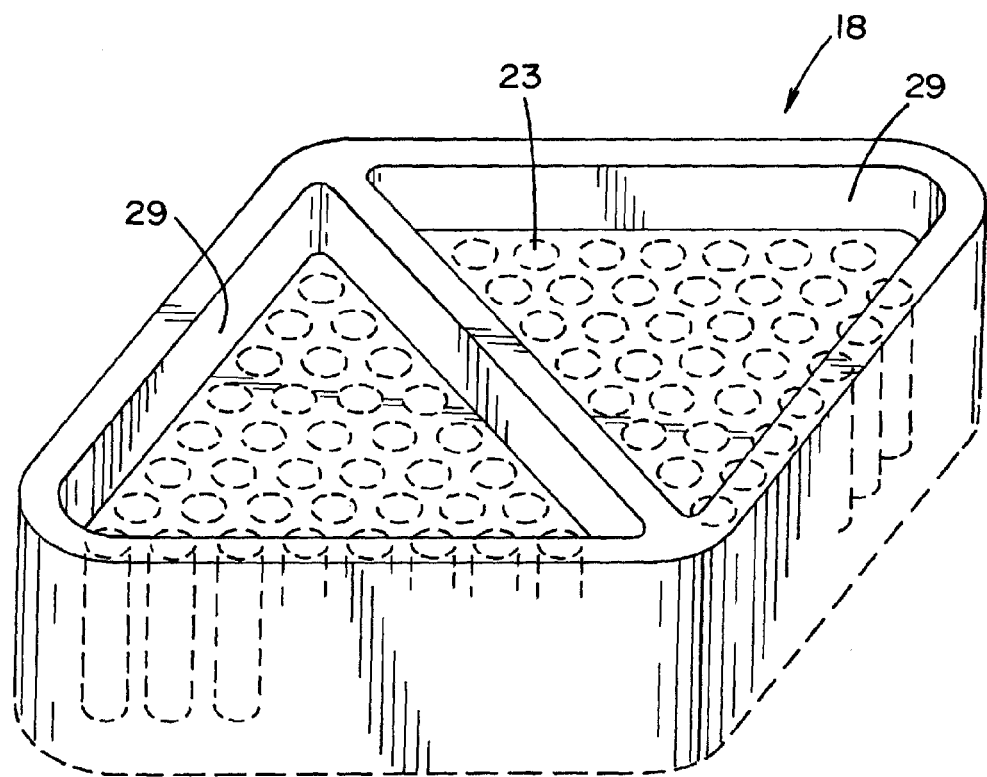
Figure 42A:
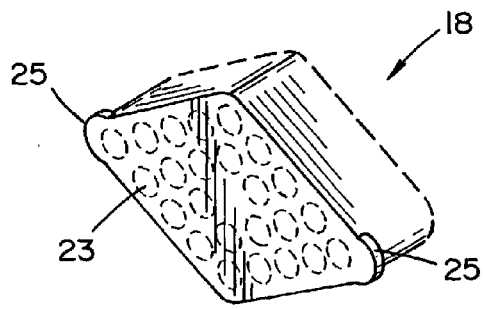
FIG. 42A-I is a die/extruder insert that can be used in the present invention.
Figure 42C:
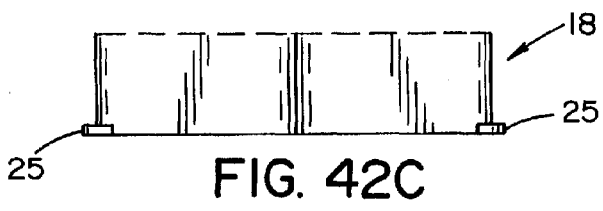
Figure 42B:
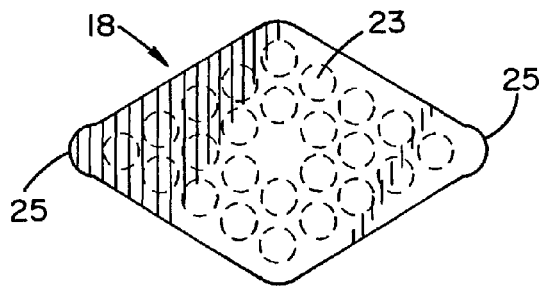
Figure 42D:
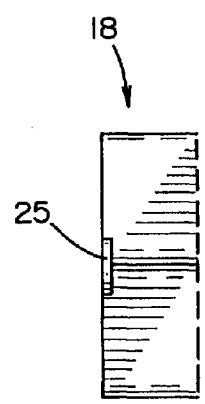
Figure 42E:
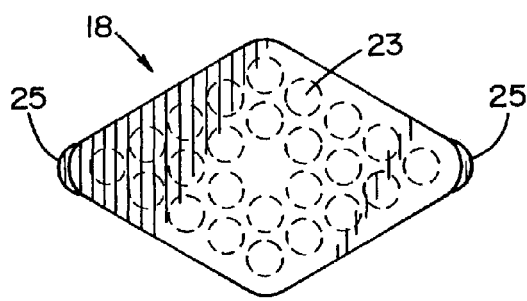
Figure 42F:
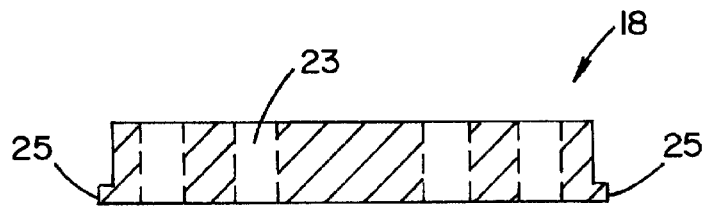
Figure 42G:
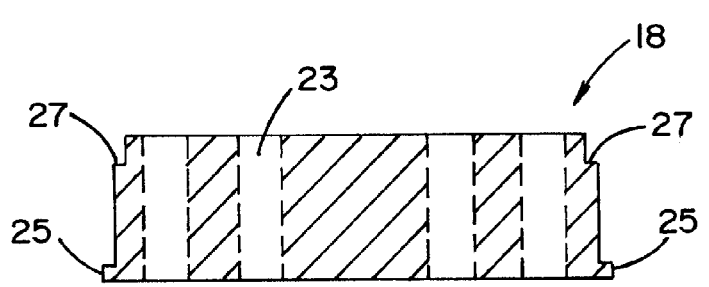
Figure 42H:
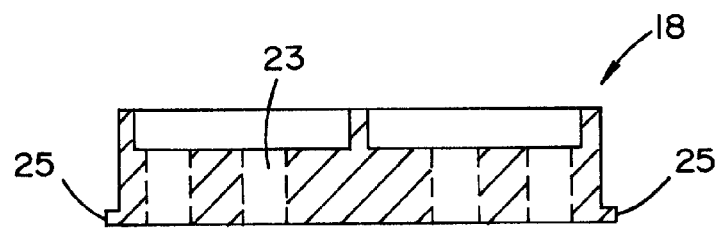
Figure 42I:
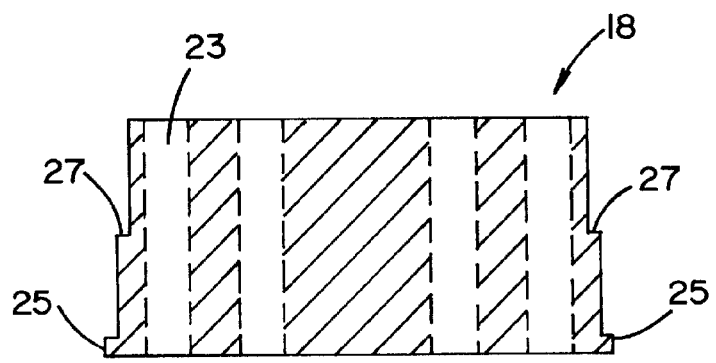

Extruder plate 14 in FIG. 1 is a generally circular plate having a plurality of insert openings 16 that are formed in the extruder plate. As can be appreciated, the extruder plate need not be circular (e.g., oval, polygonal, etc.). The insert openings 18 in the extruder plate can have a variety of configurations and/or shapes. As illustrated in FIGS. 43 and 44, the insert openings can have a generally triangular shape or diamond shape. As can be appreciated other or additional insert shapes can be used (e.g., oval, circular, square, pentagonal, hexagonal, rectangular, rhombus shaped, trapezoidal, etc.). As illustrated in FIGS. 43 and 44, the size and shape of the insert openings on each extruder plate is generally the same; however, this is not required. As such, an extruder plate can have different sized openings and/or different shaped openings on the extruder plate. As illustrated in FIGS. 43 and 44, several configurations of the triangular shape or diamond shape openings are illustrated on each extruder plate. These few configurations are merely exemplary, and it can be appreciated that other opening configuration and/or other numbers of opening can be used on the extruder plate. The die inserts can also have a variety of interior configurations, not shown, to facilitate in receiving certain shaped die/extruder inserts. The extruder plates can also include one or more mount holes 17 that are designed to receive a bolt and/or other type of connector to facilitate in mounting the extruder plate to the extruder system. The mount holes are illustrated by dotted lines to indicate that such mounting holes are optional. The front and/or back face of the extruder plate can have one or more recessed portions; however, this is not required. Such recessed portions are illustrated by the dotted circular line 19 in FIGS. 43A-H, 43J, 43L, 43M, 43O, 44A-I, 44K, and 44L. The circular line 19 is dotted to indicate that this recess portion is optional. The extruder plates can include one or more orientation structures 21 that are designed to facilitate in the proper placement of the die/extruder insert 18 into die opening 16. As illustrated in FIGS. 44A-L, each of the triangular shaped openings 16 include a landing structure that forms the orientation structure 21 on the extruder plate. The landing structure is a small recess region on the apex on one of the triangular shaped openings. This landing structure is designed to receive a tab structure 25 on a die/extruder insert that is similar to the one illustrated in FIG. 38. This tab structure 25 is the orientation structure on the die/extruder insert. As can be appreciated, the tab structure on the die/extruder insert and the landing structure on the extruder plate represents just one of many different types of orientation structures that can be used on the die/extruder insert and/or the extruder plate to facilitate in the proper insertion of the die/extruder insert into the die opening of the extruder plate. For example, many other shaped tabs and/or landing configurations can be used (e.g., polygonal shaped, oval shaped, star shaped, etc.). Furthermore, the die/extruder insert and/or the extruder plate can include more than one orientation structure. For example, the die/extruder insert could include two or three tabs on each of the apexes of the triangular insert and the extruder plate could include two or more landings in one or more die openings to accommodate the additional number of tabs on the die/extruder insert. In addition, one or more tabs could be additionally or alternatively located between the apexes of the die/extruder insert (See for example FIGS. 38K-L) and in corresponding positions on the die openings in the extruder plate. The orientation structure can also or alternatively take on other or additional forms such as but not limited to, a) tapered regions on the die/extruder insert and/or the extruder plate, b) ledges or landings positioned between the front and back face of the die/extruder insert and/or the extruder plate, c) ribs, grooves, slots, and the like on the die/extruder insert and/or the extruder plate, and/or any other shape sensitive structure on the die/extruder insert and/or the extruder plate that is designed to facilitate in the proper insertion of the die/extruder insert into the die opening of the extruder plate. The more than one orientation structures can also or alternatively include visual markings (e.g., code codes, arrows, lines, etc.) on die/extruder insert and/or the extruder plate that is designed to facilitate in the proper insertion of the die/extruder insert into the die opening of the extruder plate.

Referring again to FIGS. 44A-L, the partially circular recess has a depth that is typically about the same thickness of the tab 25 in the die/extruder insert 18 of FIG. 38 so that when the die/extruder insert is properly inserted into die opening 16, the tab 25 at least partially fits into the partially circular recess. As can be appreciated, the depth of the partially circular recess 21 can be greater than or less than the thickness of tab 25. When the die/extruder is not properly placed in die opening 16, a) tab 25 does not become at least partially positioned in the partially circular recess and/or b) most of the die/extruder insert does not fit into the die opening. For instance, when the die/extruder insert in attempted to be inserted upside down in die opening 16, the tab does not allow the inserted to pass the upper side of the die opening or the landing of the partially circular recess. As such little, if any, portion of the die/extruder insert can be inserted into the die opening when the die/extruder insert is attempted to be inserted upside down in the die opening. When the die/extruder insert is not portioned upside down, but the tab is not properly oriented with the partially circular recess, the tab contacts the upper surface of the die opening thereby making it obvious to an operator that the insert has not been properly oriented in the die opening.

Although FIGS. 44A-L has been described above for use with a die/extruder insert that includes a tab, it can be appreciated that die/extruder inserts that do not include tabs (See FIGS. 35-37) can also be used in extruder plate 44A-L that includes partially circular recesses on the insert openings. Furthermore, it can be appreciated, that although the extruder plate in FIG. 44A-L includes a partially circular recess, the extruder plate could be designed to not include such partially circular recess so as to only be used with die/extruder inserts that do not include tabs such as, but not limited to, die/extruder inserts illustrated in FIGS. 35-37.

Figure 43A:
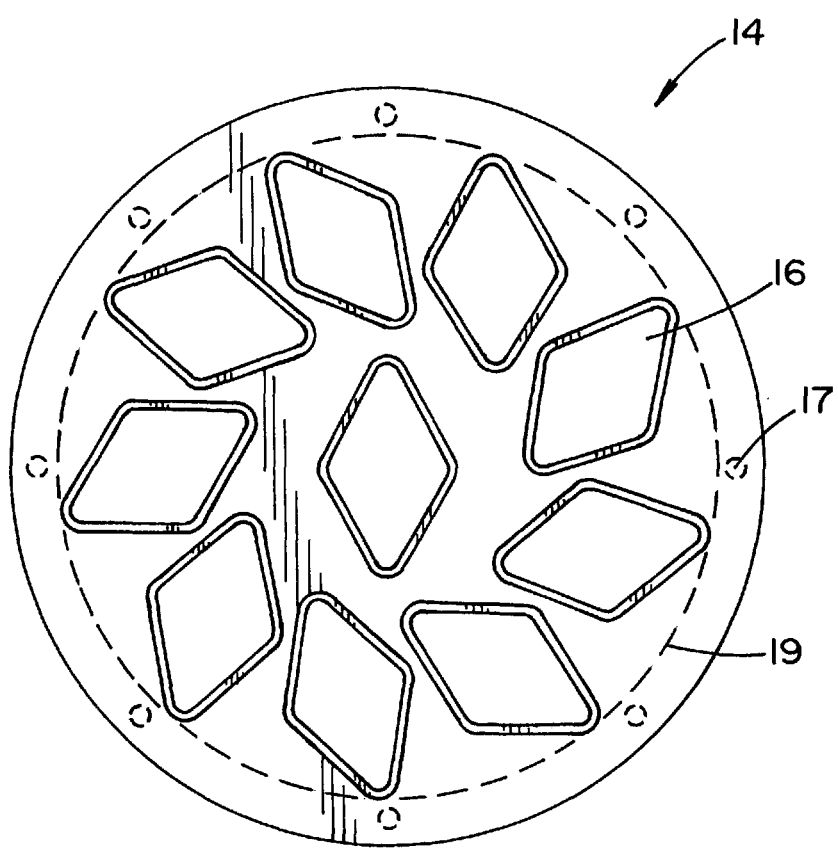
FIG. 43A-O are extruder plates that can be used in the present invention.
Figure 43B:
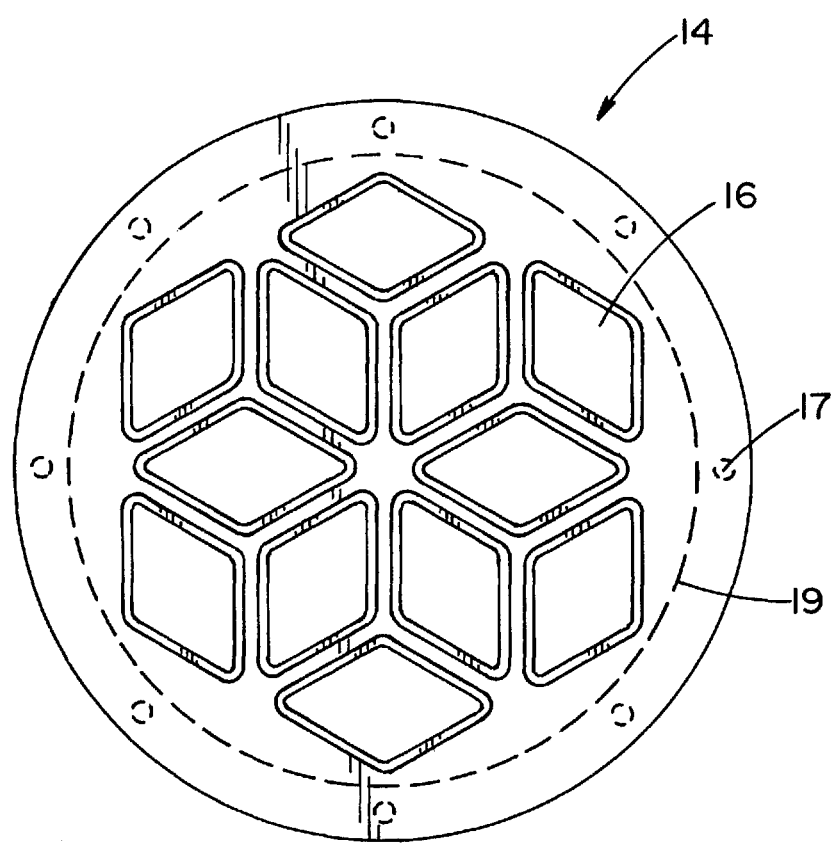
Figure 43C:
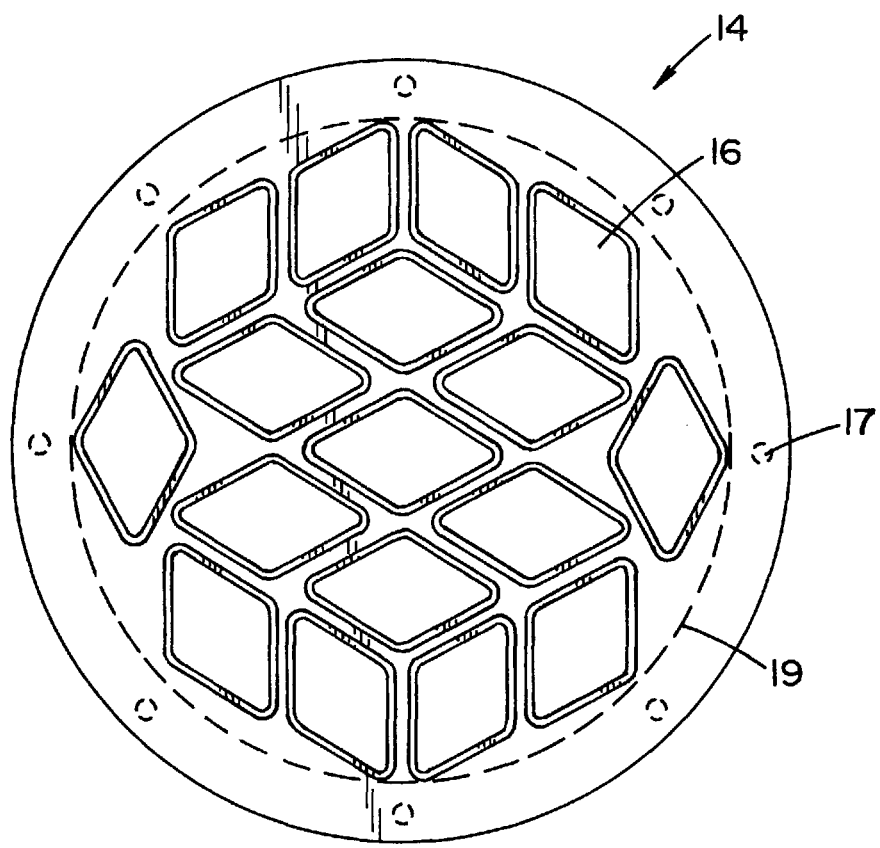
Figure 43D:
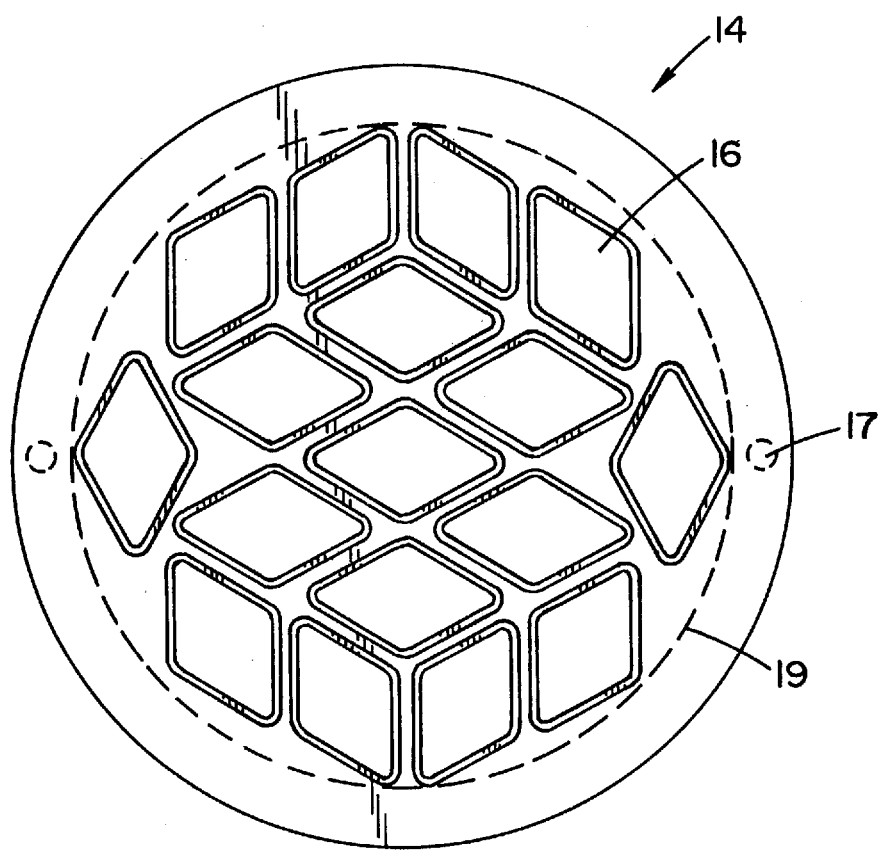
Figure 43E:
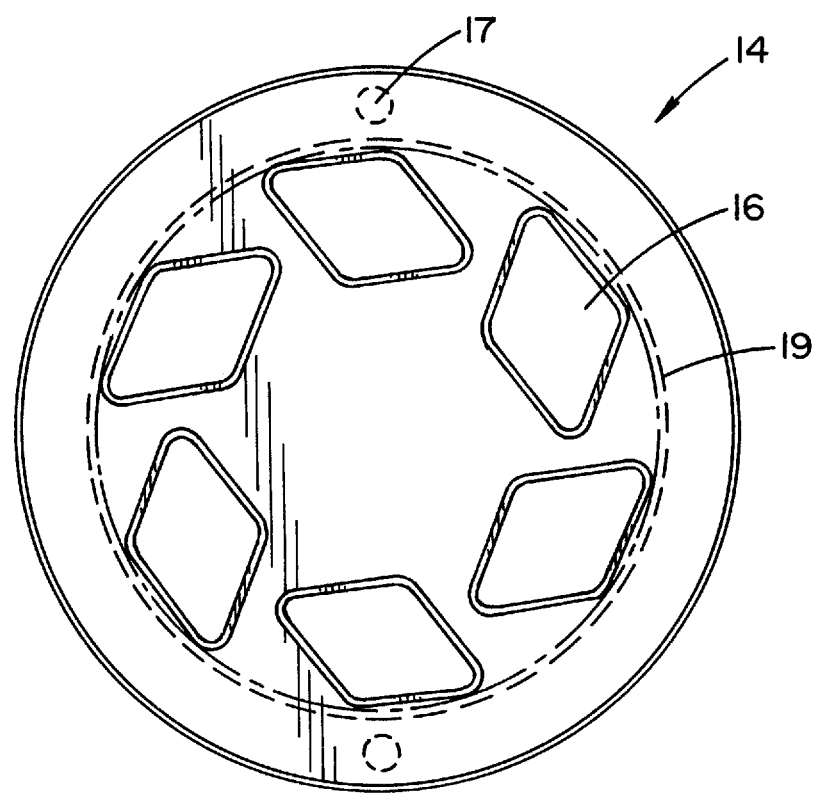
Figure 43F:
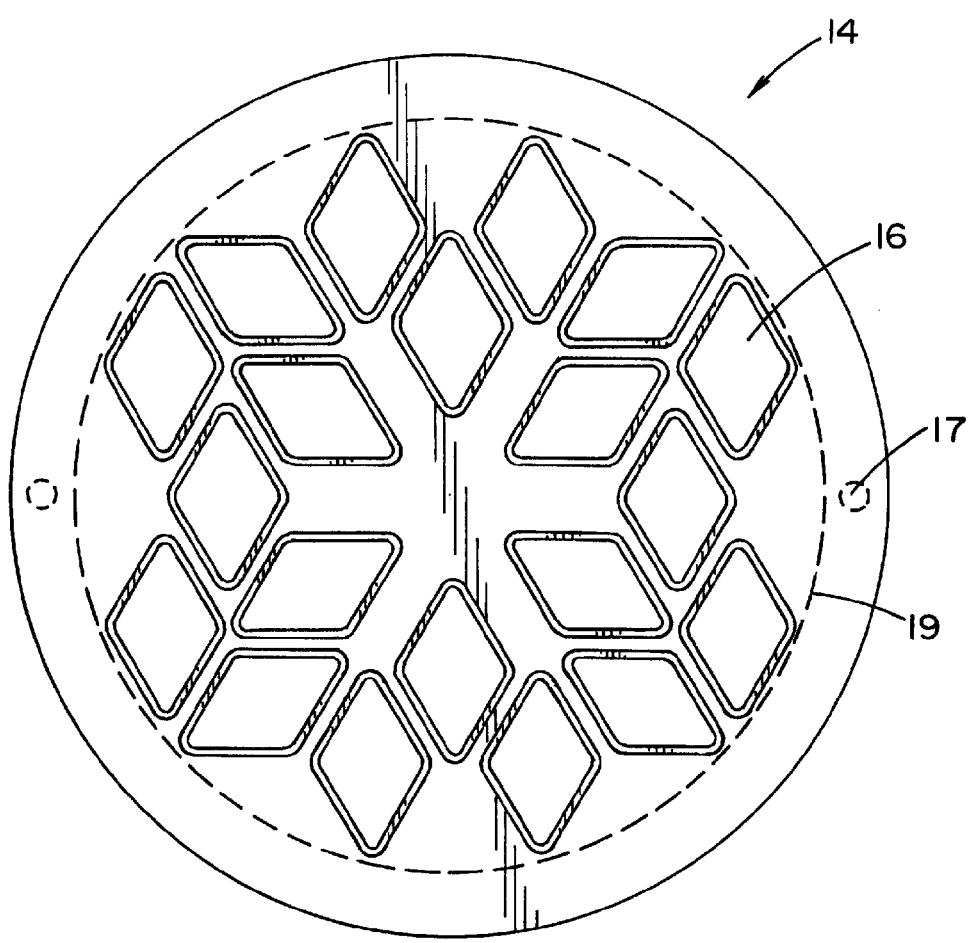
Figure 43G:
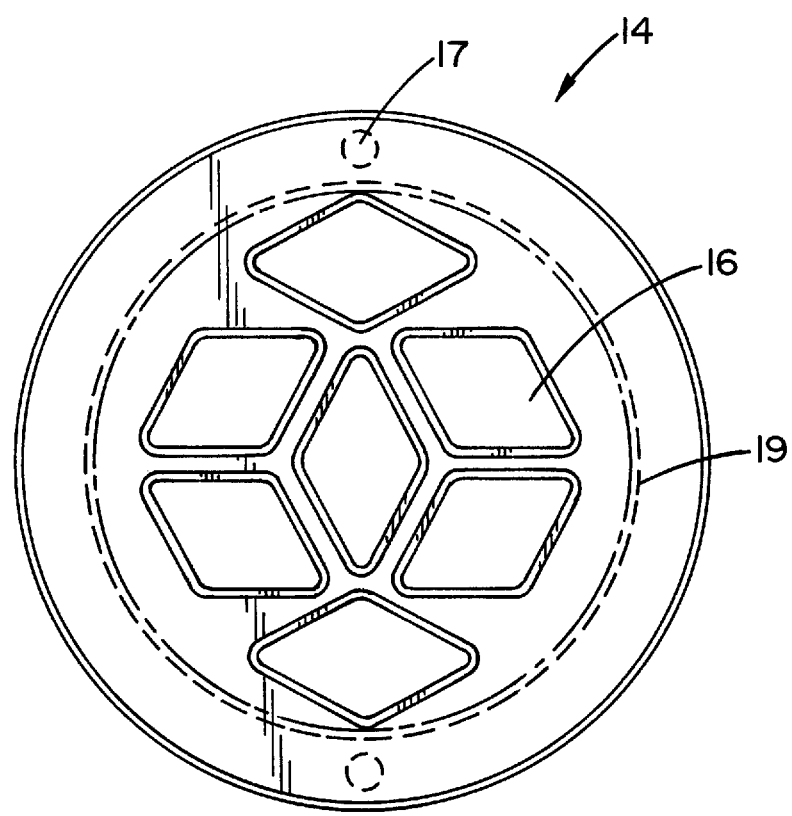
Figure 43H:
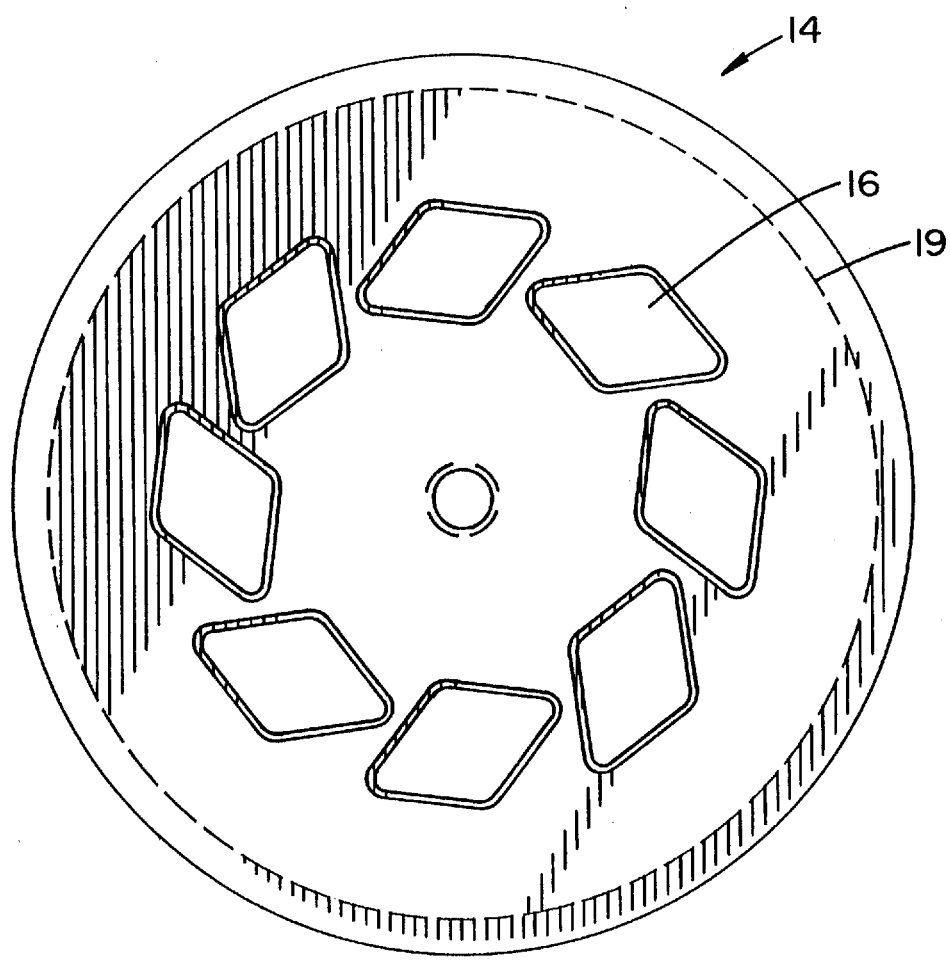
Figure 43I:
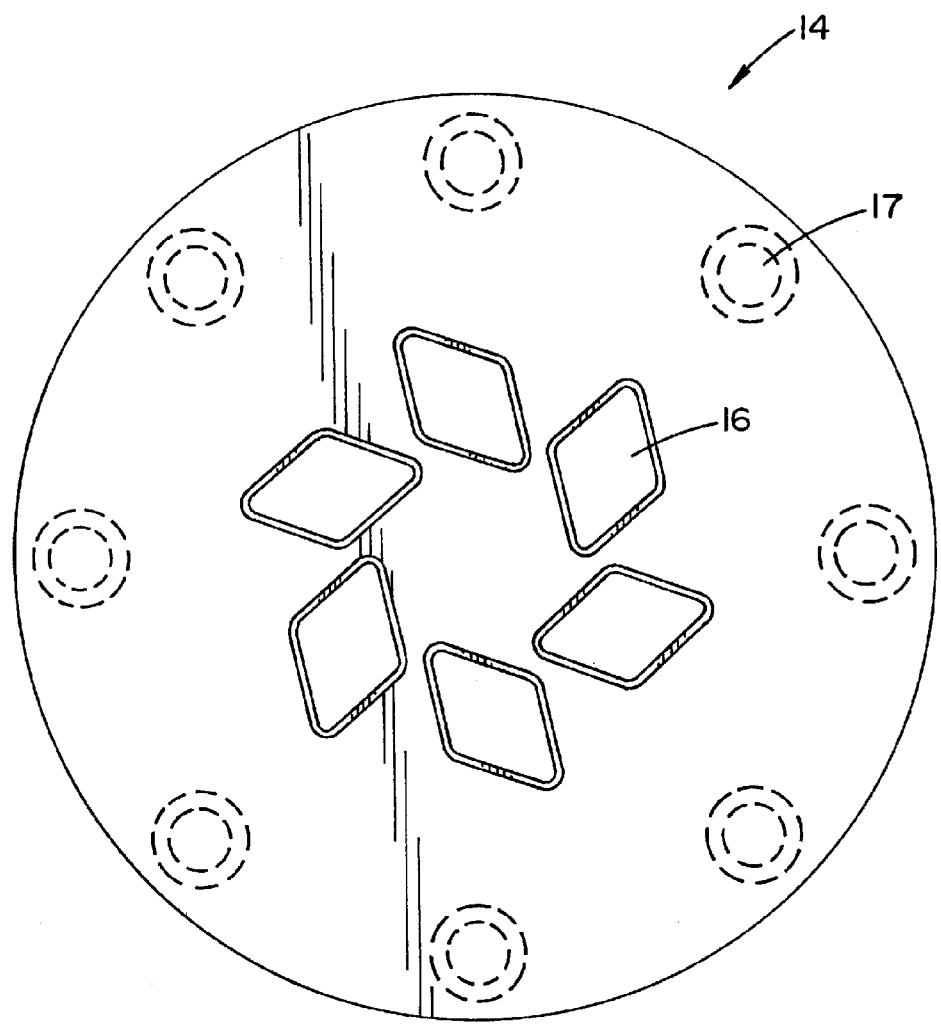
Figure 43J:
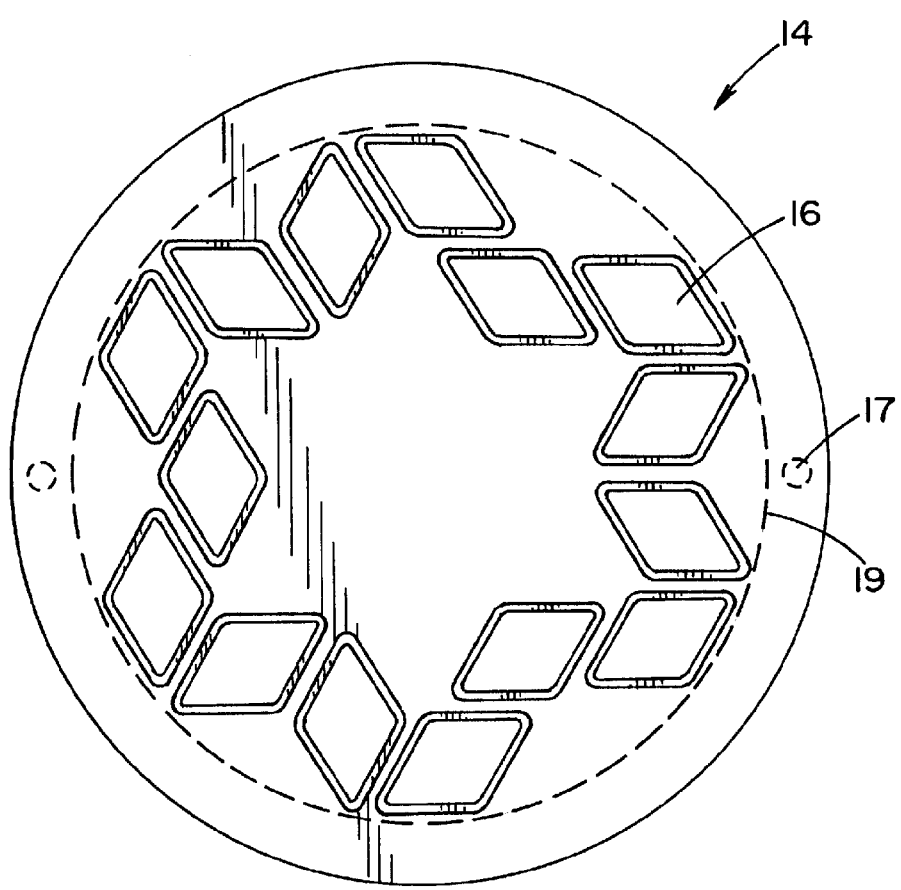
Figure 43K:
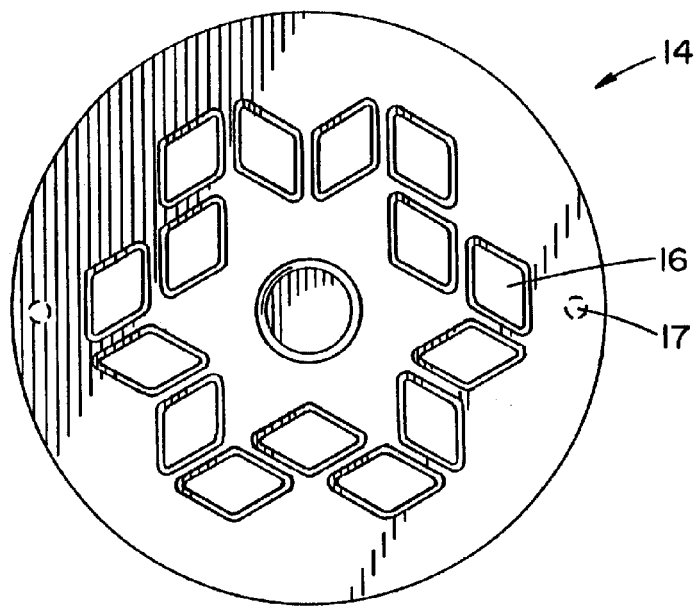
Figure 43L:
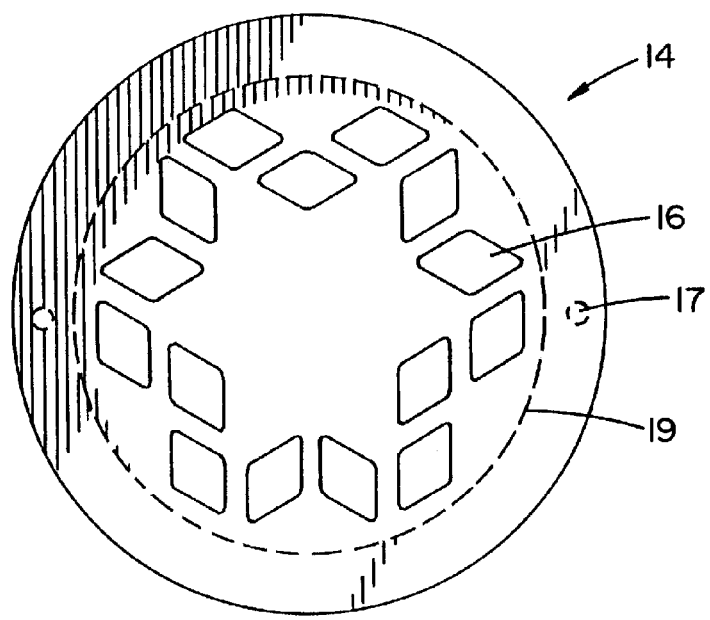
Figure 43M:
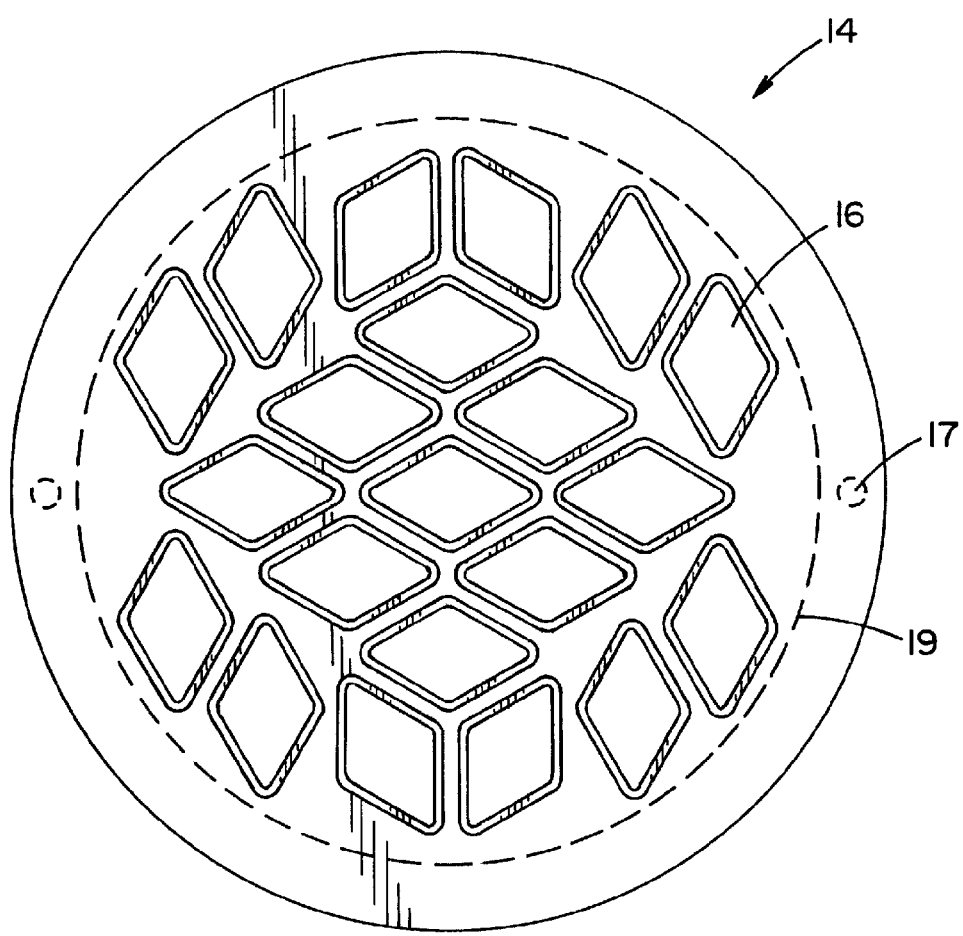
Figure 43N:
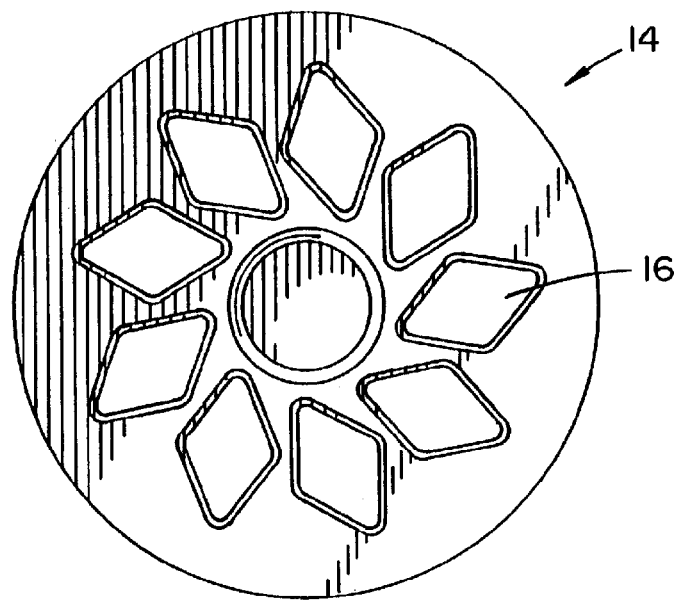
Figure 43O:
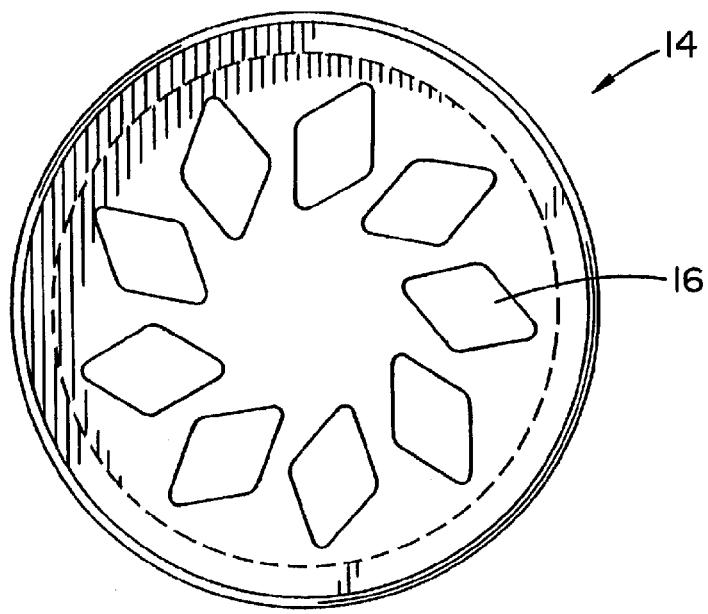
Figure 44A:
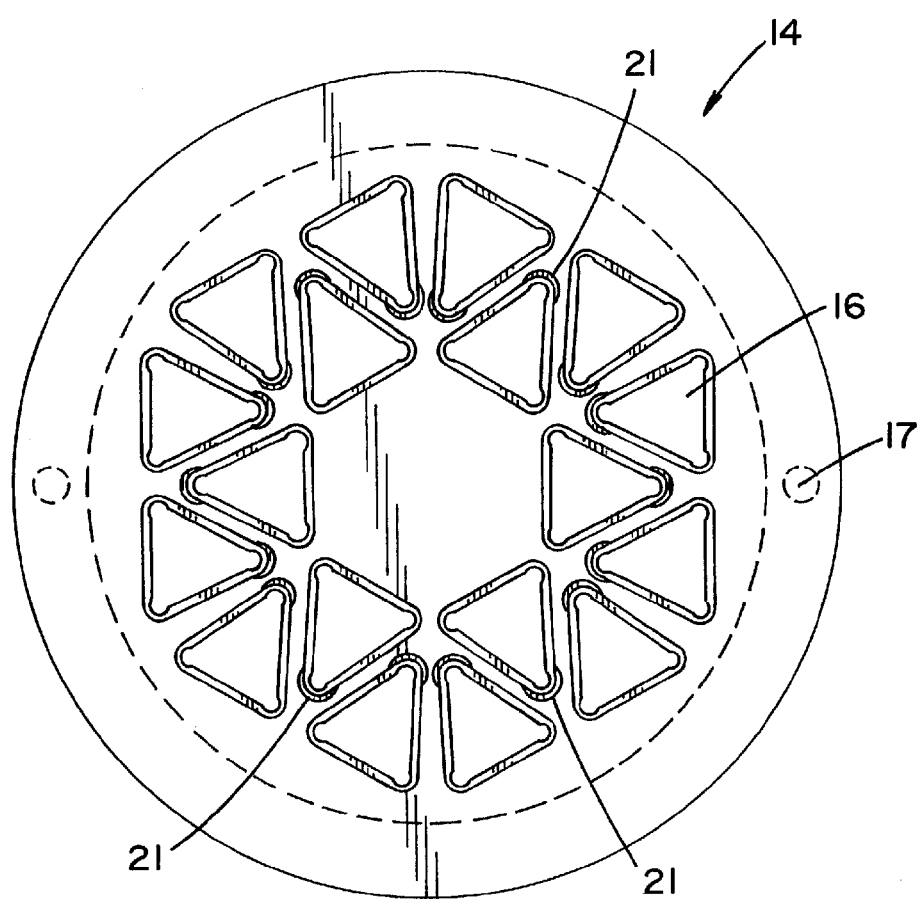
FIG. 44A-L is an extruder plate that can be used in the present invention.
Figure 44B:
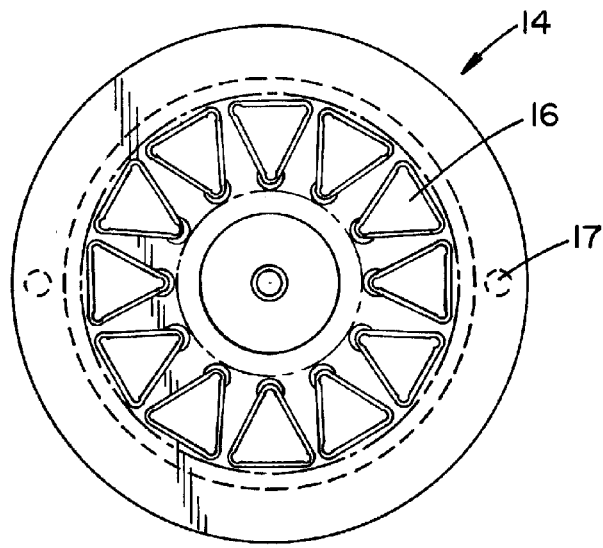
Figure 44C:
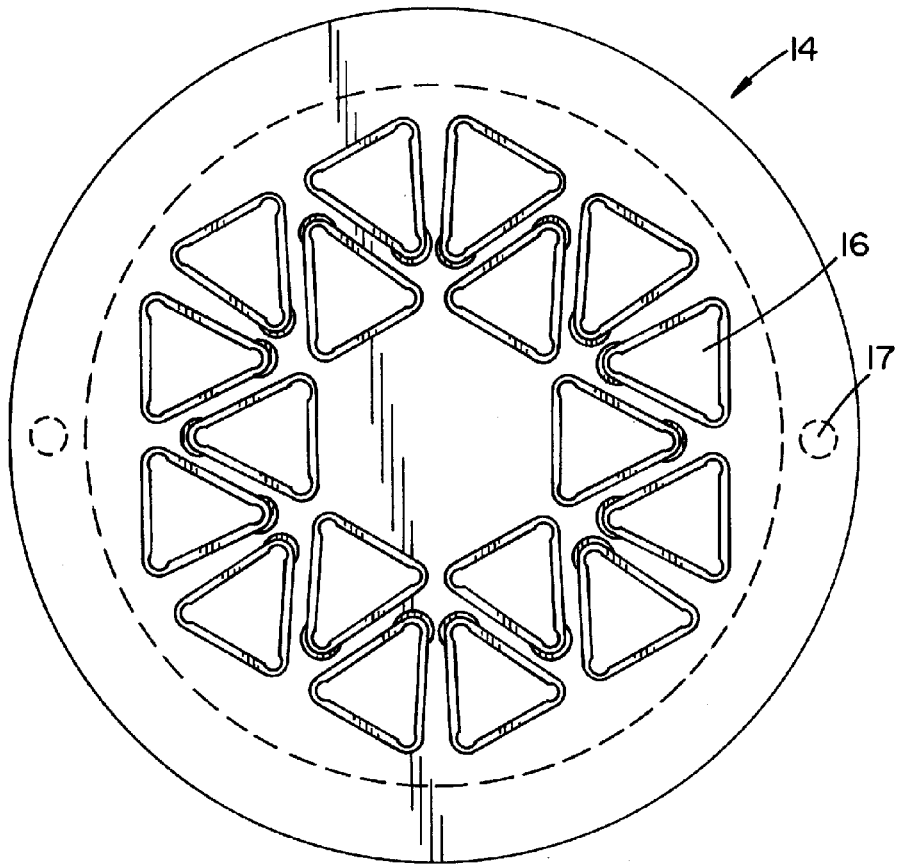
Figure 44D:
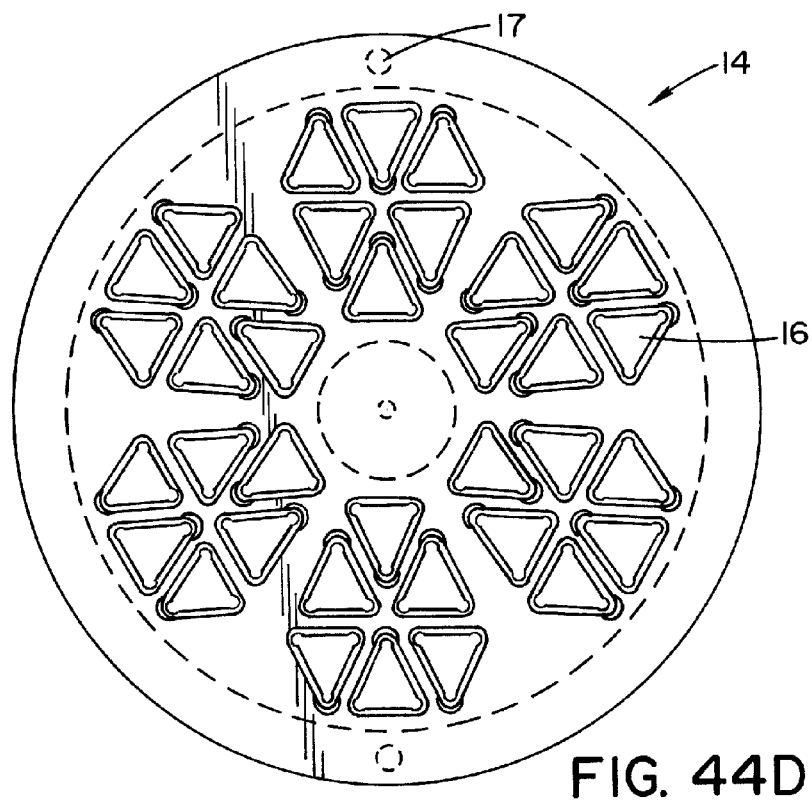
Figure 44E:
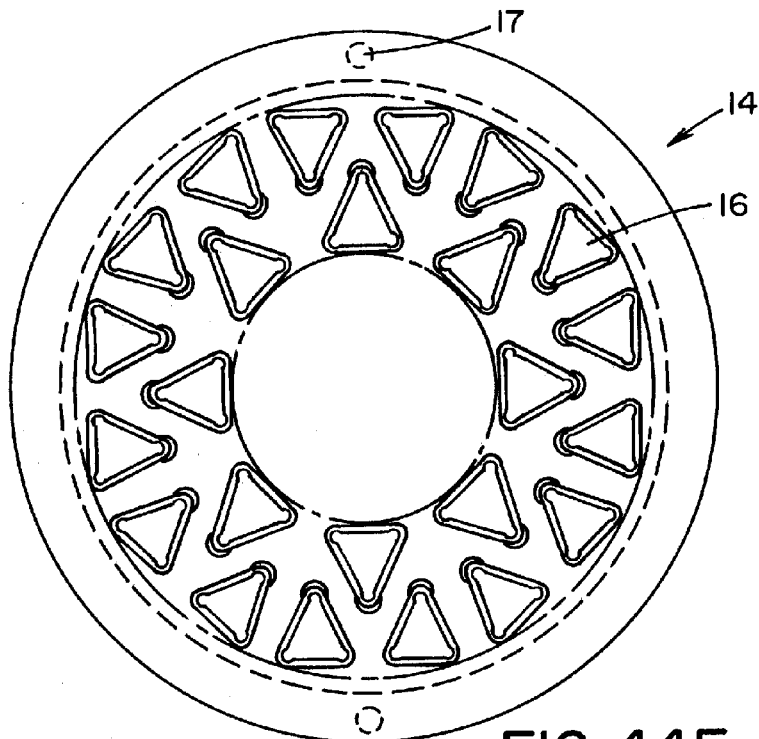
Figure 44F:
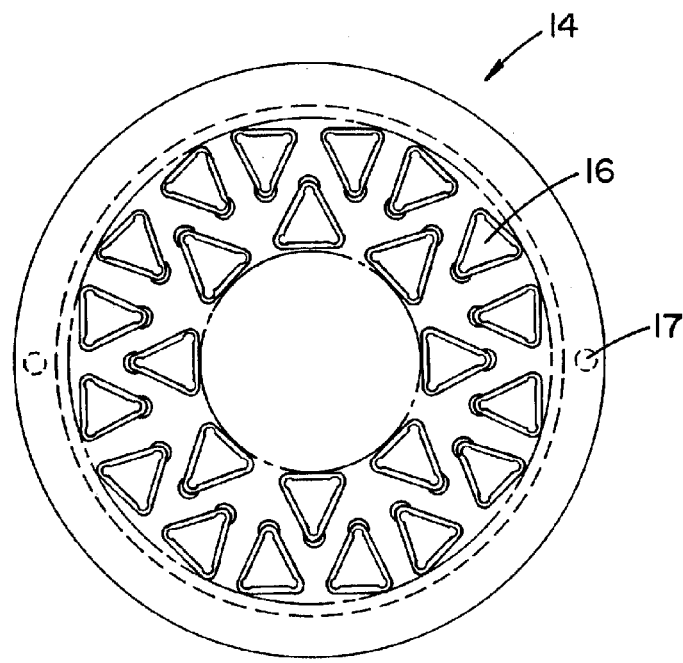
Figure 44G:
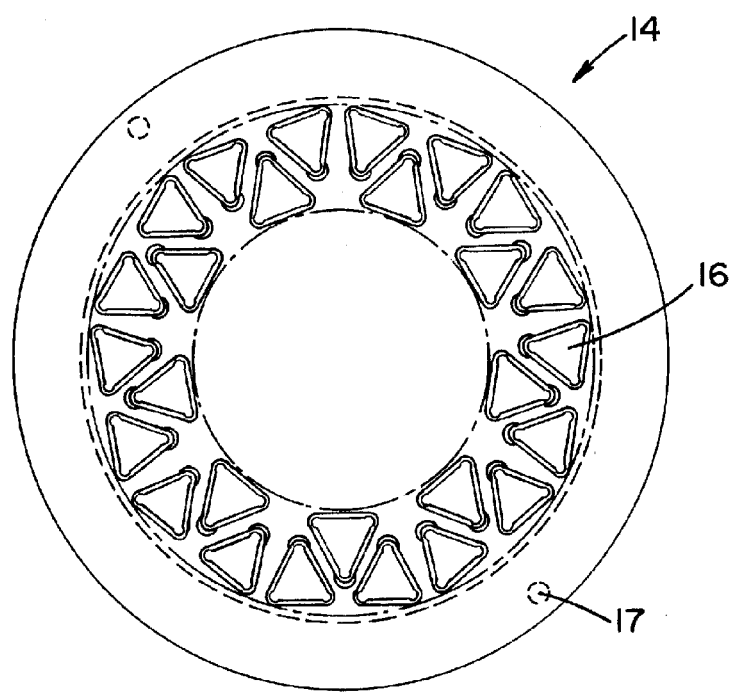
Figure 44H:
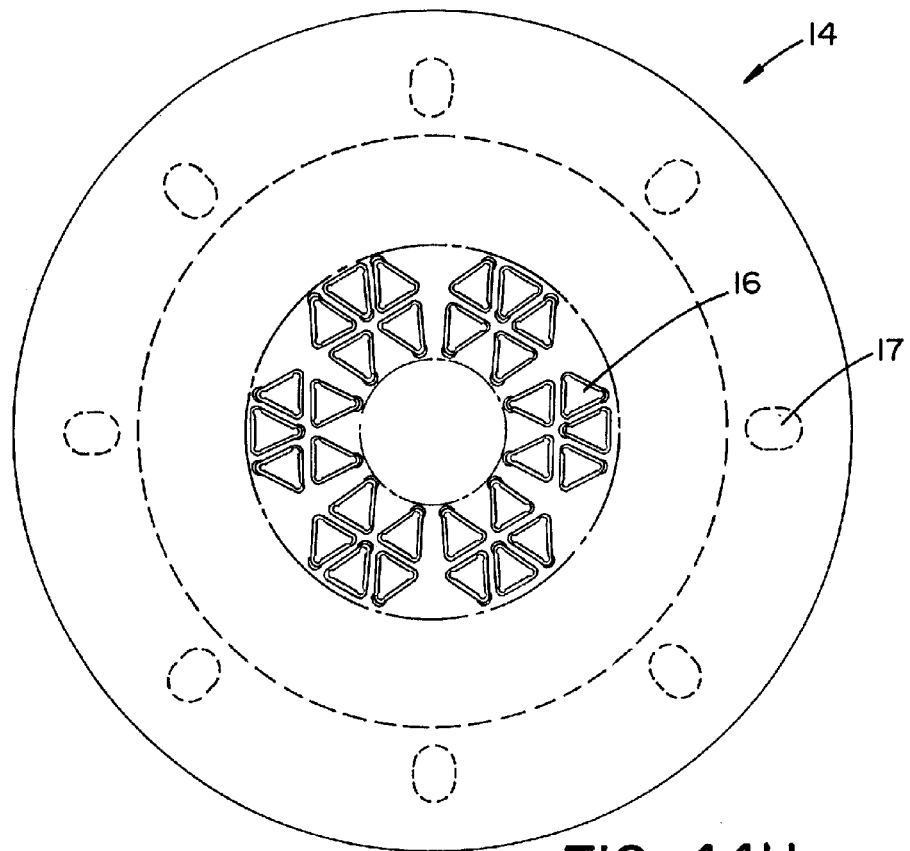
Figure 44I:
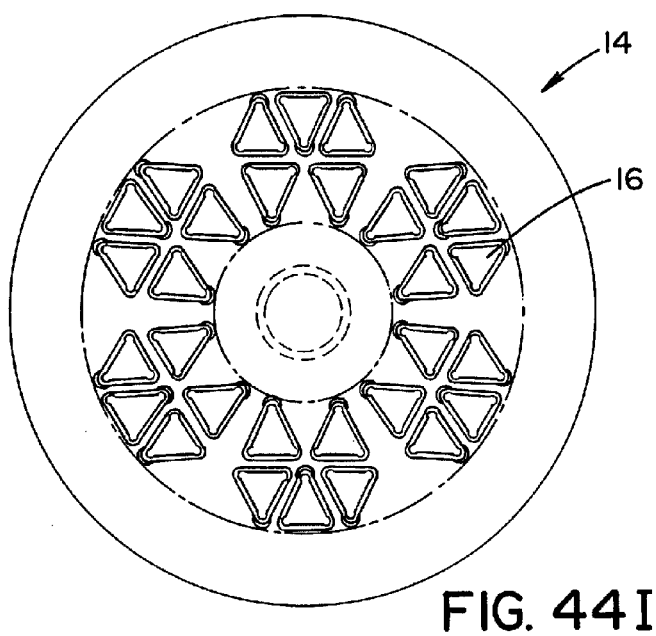
Figure 44J:
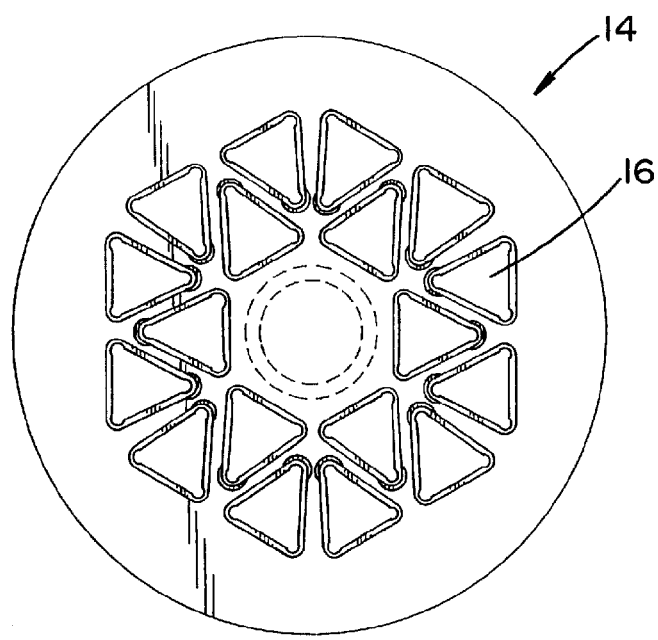
Figure 44K:
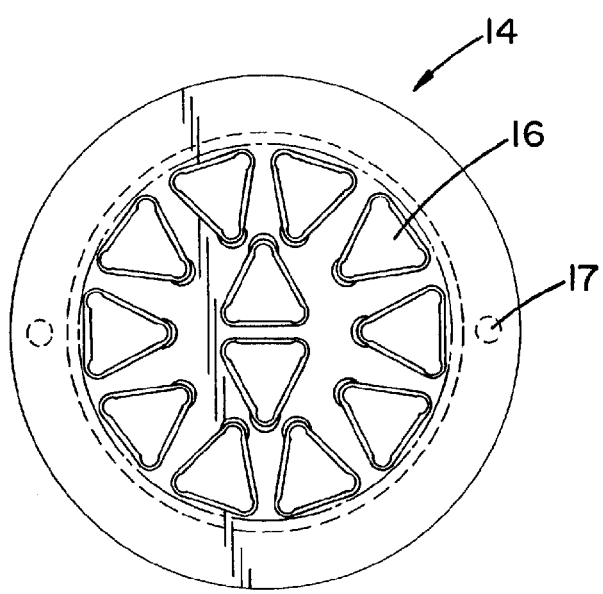
Figure 44L:
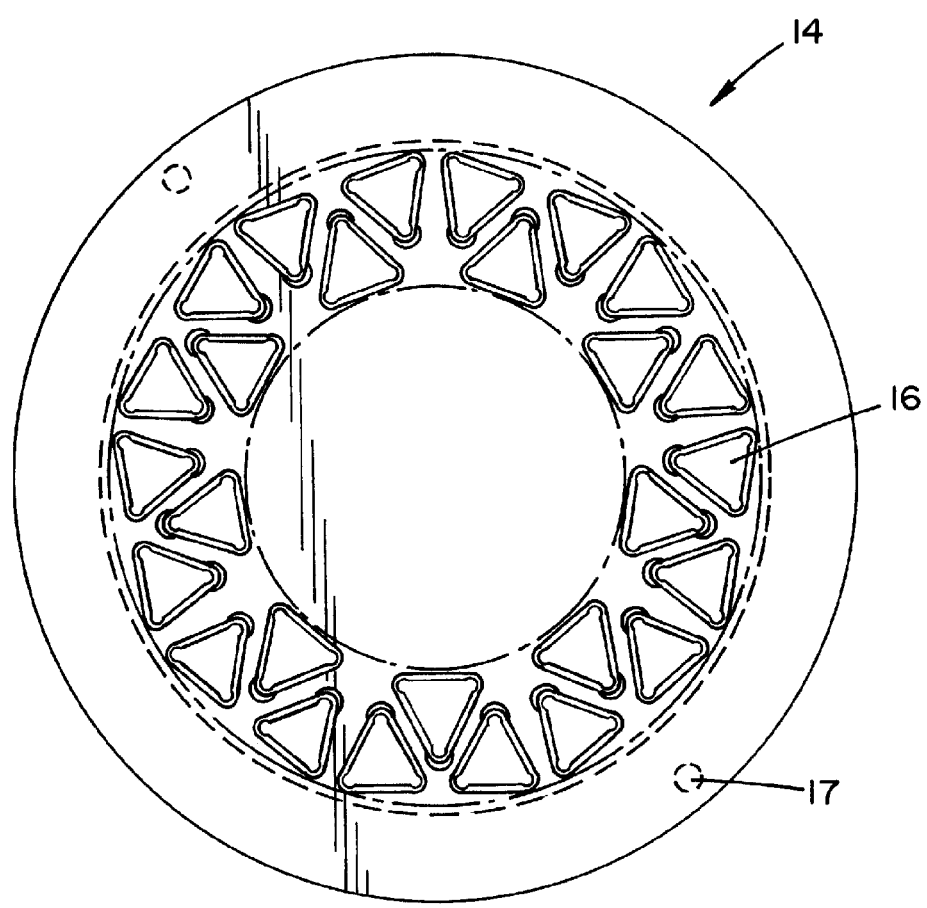

Referring now to FIGS. 43A-O, the extruder plates 14 include various non-limiting configures of generally diamond shaped die openings 16. None of the die openings include orientation structures as described with reference to FIGS.

44A-L; however, it can be appreciated that one or more of the extruder plates illustrated in FIGS. 43A-O could include one or more orientation structures. Indeed, one or more of the extruder plates illustrated in FIGS. 43A-O could include recess openings that could receive tabs on a die/extruder insert as illustrated in FIGS. 42A-I.

The cavity of the die opening of the extruder plate can have a variety of configurations as discussed above. For example, the generally triangular shaped die openings of the extruder plates illustrated in FIGS. 44A-L can be configured to have cavities that can receive die/extruder inserts such as but not limited to, die/extruder inserts as illustrated in FIGS. 35C, 35D, 35E, 36C, 36D, 36F, and 38G-J. As can be appreciated, the die opening can have other shaped cavities. Likewise, the generally diamond shaped die openings of the extruder plates illustrated in FIGS. 43A-O can be configured to have cavities that can receive die/extruder inserts such as but not limited to, die/extruder inserts as illustrated in FIGS. 39B, 39C, 40B, 40C, and 42F-I. As can be appreciated, the die opening can have other shaped cavities.

Referring now to FIGS. 35-42, several triangular shaped and diamond shaped die/extruder inserts 18 are illustrated. These die/extruder inserts each have a plurality of holes 23 through the die/extruder insert that are designed to enable material to be extruded through the die/extruder insert. The die/extruder inserts can have a variety of hole configuration and/or hole shapes. As depicted in FIGS. 35-42, the holes have a generally circular shaped; however, this is not required. The cross-sectional shape of the holes will generally determine the shape of the material extruded through the die/extruder insert. Hole shapes such as, but not limited to, star shaped, cross shaped, oval shaped, polygonal shaped, etc. can also be used. The hole shape on each die/extruder insert is generally the same; however, this is not required. The number of holes on each die/extruder insert is not limiting other than by the size and/or material of the die/extruder insert. As such, a few or many holes can be formed on a die/extruder insert. The pattern of the holes on the die/extruder insert is also not limiting. As illustrated in several of the figures, the shape of the die/extruder insert along its longitudinal length can be generally constant (See FIGS. 35, 37, 38G, 38I, 38L, 41, 42F, 42H), or can be variable (See FIGS. 36, 38H, 38J, 40, 42G, 42I). These die/extruder inserts have variable outer cross-sectional shapes along the longitudinal length of the die/extruder inserts as illustrated in FIGS. 36, 38H, 38J, 40, 42G, 42I includes one or more stepped or ledge portions 27. As can be appreciated, other or additional structures (e.g., tapered portion, rib, grove, slot, etc.) can be included on the die/extruder insert to form a die/extruder insert that has a variable outer cross-sectional shapes along the longitudinal length of the die/extruder insert. The die/extruder inserts can include one or more cavities 29 on the front and/or back face of the die/extruder insert (See FIGS. 37, 41).

Figure 45A:
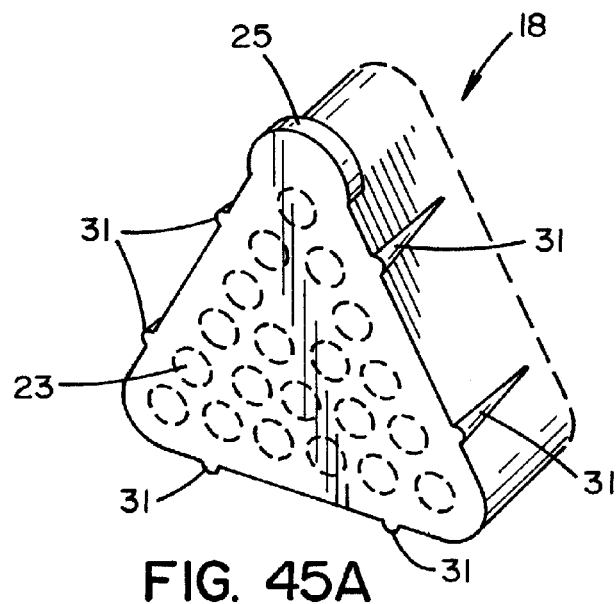
FIG. 45A-C is a die/extruder insert that can be used in the present invention; and, FIG. 46A-C is a die/extruder insert that can be used in the present invention.
Figure 45B:
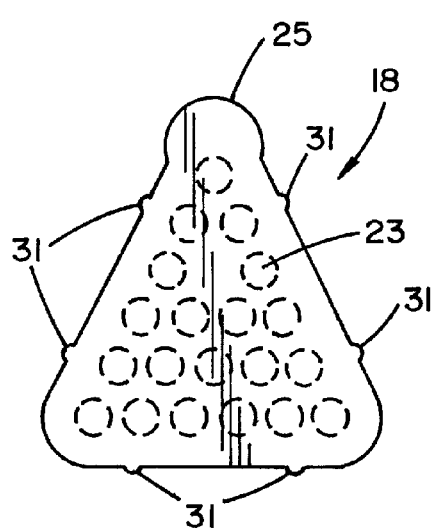
Figure 45C:
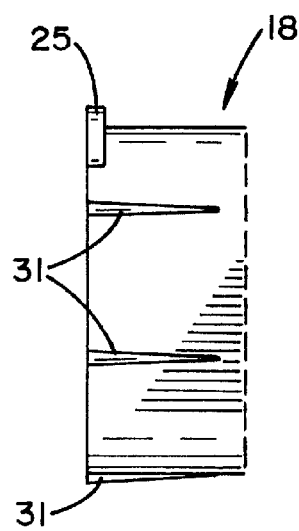
Figure 46A:
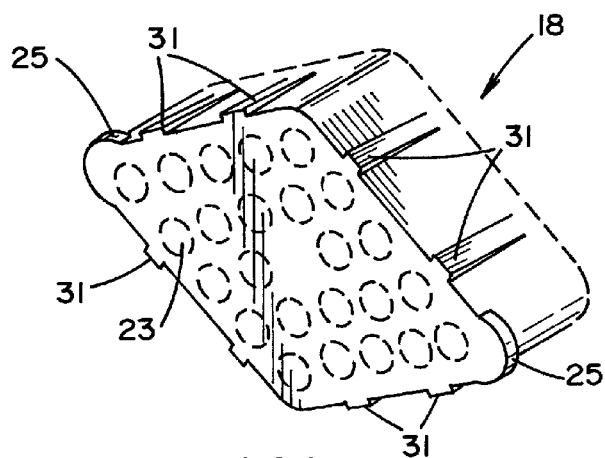
Figure 46B:
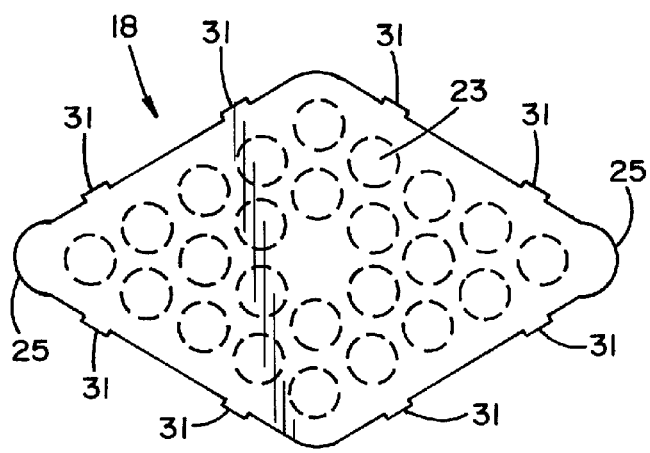
Figure 46C:
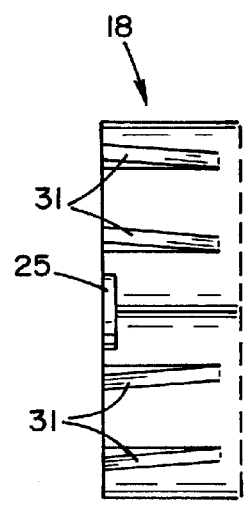

Referring now to FIGS. 45 and 46, there is illustrated die/extruder inserts that include one or more structures that inhibit or prevent the die/extruder insert from falling out a die plate one the insert is inserted into the die plate. Referring to FIG. 45, there is illustrated a triangular shaped die/extruder insert 18. FIG. 46 illustrates a diamond shaped die/extruder insert 18. The shapes of the triangular and diamond shaped die/extruder inserts can be the same as or different from the triangular and diamond shaped die/extruder inserts illustrated in FIGS. 35-42 and as described above. As illustrated in FIGS. 45 and 46, the sides of the die/extruder inserts include a friction tab 31. The friction tabs are illustrated as being tapered; however, this is not required. As illustrated in FIGS. 45 and 46, when the friction tabs are tapered, the friction tab is thicker nearer to the front face of the die/extruder insert than compared to the thickness of the friction tab located nearer to the back end of the die/extruder insert. As such, the taper on the friction tab, when such taper is used, allow the back end of the die/extruder insert to be easily inserted into the die openings 16 in the die plates 14. As the die/extruder insert is continued to be inserted into the die openings, the friction tab begins to engage the sides of the die openings and creates a friction fit for the die/extruder insert in the die opening. This friction fit inhibits or prevents the die/extruder inserts from falling out of the die openings of the extruder plate when the extruder plate is turned over and/or while it is being inserted or removed form an extruder. As illustrated in FIGS. 45 and 46, two friction tabs have the same width, length and shape are located on each side of the die/extruder insert. These two friction tabs are evenly oriented along the length of each side of the die/extruder insert. The friction tabs generally have a length that is equal to or less than the width of the die/extruder insert. Generally the ratio of the length of the friction tab to the width of the die/extruder insert is at least about 0.05:1, typically about 0.0.3-1:1, more typically about 0.5-1:1, even more typically about 0.6-1:1. When the die/extruder insert includes both a friction tab 31 and a positioning tab 25 as illustrated in FIGS. 45 and 46, the length of one or more of the friction tabs is generally greater than the width of the positioning tab; however, this is not required. It can be appreciated that the inserts of FIGS. 45 and 46 can be absent positioning tab 25 and only include one or more friction tabs 31. It can be appreciated that more than two or less than two friction tabs can be located on each side of the die/extruder insert. It can be appreciated that sides of the die/extruder inserts can have the same or different number of friction tabs. If can be appreciated that one or more sides of the die/extruder inserts can be absent friction tabs. It can be appreciated that some or all of the friction tab can be same or different shape. It can be appreciated that some, all or none of the friction tabs can be tapered. It can be appreciated that some or all of the fiction tabs can be the same length, width and/or shape. It can be appreciated that some or all of the friction tabs can be evenly oriented along the length of one or more sides of the friction tabs; however, this is not required.

Referring again to FIG. 1, an annular spacer 26 is attached to an end of the auger housing 22 and an annular die holder 28 attaches to the annular spacer 26 via fasteners 32. The annular spacer 26 and the annular die holder 28 can house some of the components of the cutting assembly. As can be appreciated, the annular spaces can be eliminated. These components will be described in more detail below.

A wiper blade 36 attaches to an upstream end face of the auger 12. Non-limiting configurations of the wiper blade are illustrated in FIGS. 5, 7, and 25-34. As can be appreciated, a wiper blade need not be used. The wiper blade includes a plurality of blades 38 that facilitate in directing or encouraging the material to be extruded through the extruder plate and/or die/extruder inserts. The blades 38 of the wiper blade are designed to reduce or eliminate space around the die openings 16 as the blades pass at least partially over the die openings. The aforementioned space can harbor material that can stagnate or accumulate around the die openings. Blades 38 can also be used to reduce pressure variations of the material to be extruded as it enters into the die openings, as compared to systems that do not employ such a wiper blade. Generally, the wiper blade is portioned relative to the inner face or surface of the extruder plate such that at least a portion of at least one blade of the wiper blade is positioned from the plane of the inner face or surface of the one or more openings of the extruder plate a distance of about 0.02-0.5 inch; however, it can be appreciated that other distances can be used. The blades on the wiper blade have an angle on the front surface of the blades that is used to facilitate in pushing the material into the one or more openings in the extruder plate. The angle is selected to facilitate movement of the material into the one or more openings in the extruder plate without cutting or substantially cutting the material prior to being moved into the one or more openings in the extruder plate. The average angle on at least a majority of the front face of the blades is about 15-60°. The blades on the wiper blade have an angle on the back face of the blades that is used to facilitate in movement of the one or more blades of the wiper blade through the material as the wiper blade rotates. The surface area of the angled portion on the back face of the blades is generally less than the surface area of the angled portion on the front face of the blades. The angle on at least a portion of the back face of the blades is about 15-60°. As can be appreciated, many other wipe blade configurations can be used.

Figure 4:
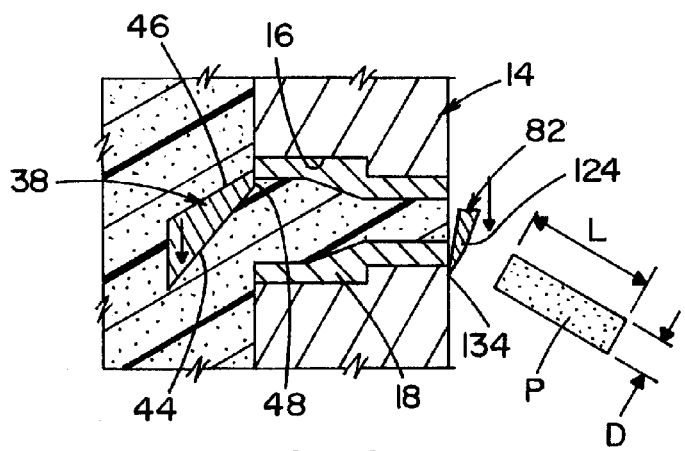
FIG. 4 is a cross-sectional view taken along line 4-4 of FIG. 1.
Figure 5:
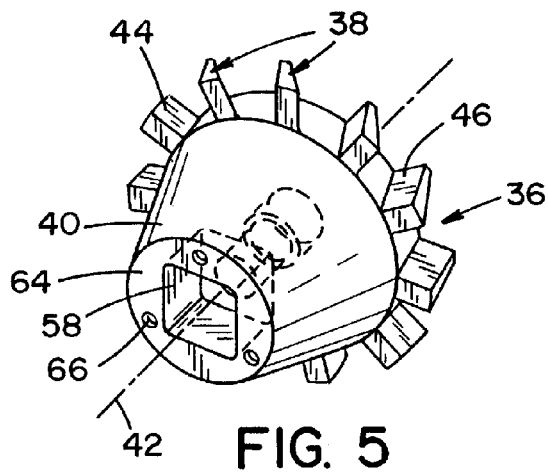
FIG. 5 is a perspective view of a wiper of the cutting assembly of FIG. 1.
Figure 6:
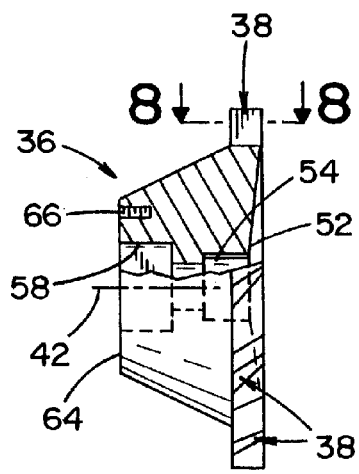
FIG. 6 is a side elevation view, partially in cross section, of the wiper of FIG. 5.
Figure 7:
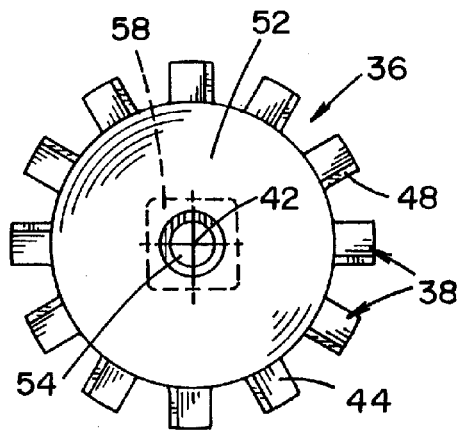
FIG. 7 is an end view of the wiper of FIG. 5.
Figure 8:
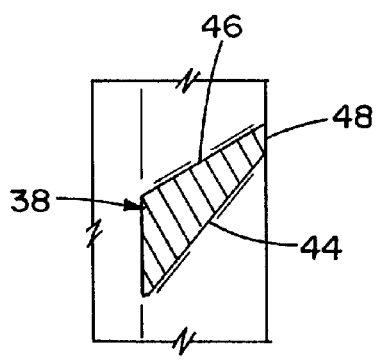
FIG. 8 is a cross-sectional view taken along line 8-8 of FIG. 6.

With reference to FIGS. 5-7, the wiper blade 36 can have a generally frustoconical body 40 that is concentric about a rotational axis 42. A different configuration for the body 40 of the wiper blade is illustrated in FIGS. 25-34. The blades 38 extend radially outward from body 40. With reference to FIG. 8, each wiper blade 38 includes an inclined leading edge 44 and a trailing edge 46, the edges being defined by the direction that the wiper rotates. With reference to FIG. 4, the leading edge 44 is inclined to encourage the movement of material into the one or more die openings 16 and/or one or more openings 23 in the die/extruder insert 18. The blades 38 can also include an outer axial edge 48 that contacts or is positioned closely adjacent the front or inner face of the extruder plate 14. The outer axial edge 48, in the depicted embodiment, is also at least generally parallel to the upstream face of the front or inner face of the extruder plate 14; however, this is not required. This configuration reduces the likelihood that a material clogging the one or more die openings 16 and/or one or more openings 23 in the die/extruder insert 18 because the wiper blades 38 remove any hardened material from around the one or more die openings 16 and/or one or more openings 23 in the die/extruder insert 18. The shape of the blades of the wiper blade facilitate in the moving of the material to be extruded into the one or more die openings 16 and/or one or more openings 23 in the die/extruder insert 18 and/or helps to reduce pressure variations as the material moves into the one or more die openings 16 and/or one or more openings 23 in the die/extruder insert 18. Although FIGS. 25-34 only illustrate a two blade wiper blade system, the configuration of these two blades can be used on a wiper arrangement having more than two blades. As illustrated in FIGS. 2, 4 and 25-34, the wiper blades are typically spaced at equal distances apart from one another; however, this is not required. As best illustrated in FIGS. 25-34, the wiper blades included angled faces that facilitate in the movement of the material to be extruded into the one or more die openings 16 and/or one or more openings 23 in the die/extruder insert 18.

As mentioned above, the wiper blade 36 attaches to the front end of the auger blade 12. With reference back to FIG. 6, the wiper blade 36 can include a slightly bowl-shaped upstream surface 52 and a central opening 54 beginning in the upstream surface 52 for receiving a fastener 56 (FIG. 1); However, this is not required. As alternative configuration is set forth in FIGS. 25-34. In this configuration, the front end of the body 40 includes a recessed region 51 and a central opening 54. As can be appreciated, may other configurations can be used. The fastener 56 is countersunk into the body 40 of the wiper blade 36 so as to sit flush with the upstream face 52, or recessed from the upstream or front face of body 40.

The wiper blade 36 also include a rear drive block opening 58 aligned along the central axis 42; however, this is not required. The drive block opening is polygonal in cross section, which in this embodiment is substantially square; however, it can be appreciated that may other shapes can be used. The drive block opening 58 receives a drive block 62 (FIG. 1) that is also received in a corresponding opening 57 provided in the auger blade 12. The drive block 62 includes a threaded central opening for receiving the fastener 56, and the auger blade 12 also includes a corresponding threaded opening 53 for receiving the fastener 56. The fastener 56 connects the wiper blade 36 to the auger blade 12 and the drive block 62 allows for the rotation of the wiper blade 36 as the auger blade 12 rotates. As can be appreciated, the wiper blade can be attached to the auger blade by other arrangements.

With reference back to FIG. 5, a downstream or rear face 64 of the wiper blade 36 can include a plurality of fastener openings 66 that receive fasteners to attach a wiper spacer 68 (FIG. 1) to the wiper for spacing the wiper from the end face of the auger 12; however, this is not required. In the depicted embodiment, the wiper spacer 68 is in the form of an annular ring; however, the wiper spacer can comprise a plurality of components, such as a plurality of blocks. As can be appreciated, other connection arrangements can be used.

Figure 2:
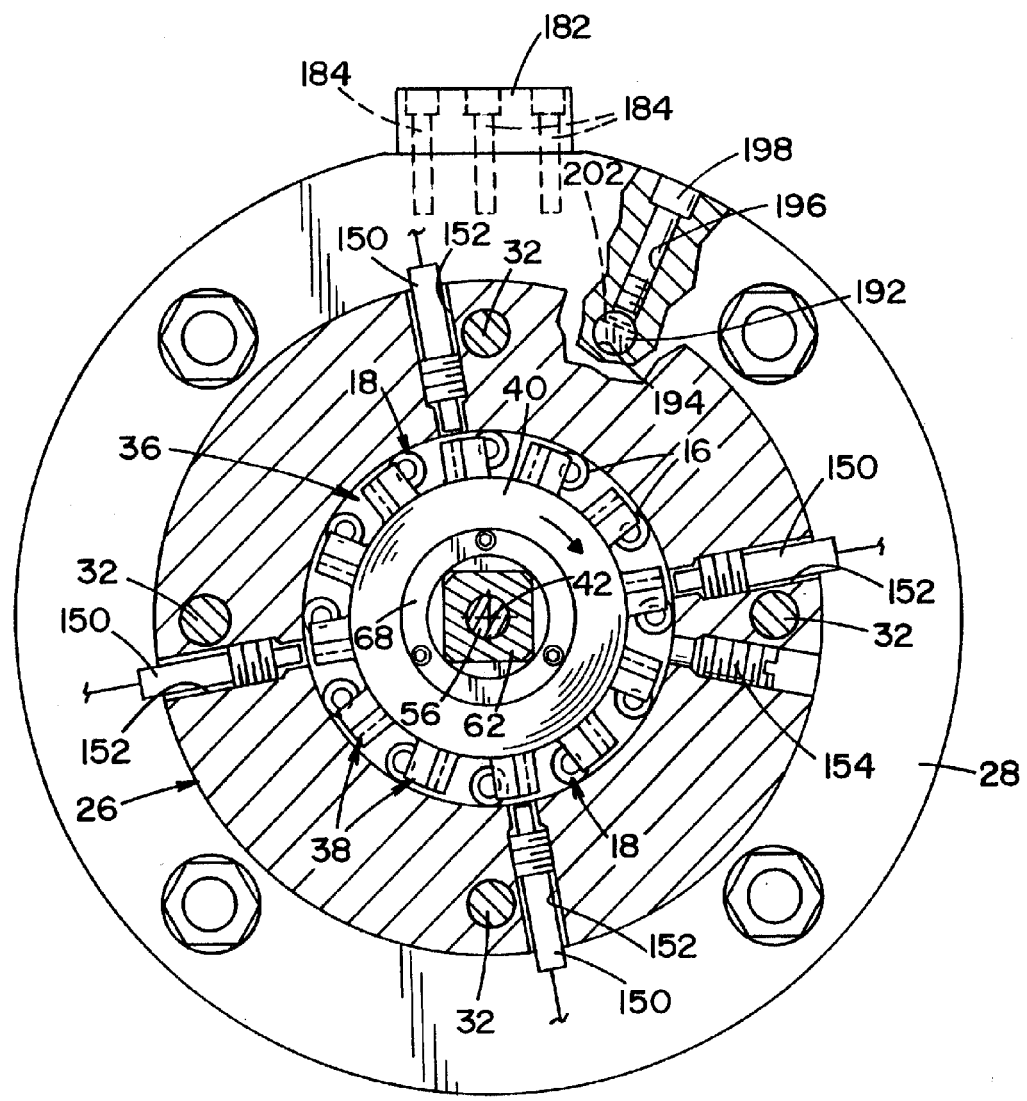
FIG. 2 is a cross-sectional view taken along line 2-2 of FIG. 1.

Different sized wiper blades can be used with the improved cutting assembly. Different sized wiper blades may be desirable where different extruder plates, die openings and/or die/extruder inserts are used. It may be desirable to have a certain shaped wiper blade to be used in conjunction with a certain type of extruder plate and/or certain types of die/extruder inserts. As illustrated in FIG. 2, the number of blades 38 of wiper blade 36 is equal to the number of die openings 16; however, this is not required. In the embodiment depicted in FIG. 2, each blade 38 extends from a peripheral edge of the body of the wiper blade 36 a distance that is nearly, the same as and/or slightly greater that the diameter of each die opening 16; however, this is not required. In one non-limiting design, the blade is at least 80% as large as the cross-sectional area of the die opening. In another non-limiting design, the blade is at least 100% as large as the cross-sectional area of the die opening. The blades of the wiper blade can also be arranged so as to be spaced from or to contact the inner surface or face of the extruder plate. Typically the edge of the blade of the wiper blade that is closest to the extruder plate is no more than about 0.25 inch from the extruder plate; however, other distances can be used.

Figure 9:
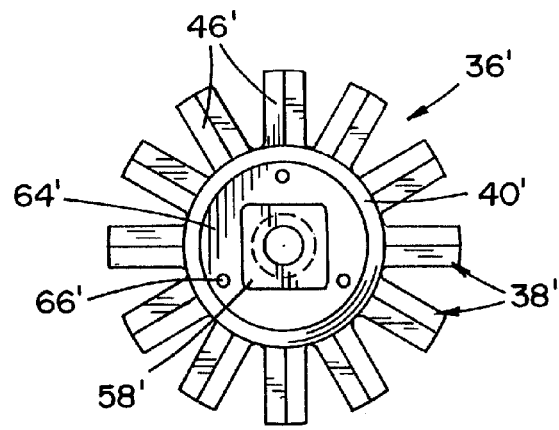
FIG. 9 is an end view of an alternative embodiment of a wiper for use with the cutting assembly of FIG. 1.
Figure 10:
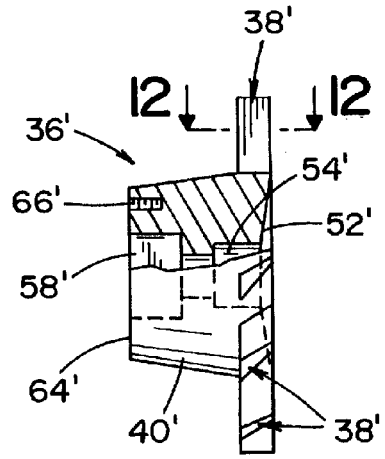
FIG. 10 is a side elevation view, partially in cross section, of the wiper of FIG. 9.
Figure 11:
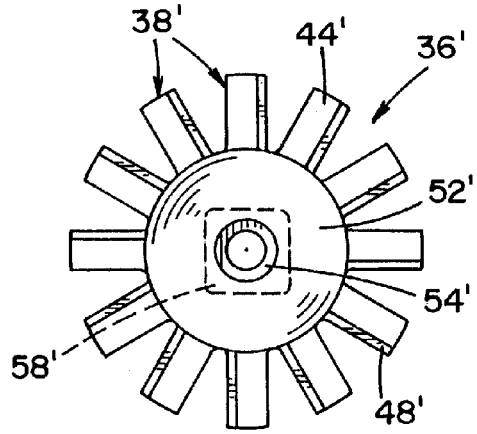
FIG. 11 is an end view, opposite the end shown in FIG. 9, of the wiper of FIG. 9.
Figure 12:
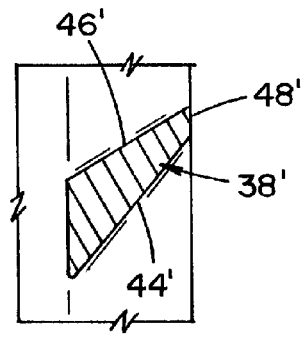
FIG. 12 is a cross-sectional view taken along line 12-12 of FIG. 10.

Reference will now be made to an alternative embodiment of a wiper as shown in FIGS. 9-12, where like numerals having a primed (') suffix will refer to like components of the aforementioned wiper blade. With reference to FIG. 9, a wiper blade 36' includes a plurality of blades 38' radially extending from a periphery of a substantially frustoconical body 40'. The blades 38' extend a greater radial distance from the periphery of the wiper body as compared to the blades shown in the embodiment disclosed in FIGS. 5-8. In this embodiment, the blades 38' extend a distance from the peripheral edge of the body 40' a distance greater than the diameter of the die openings 16 shown in FIG. 2. With reference to FIG. 12, each blade 38' includes a leading surface 44' and a trailing surface 46'. Similar to the embodiment depicted in FIGS. 5-8, the leading surface 44' encourages material into the die openings 16 and/or die/extruder inserts (FIG. 1). Each blade 38' also includes an axial end surface 48' that contacts or is positioned closely adjacent to the die plate 14. With reference to FIG. 10, the wiper blade 36' also includes a bowl-shaped upstream surface 52'. The wiper blade 36' also includes a fastener opening 54' beginning in the upstream face 52' and the drive block opening 58' extending from a rear face 64'. Fastener openings 66' extend into the body from the rear face 64' to attach a wiper spacer, such as wiper spacer 68 in FIG. 1, to the wiper blade 36'. The wiper blade can take many configurations other than those described above.

With reference back to FIG. 1, a rotating cutter head 80 having a plurality of cutter blades or knives 82 cuts the extruded material into cut products P. The cut products P can take a number of different shapes dependent upon die 18 used to form the cut product. The length of the cut product is controlled by way of the systems that will be described below.

The cutter head 80 is rotated by a motor 84. The motor 84 receives power from a power source (not shown). An output shaft 86 extends from the motor 84. A shaft coupling 88 connects the output shaft 86 of the motor 84 to a drive shaft 92. As more clearly seen in FIG. 13, the cutter head 80 includes a central opening 94 for receiving the drive shaft 92; however, other arrangements can be used.

Figure 13:
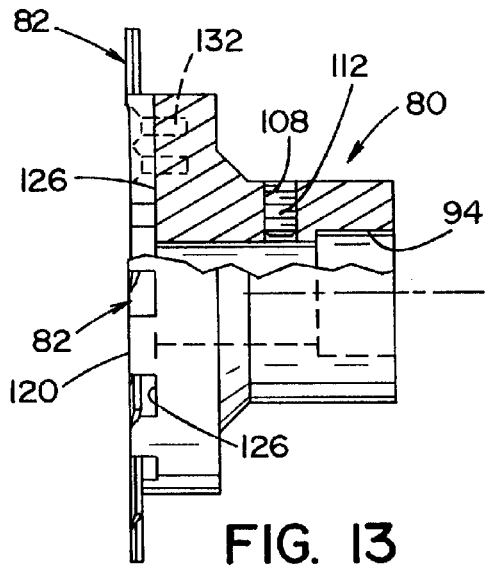
FIG. 13 is a side elevation view, partially in cross section, of a cutter head for use with the cutting assembly of FIG. 1.

The drive shaft 92 extends through a bearing plate 96 having bearings 98 and 102 disposed therein. The drive shaft 92 can also include a forward threaded section 104 that nuts 106 can threadingly engage to control the location of the cutter head 80 with respect to the die plate 14. The cutter head 80 can also include radial openings 108 (only one is shown in FIG. 13) for receiving fasteners 112 (FIG. 1) for securing the cutter head 80 to the drive shaft 92. As can be appreciated, the cutter head can be connected to the drive shaft in other ways.

Figure 14:
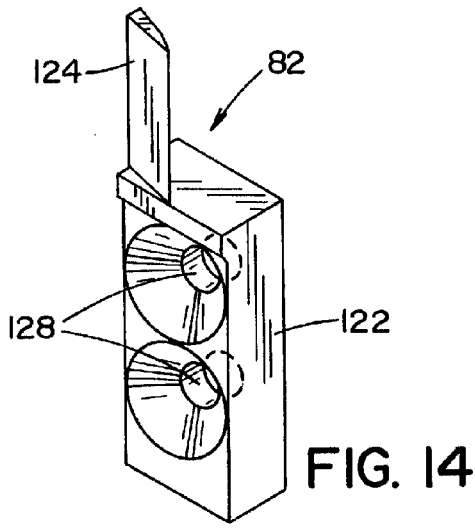
FIG. 14 is a perspective view of a cutter knife that connects to the cutter head of FIG. 13.
Figure 15:
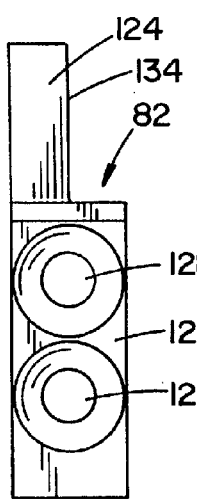
FIG. 15 is a front elevation view of the cutter knife of FIG. 14.
Figure 16:
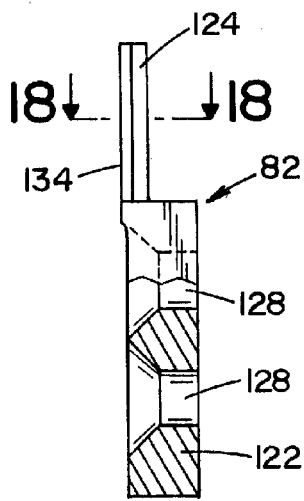
FIG. 16 is a side elevation view, partially in cross section, of the cutter knife of FIG. 14.
Figure 17:
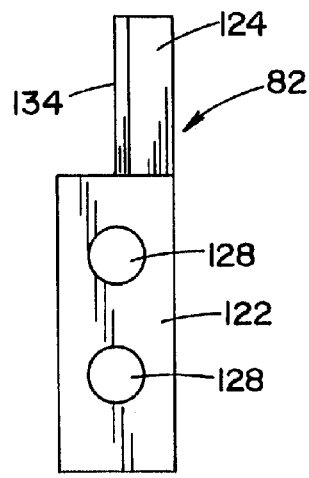
FIG. 17 is a rear elevation view of the cutter knife of FIG. 14.

With reference to FIG. 13, a plurality of cutter blades or knives 82 are connected to and radially extend from a rear or upstream face 120 of the cutter head 80. With reference to FIG. 14, each cutter knife 82 includes a lower body portion 122 and a blade 124 extending from the lower body portion. The lower body portion 122 is received in appropriately shaped recesses 126, which in the depicted embodiment are rectangular, formed in the body of the cutter head 80 at the upstream face 120. Each lower body portion 122 also includes fastener openings 128 that receive fasteners 132 (FIG. 1) to attach each cutter knife 82 to the cutter head 80. As is apparent, once a blade 124 dulls, the cutter knife 82 can be replaced from the cutter head 80 by removing the fasteners 132 (FIG. 1) that attach the cutter knife 82 to the cutter head 80. As can be appreciated, the cutter knifes can be connected to the cutter head by other arrangements. In an alternative embodiment, the cutter head 80 and the cutter knifes 82 can be formed as an integral unit.

Figure 18:
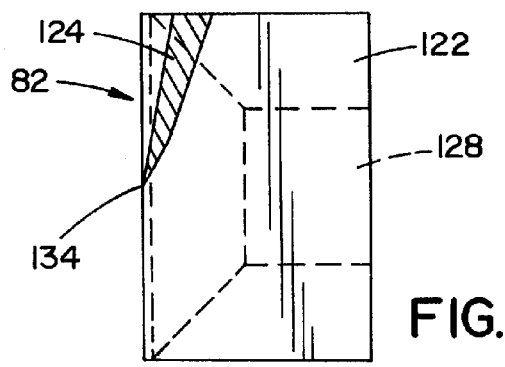
FIG. 18 is a cross-sectional view taken along line 18-18 in FIG. 16.
Figure 19:
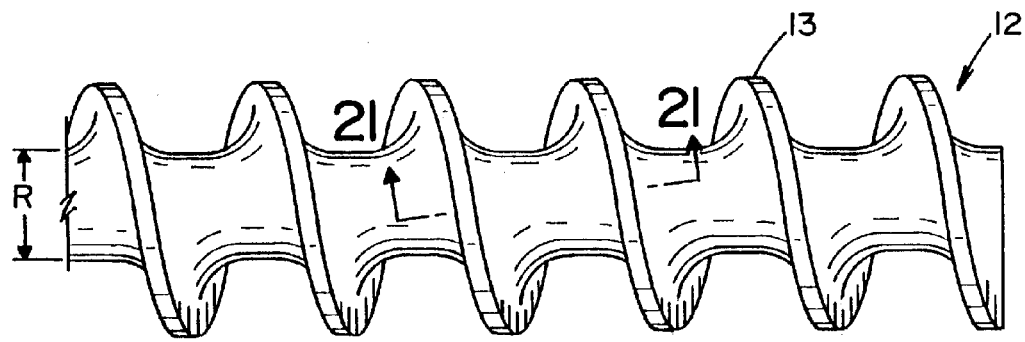
FIG. 19 is an elevation view of a non-limiting single continuous single flight auger blade that can be used in the present invention.

With reference to FIG. 18, the blade 124 includes a sharpened or primary cutting edge 134 that lies in generally the same plane as the rear or upstream face 120 of the cutter head 80, or slightly in front of the upstream face of the cutter head. The primary cutting edge is used as the principal cutting surface of the blade. The slope angle of the primary cutting edge is used to effectively cut the extruded product. Typically the slope of the primary cutting edge is about 25-35°. The blade also can include a rake surface next to the primary cutting edge, not shown, that has a rake angle; however, this is not required. The rake surface is positioned on the same side of the one or more cutting blades as the primary cutting surface. Typically, the primary cutting edge transitions into the rake surface; however, this is not required. The rake angle is typically less than the slope angle of the primary cutting surface. The rake angle is used in part to create a trajectory of the material after it has been cut by the primary edge. This trajectory of the material is used to move the material off of the cutting blade and/or to throw the cut material to a desired location. Typically the rake angle is about 15-25°. The blade can also include a clearance surface that has a clearance angle; however, this is not required. The clearance surface is positioned on the opposite side of the one or more cutting blades as the primary cutting edge, and the rake surface when used. The clearance surface is designed to facilitate in enable the cutting blade to clear the continuously extruded product. Once the primary cutting edge has cut a portion of the extruded product, more extruded product moves out from the die plate openings. This front end of the extruded material can cause interference with the blade, and thereby cause improper rotation speeds of the rotating cutter head 80. The clearance angle on the blade is selected so as to enable the back side of the blade to easily move past the front end of the extruded product and thereby facilitate in the proper operation of the rotating cutter head and proper and consistent rotation speeds of the rotating cutter head. Typically the slope angle of the clearance surface is about 8-15°.

With reference to FIG. 4, the blade 124 is positioned closely adjacent an outlet end or front face of the extruder plate and/or die/extruder insert so as to cut the product P to the desired length. Typically the primary cutting edge is less than about 0.5 inch from the face of the die plate; however, other distances can be used. The rate at which material to be extruded enters and/or passes through the extruder plate and/or die/extruder insert and the rotational velocity of the cutter head 80 controls the length of product P.

When the pressure on the extruded material increases on the inner surface or region of the extruder plate and/or die/extruder insert, the material tends to travel at a faster rate through the extruder plate and/or die/extruder insert. Conversely, when the pressure by the material on the inner surface or region of the extruder plate and/or die/extruder insert reduces, the extruded material passes at a slower rate through the extruder plate and/or die/extruder insert. By detecting the pressure of the material as it enters into one or more openings in the extruder plate and/or die/extruder insert, it can be determined whether the material is accelerating, decelerating, or maintaining a constant velocity through the extruder plate and/or die/extruder insert.

As illustrated in FIG. 2, pressure transducers 150 are inserted into radial openings 152 in the spacer 26 to detect the pressure of the material as it enters into one or more openings in the extruder plate and/or die/extruder insert. As can be appreciated, other or additional types of detectors can be used (e.g., temperature detectors, vibration detectors, chemical analysis detectors, etc.). With reference to FIG. 2, a plurality of pressure transducers 150 can be supplied into the radial openings 152; however, this is not required. Plugs 154 can be inserted into radial openings 152 where no pressure measurements are being made. The pressure transducers 150 can communicate with a controller 156, which communicates with the motor 84 and/or auger motor 158. If it is detected that the pressure has decreased, the speed at which the motor 84 rotates the cutter head 80 can be accordingly decreased. If it is found that the pressure of the material has increased, the speed at which the motor 84 rotates the cutter head 80 can be accordingly increased. Furthermore, if it is found that the pressure is constant, the speed at which the motor 84 rotates the cutter head 80 can be maintained constant. As a result, the control of the cutter head 80 can be controlled as a function of the pressure detected upstream of the dies 18 through the controller 156. It may be desirable to also control the rate at which the auger blade 12 rotates as a function of the pressure. This can be accomplished by allowing the controller 156 to communicate with a motor 158 that drives the auger blade 12. It also may desirable to control the rate at which the cutter head 80 rotates as a function of the rate at which the auger blade 12 rotates. This can also be accomplished by the controller 156. As can be appreciated, the rate at which the auger blade and/or cutter head rotates can be at least partially controlled by other or additional factors (e.g., current weather conditions, time of day, time of year, geographic location, type of extruder, extruder configuration, type of feeder for extruder, extruder plate temperature, auger blade temperature, material to be extruded temperature, material to be extruded flow rate, material to be extruded composition, material to be extruded density, time period required for material to move through one or more openings in extruder plate and/or die/extruder insert, time period required for material to move along auger blade at a certain auger blade rotation speed, auger blade rotation speed, blade cutter arrangement speed, extruder plate and/or die/extruder insert opening plug detection, product quality detection, extruder plate pressure detection, pressure in one or more openings of extruder plate and/or die/extruder insert, temperature in one or more openings of extruder plate and/or die/extruder insert, time of use for die/extruder inserts, time of use for extruder plate, time of use for die pins, time of use for auger blade, time of use for liner, type of liner, material of liner, shape of liner, extruder plate size, extruder plate opening configuration, extruder plate opening size, material of the extruder plate, thickness of the extruder plate, die/extruder insert size, die/extruder insert shape, die/extruder insert thickness, die/extruder insert material, die/extruder insert hole profile, type of insert pins, shape of insert pins, material of insert pins, type of auger blade, material of auger blade, size/shape of auger blade, type of feed material, type of cutting blades, number of cutting blades, cutting blade material, number of blades on wiper blade, type of wiper blade, spacing of wiper blade from extruder plate and/or die/extruder insert, wiper blade material, calculated and/or detected wear rates and/or information of one or more components of the extruder and/or cutting assembly, etc.).

The rotational speed of the output shaft 86 of the motor 84 can be determined using a sensor 160 such as, but not limited to, a digital encoder available from US Digital Corporation. The sensor 160 communicates with the controller 156 which communicates with the motor 84. Accordingly, rotational speed of the output shaft 86, which is connected to the drive shaft 92, can be controlled. A PWC controller can be used to accurately control the rotational speed of the cutter head. As can be appreciated, other types of motor controllers can be used.

A sensor 170 can also be supplied to check the length of the product P. For example, the sensor can be in the form of a camera, or the like, that can detect the dimensions of the cut product P. The sensor 170 can be designed to communicate with the controller 156. The sensor 170 can send a signal to the controller 156 in response to the detected dimensions of the cut product P. Based at least partially on the detected dimensions of the cut product, the rotational speed of the cutter head 80 can be adjusted.

Figure 3:
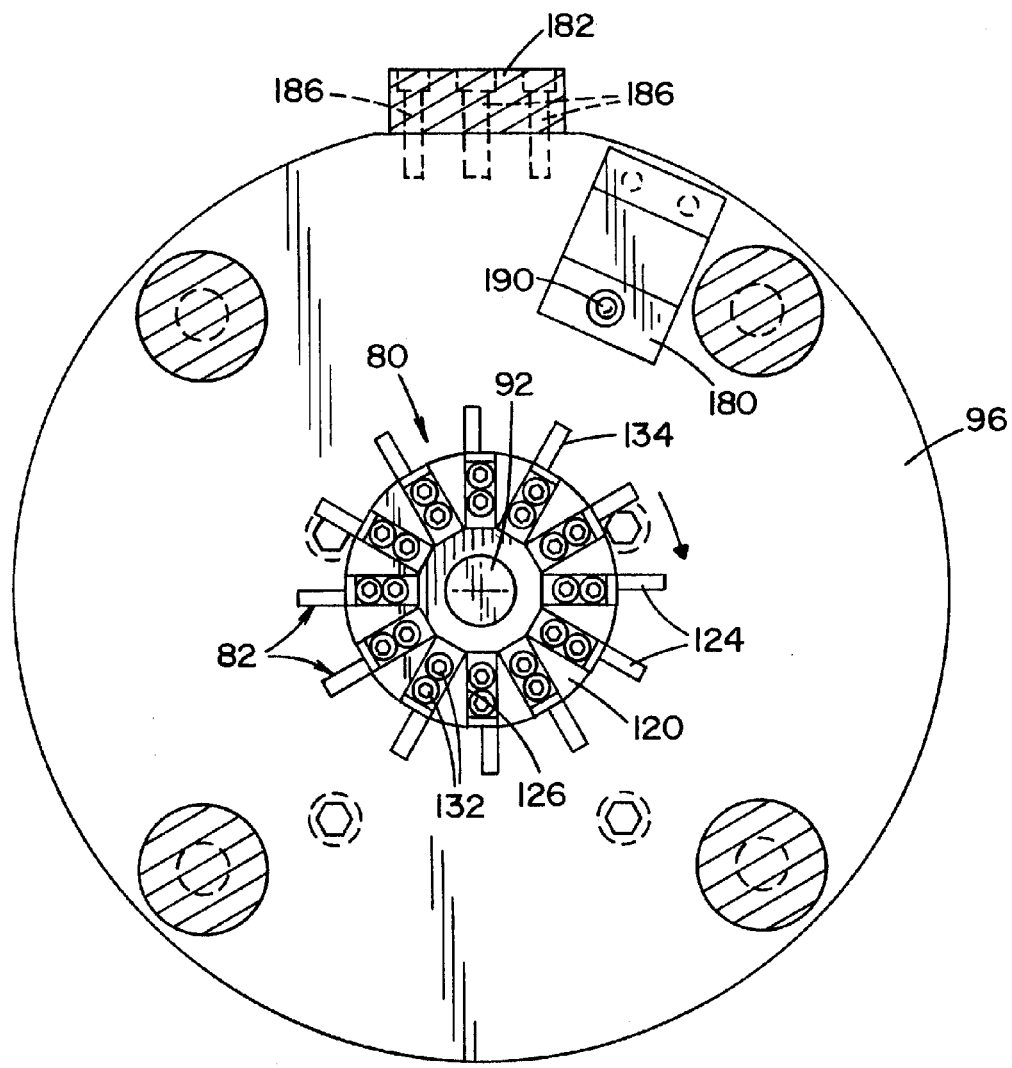
FIG. 3 is a cross-sectional view taken along line 3-3 of FIG. 1.

In addition to controlling the rate at which material is extruded through the extruder plate and/or die/extruder insert and the rotational speed of the cutter head 80, various other features can also be incorporated into the cutting assembly. A switch 180 can be provided to communicate with the controller 156. When replacing the extruder plate and/or die/extruder insert, the cutter knives 82, etc., the assembly is typically disassembled. The die holder 28 and the bearing plate 96 attach to a trolley plate 182. The trolley plate 182 connects to a trolley assembly for moving the cutting assembly. As seen in FIG. 2, a plurality of fasteners 184 connect the die holder 28 to the trolley plate 182. As seen in FIG. 3, a plurality of fasteners 186 also attach the bearing plate 96 to the trolley plate 182. As can be appreciated, other or additional configurations can be used.

In the depicted embodiment, the switch 180 includes a button 190 that contacts a dowel 192 disposed in a dowel opening 194 formed in the die holder 28. The dowel opening 194 runs parallel to the central axis of the die holder 28, which is aligned with the drive shaft 92. With reference to FIG. 2, a radial bore 196 extends from a periphery of the die holder 28 into the dowel opening 194. The radial opening 196 receives a fastener 198 which can be received in a notch 202 formed in the dowel 192.

Removal of the die holder 28 results in the button 190 extending outward from the switch 180, which sends a signal to the controller 156 to cut power to the motor 84. The positioning of the button 190 can be adjusted by adjusting the dowel 192 by loosening the fastener 198 in the notch 202 and adjusting the dowel accordingly. As can be appreciated, other arrangements can be used to deactivate the motor 84.

Another sensor 210 can be added to the fastener 32 that connects the die holder 28 to the spacer 26 and the auger housing 22. This sensor is generally a pressure and/or contact sensor. As can be appreciated, other or additional types of detectors can be used (e.g., temperature detectors, vibration detectors, etc.). The sensor 210 can be a load cell-type sensor that is trapped between the die holder 28 and a nut 212. As can be appreciated, other or additional types of detectors can be used (e.g., pressure sensors, temperature detectors, vibration detectors, etc.). The sensor 210 can detect forces from the die holder 28 and send a signal to the controller 156 to control power delivery the motor 84. As can be appreciated, other or additional arrangements can be used to activate and deactivate the motor and/or other components of the control system.

The cutting assembly can also include a mode control 220. The mode control 220 can be in communication with the controller 156. One mode can be a manual mode wherein the speed of the cutter head 80 is set and maintained at a substantially constant speed throughout an extrusion process. The improved cutting assembly can also include an automatic mode wherein the speed of the cutter head 80 is adjusted based upon the detection of one or more parameters (e.g., pressure of the material prior to and/or as it is being extruded through the extruder plate and/or die/extruder insert; the detected velocity of the material prior to, during, and/or after being extruded through the extruder plate and/or die/extruder insert; detection of the length of the cut material and/or calculating the length of the cut material; current weather conditions; type of extruder; extruder configuration; type of feeder for extruder; extruder plate temperature; die/extruder insert temperature; auger blade temperature; material to be extruded temperature; material to be extruded flow rate; material to be extruded composition; material to be extruded density; time period required for material to move through one or more openings in extruder plate and/or die/extruder insert; time period required for material to move along auger blade at a certain auger blade rotation speed; auger blade rotation speed; blade cutter speed; extruder plate and/or die/extruder insert opening plug detection; product quality detection; type of liner; material of liner; shape of liner; extruder plate size; extruder plate opening configuration; extruder plate opening size; material of the extruder plate; thickness of the extruder plate; die/extruder insert size; die/extruder insert shape; die/extruder insert thickness; die/extruder insert material; die/extruder insert hole profile; type of auger blade; material of auger blade; size/shape of auger blade; type of cutting blades; number of cutting blades; cutting blade material; number of blades on wiper blade; type of wiper blade;

spacing of wiper blade from extruder plate and/or die/extruder insert; wiper blade material; vibration detection of one or more components of the extruder; cavitation detection of material to be extruded; detection of amount of material being fed by auger blade; calculated and/or detected wear rates and/or information of one or more components of the extruder and/or cutting assembly, etc.). The improved cutting assembly can include one or more measured and/or adjustable parameters to adjust the length of the extruded material being cut so as to obtain a desired length of the cut material, calibrate one or more detectors (e.g., pressure detector, temperature detector, rotation speed detector, etc.) so that the speed control for the cutter head 80 is properly adjusted based upon information from one or more detectors, adjust the delay so as to delay the adjustment of the speed of the cutter head 80 to account for the time period in which the material travels into and through an extruder plate and/or die/extruder insert, etc.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

I claim:

1. A cutting assembly for cutting a material extruded from an extruder plate, the assembly comprising:
    a) an extruder plate that includes an inner face and a front face and including a plurality of die openings, a plurality of said die openings having a non-circular cross-sectional shape;
    b) a plurality of die/extruder inserts, a single die/extruder insert positioned in each of said die openings, said die/extruder insert having a body that includes a front face, a back face, a side and a plurality of continuous openings from said front face to said back face, a plurality of said die/extruder inserts having a non-circular cross-sectional shape that are designed to be at least partially inserted into said die openings of said extruder plate; and,
    c) a feed arrangement designed to feed said material toward said inner face of said extruder plate to cause said material to at least partially pass through said continuous opening while said die/extruder insert is positioned in said die opening of said die plate.

2. The cutting assembly as defined in claim 1, wherein at least one of said die/extruder inserts includes one or more structures selected from the group consisting of i) a positioning tab positioned at or closely adjacent to said front face and extending outwardly from said side, said positioning tab designed to properly orient said die/extruder insert when said die/extruder insert is positioned in said die opening of said die plate and ii) a friction tab positioned on said side and extending outwardly from said side of said die/extruder insert, said friction tab designed to maintain said die/extruder insert in said die opening of said extruder plate.

3. The cutting assembly as defined in claim 2, wherein at least one of said die/extruder inserts includes said positioning tab.

4. The cutting assembly as defined in claim 2, wherein at least one of said die/extruder inserts includes said friction tab.

5. The cutting assembly as defined in claim 3, wherein at least one of said die/extruder inserts includes said friction tab.

6. The cutting assembly as defined in claim 4, wherein said friction tab is at least partially tapered.

7. The cutting assembly as defined in claim 4, wherein at least one of said die openings of said die plate includes a plate orientation structure designed to at least partially receive said positioning tab on said die/extruder insert when said die/extruder insert is positioned in said die opening.

8. The cutting assembly as defined in claim 5, wherein at least one of said die openings of said die plate includes a plate orientation structure designed to at least partially receive said positioning tab on said die/extruder insert when said die/extruder insert is positioned in said die opening.

9. The cutting assembly as defined in claim 1, wherein said feed arrangement includes an auger.

10. The cutting assembly as defined in claim 1, including a wiper blade designed to be connected to an auger or a rotating member, said wiper blade designed to be disposed adjacent said extruder plate, said wiper including at least one radially disposed blade, said blade designed to direct material into said die/extruder insert located in said die opening of said die plate.

11. An extruder system comprising of extruder plate and a plurality of die/extruder inserts, said extruder plate including a front face, a back face and a plurality of die openings that pass through the extruder plate, each of said die openings designed to telescopically receive at least a majority of one of said die/extruder inserts, a plurality of said die openings having a non-circular cross-sectional shape, each of said die/extruder inserts including a body having a front face, a back face, a side and a plurality of holes that pass through said body, said plurality of holes designed to allow material to be extruded through said body, said body having a configuration designed to be at least partially telescopically inserted into one of said die openings of said extruder plate, a plurality of said die/extruder inserts having a non-circular cross-sectional shape.

12. The extruder system as defined in claim 11, wherein at least one of said die/extruder inserts includes one or more structures selected from the group consisting of i) a positioning tab positioned at or closely adjacent to said front face and extending outwardly from said side, said positioning tab designed to properly orient said die/extruder insert when said die/extruder insert is positioned in said die opening of said die plate and ii) a friction tab positioned on said side and extending outwardly from said side of said die/extruder insert, said friction tab designed to maintain said die/extruder insert in said die opening of said extruder plate.

13. The extruder system as defined in claim 12, wherein at least one of said die/extruder inserts includes said positioning tab.

14. The extruder system as defined in claim 12, wherein at least one of said die/extruder inserts includes said friction tab.

15. The extruder system as defined in claim 13, wherein at least one of said die/extruder inserts includes said friction tab.

16. The extruder system as defined in claim 14, wherein said friction tab is at least partially tapered.

17. The extruder system as defined in claim 13, wherein at least one of said die openings of said die plate including a plate orientation structure designed to at least partially receive said positioning tab when said die/extruder insert is positioned in said die opening.

18. The extruder system as defined in claim 17, wherein said plate orientation structure only partially traverses said die plate.

19. An extruder system comprising a die/extruder insert, said die/extruder insert including a body having a front face, a back face, a side and a plurality of holes that pass through said body, said plurality of holes designed to allow material to be extruded through said body, said body of said die/extruder insert having a non-circular cross-sectional shape, said body of said die/extruder insert designed to be at least partially telescopically received into a die opening of an extruder plate, said die/extruder insert includes one or more structures selected from the group consisting of i) a positioning tab positioned at or closely adjacent to said front face and extending outwardly from said side, said positioning tab designed to properly orient said die/extruder insert when said die/extruder insert is positioned in the die opening of the die plate and ii) a friction tab positioned on said side and extending outwardly from said side of said die/extruder insert, said friction tab designed to maintain said die/extruder insert in the die opening of the extruder plate.

20. The extruder system as defined in claim 19, wherein said body having a polygonal cross-sectional shape.

21. An extruder system comprising a die/extruder insert, said die/extruder insert including a body having a front face, a back face, a side and a plurality of holes that pass through said body, said plurality of holes designed to allow material to be extruded through said body, said body of said die/extruder insert having a non-circular cross-sectional shape, said body of said die/extruder insert designed to be at least partially telescopically received into a die opening of an extruder plate, said body having a generally triangular cross-sectional shape.

22. The extruder system as defined in claim 20, wherein said body having a generally diamond cross-sectional shape.

23. The extruder system as defined in claim 21, wherein said die/extruder insert includes one or more structures selected from the group consisting of i) a positioning tab positioned at or closely adjacent to said front face and extending outwardly from said side, said positioning tab designed to properly orient said die/extruder insert when said die/extruder insert is positioned in the die opening of the die plate and ii) a friction tab positioned on said side and extending outwardly from said side of said die/extruder insert, said friction tab designed to maintain said die/extruder insert in the die opening of the extruder plate.

\* \* \* \* \*